United States Patent
Goodwin et al.

(10) Patent No.: US 7,584,139 B2
(45) Date of Patent: Sep. 1, 2009

(54) SYSTEMS AND METHODS FOR TRADING AND ORIGINATING FINANCIAL PRODUCTS USING A COMPUTER NETWORK

(75) Inventors: Thomas R. Goodwin, Hamilton, MA (US); J. Kingsley Greenland, II, Norfolk, MA (US); Bruce K. Hounsell, Boston, MA (US); William J. Jakubowski, Charlestown, MA (US)

(73) Assignee: The Debt Exchange, Inc., Boston, MA (US)

( * ) Notice: Subject to any disclaimer, the term of this patent is extended or adjusted under 35 U.S.C. 154(b) by 744 days.

(21) Appl. No.: 10/715,108

(22) Filed: Nov. 18, 2003

(65) Prior Publication Data

US 2005/0108125 A1 May 19, 2005

(51) Int. Cl.
*G06Q 40/00* (2006.01)

(52) U.S. Cl. .......................................... 705/37; 705/35

(58) Field of Classification Search ............. 705/35–37
See application file for complete search history.

(56) References Cited

U.S. PATENT DOCUMENTS

| | | |
|---|---|---|
| 2003/0093357 A1 | 5/2003 | Guler et al. |
| 2003/0204465 A1 | 10/2003 | Marhafer et al. |
| 2004/0039685 A1* | 2/2004 | Hambrecht et al. ............ 705/37 |
| 2004/0167845 A1* | 8/2004 | Corn et al. .................... 705/37 |
| 2004/0186805 A1 | 9/2004 | Gologorsky et al. |
| 2005/0108125 A1 | 5/2005 | Goodwin et al. |

* cited by examiner

*Primary Examiner*—Thu Thao Havan
(74) *Attorney, Agent, or Firm*—McKenna Long & Aldridge LLP

(57) ABSTRACT

The invention relates to systems and methods for trading products and services over a computer network, such as the Internet. In one embodiment, the invention provides a method for trading financial products over a computer network. The system ranks buyers based on the likelihood that they will bid on the products being offered. The system can track the users by certain user information, as well as block a certain user's access to the system based on the user's information.

18 Claims, 59 Drawing Sheets debtX — TheDebtExchange

Please visit us at: www.debtx.com

NAME:
COMPANY:
ADDRESS:
CITY:
STATE:
ZIP:
PHONE:
FAX:
EMAIL:

Complete and Return to: sales@debtx.com

Please attach most recent asset sumary report.

| Seller's Reference Number | Documentation | City | State | Current Principal Balance | Current Principal Balance As of Date | Facility Type | Loan Type | Availability Under Facility | Origination Date |
|---|---|---|---|---|---|---|---|---|---|
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |

282

If you need more cells, please copy the last few rows to add as many as needed.

FIG. 5A

Please attach most recent asset summary report!!!

Please attach most recent asset summary report!!!

| Monthly Payment | Maturity Date | Current Interest Rate | Fixed or Variable | If Variable, Enter Index | If Variable, Enter Margin | If Variable, Next Adjustment Date | Interest Approval Method | Performance Level | Past Due Interest |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

Please attach most recent asset summary report!!!

Please attach most recent asset summary report!!!

| # Times 30 Days Late Past Year | Is the Loan In Brankruptcy? | Loan Agreement covenant details? | Prepayment Penalty or Lockout? | Resourse? (Yes/No) | Guarantor's Aggregate Net Worth | Lien Position | Prior Lien Balance | Past Due Taxes | Collateral Type |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

Please attach most recent asset summary report!!!

| Advance Rate | Appraised Value | Appraised Date | Environmental Issues? | Location Description | EBITDA | EBITDA Date | Other Comments |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

| debt⊠ | ▸about us ▸news ▸mark to market ▸research  sellers  glossary  help  contact us | |
|---|---|---|
| All Loans | My Loans | Loan Filter | Confidentiality & Certification | Edit Profile | Edit Preferences | Log Out |

Login Successful, Welcome!   Certain information available from Debtx is confidential and is subject to the confidentiality agreement signed
Loan Filter                you or your company.

Enter criteria on which you would like to search.
Click "Search" button below to view loans fitting search criteria.
Click "Save" button below to view loans fitting search criteria and to update your preferences.
Click "Reset From Preferences" button below to display search criteria stored in your preferences
View Loans that match criteria stored in your preferences.

Set Criteria

| 1 | Sponsorship | ☐ Debtx | ☐ Direct | ☐ Brokered | ☐ No Preference | | |
|---|---|---|---|---|---|---|---|
| 2 | Date Posted | ○ As of last two weeks | ⊙ No Preference | | | | |
| 3 | Loan/Collateral | ☑ Agriculture<br>☑ C&I (Business)<br>☑ 1-4 Family Residential Mortgage<br>☑ Other<br>☑ Consumer<br>☑ JOC<br>☑ Commercial and Multifamily Mortgage<br>  ☑ Lodging  ☑ Mixed Use<br>  ☑ Retail   ☑ Self Storage | | ☑ Health Care<br>☑ Mobile Home park<br>☑ Warehouse | ☑ Industrial<br>☑ Multi-family<br>☑ Other | ☑ Land<br>☑ Office<br>☑ Unsecured | |
| 4 | Sale Structure | ○ Whole Loan | ⊙ Participation/Syndication | ⊙ No Preference | | | |
| 5 | Loan Balance | ☐ All<br>☐ $2 to $5 million | ☐ $0 to $250,000<br>☐ $5 to $10 million | ☐ $250,000 to million<br>☑ over $10 million | | | |
| 6 | Performance Level | ☑ All<br>☐ Restructured Performing | ☐ New Origination<br>☐ Sub-Performing | ☐ Seasoned Performing<br>☐ Non-Performing | | | |
| 7 | Region/State | United States<br>International<br>Canada | Canada<br>Central<br>International<br>North East | Alabama<br>Alsaka<br>Alberta<br>Arizona | | | |
| 8 | Maturity Date | Years | ☑ All | ☐ 0-2 | ☐ 2-5 | ☐ 5-10 | ☐ 10+ |
| 9 | Lein Position | ○ First | ○ Other | ⊙ No Preference | | | |
| 10 | Coupon | ○ Fixed | ○ Variable | ⊙ No Preference | | | |
| 11 | Recourse | ○ Yes | ○ No | ⊙ No Preference | | | |
| 12 | Call Protection | ○ Yes | ○ No | ⊙ No Preference | | | |
| 13 | Bid Date | ○ Within 2 weeks | ○ Beyond 2 weeks | ⊙ No Preference | | | |

| Search | Reset Criteria From Preference | Save Criteria To Preference |
|---|---|---|

SAMPLE STATISTICS PAGE

| | |
|---|---|
| Offering Name<br>Offering Number<br>Loan ID* | Loan Name<br>Loan Type<br>Loans in Offering |

| | | |
|---|---|---|
| Sale Structure<br>Servicing Retained/Released<br>Bid Date | Bid Type<br>Reserve Price<br>Index | Specific Sponsor<br>Seller Reference Number<br>Seller Name |

| | |
|---|---|
| Performance Level<br>Borrower Street<br>Borrower City<br>Borrower State<br>Borrower Zip<br>Form of Borrowing Entity<br>Cross-Collateralized Loans | Original Funding Date<br>Currency Type<br>Original Note Amount<br>First Loan Payment Due Date<br>Prepayment Lock-out End Date<br>Yield Maintenance End Date<br>Prepayment Terms Description |

| Prepayment Penalty Matrix ||
|---|---|
| Prepayment Penalty | Prepayment Penalty End Date |
| | |

| | |
|---|---|
| Current Balance<br>Current Balance as of Date<br>Unfunded Commitments<br>Current Maturity Date<br>Amort Mos Remaining)<br>Total Scheduled P&I Due<br>Payment Frequency<br>Grace Days Allowed<br>Paid To Date<br>Date Last Pmt Received<br># Days Interest Past Due<br>Total Payment Last 12 Mos<br># Time 30 Days Late<br># Time 60 Days Late<br># Time 90 Days Late<br>Date of Last Modification<br>Modification Code<br>Date Default Letter Sent | Current Interest Rate<br>Servicer and Trustee Fee Rate<br>Interest Rate Type<br>Next Rate Adjustment Date<br>Interest Accrual Method Code<br>Per Diem Interest<br>ARM Index Code<br>ARM Margin<br>Periodic Rate Increase Limit<br>Periodic Rate Decrease Limit<br>Lifetime Rate Cap<br>Lifetime Rate Floor<br>Rate Reset Frequency<br><br>In Bankruptcy?<br>Bankruptcy Date<br><br>Recourse (Y/N) |

| Guarantor Number | Guarantor Name | Type | Net Worth | Net Worth Date |
|---|---|---|---|---|
| | | | | |

| Escrow Type | Current Balance | As of Date |
|---|---|---|
| | | |

FIG. 12

Additional Financial Information

| | |
|---|---|
| FICO Score | Total Assets |
| | Cash |
| Debt To Worm | Intangible/Related Party Assets |
| Senior Debt to Tangible Worth | Tangible Assets |
| Current Ratio | Current Assets |
| Quick Ratio | Tangible Current Assets |
| Other Covenants | |
| | Total Liabilities |
| Total Unqualified Value | Current Liabilities |
| Collateral Advance Rate | Senior Debt |
| Reporting Frequency | Subordinated Debt |

Collateral Information

| | |
|---|---|
| Collateral Number | Name |
| Collateral Type Code | Address |
| Collateral Sub-Type | City |
| Lien Position | State |
| Prior Lien Balance | Zip Code |
| Past Due Taxes | |

| | |
|---|---|
| Year Built | Ground Lease (Y/S/N) |
| Year Last Renovated | Total Reserve Balance |
| Net Square Feet | Most Recent Appraisal Value |
| # Of Units/Beds/Rooms | Most Recent Appraisal Date |
| Number of Floors | |
| | Assessed Value |
| Number of Parking Spaces | Date Asset Expected to Be |
| Land Area (square feet) | Resolved or Foreclosed |

| | |
|---|---|
| Credit Tenant Lease | Most Recent Revenue |
| Most Recent Occupancy | Most Recent Operating Expenses |
| Number of Tenants | Most Recent NOI |
| Occupancy/# Tenants as of | Most Recent Financial As of Start |
| Date Lease Rollover Review | Most Recent Financial As of End |
| % Sq. Feet expiring 1-12 mos | Most Recent Financial Indicator |
| % Sq. Feet expiring 13-24 mos | Preceding Fiscal Year As of Start |
| % Sq Feet expiring 25-36 mos | Preceding FY Revenue |
| % Sq. Feet expiring 37-48 mos | Preceding FY Operating Expenses |
| % Sq. Feet expiring 49-60 mos | Preceding FY Year NOI |
| Largest Tenant | Preceding FY Physical Occupancy |
| SF of Largest Tenant | Second Preceding FY Start |
| 2nd Largest Tenant | Second Preceding FY Revenue |
| SF of 2nd Largest Tenant | Second Preceding FY Op. Exp. |
| 3rd Largest Tenant | Second Preceding Fiscal Year NOI |
| SF of 3rd Largest Tenant | Second Preceding FY Occupancy |
| Fiscal Year End Month | Most Recent NCF |

| | |
|---|---|
| Date of Last Inspection | Preceding Fiscal Year NCF |
| Environmental Report Type | Second Preceding FY NCF |
| Environmental Report Year | |

FIG. 13

THIS DOCUMENT AFFECTS THE RESPECTIVE LEGAL RIGHTS AND OBLIGATIONS OF THE PARTIES HERETO. ACCORDINGLY, THE PARTIES SHOULD CONSULT THEIR ATTORNEYS BEFORE EXECUTING THIS DOCUMENT.

PROMISSORY NOTE $30,000,000

Anytown, New York
As of January 3rd, 2000

FOR VALUE RECEIVED ABC DEVELOPERS, LLC, a New York limited liability company, as maker, having its principal place of business at 123 Main Street, Anytown, New York 12233 ("Borrower"), hereby unconditionally promises to pay to the order of XYZ LENDING COMPANY, a New York corporation, having an address at 100 Middle Road, Big City, New York 33345 ("Lender"), or at such other place as the holder hereof may from time to time designate in writing, the principal sum of THIRTY MILLION AND 00/100 DOLLARS ($30,000,000.00) in lawful money of the United States of America with interest thereon to be computed from the date of this Note at the Applicable Interest Rate (defined below) in accordance with the terms of this Note.

ARTICLE 1 - Payment Terms

Borrower agrees to pay sums under this Note in installments as follows:

(a) a payment of interest only on February 1, 2000;

(b) a constant payment of $220,805.43 on March 1, 2000 and on the first day of each calendar month thereafter up to and including January 1, 2010 (each, a "Payment Date"); each of the payments to be applied as follows: (i) first, to the payment of interest computed at the Applicable Interest Rate; and (ii) the balance toward the reduction of the principal sum; and (c) the balance of the principal sum and all interest thereon on February 1, 2010 (the "Maturity Date").

ARTICLE 2 - Interest

The interest rate on this Note is eight and three tenths percent (8.30%) per annum (the "Applicable Interest Rate"). Interest on the principal sum of this Note shall be calculated by multiplying the actual number of days elapsed in the applicable period by a daily rate based upon a three hundred sixty (360) day year.

PROVIDED BY:
THACHER PROFFITT & WOOD
NEW YORK, NEW YORK 10048

FIG. 14

POLICY OF TITLE INSURANCE

Issued by

NATIONAL TITLE INSURANCE COMPANY

SUBJECT TO THE EXCLUSIONS FROM COVERAGE, THE EXCEPTIONS FROM COVERAGE CONTAINED IN SCHEDULE B AND THE CONDITIONS AND STIPULATION, NATIONAL TITLE INSURANCE COMPANY, a Blank corporation, herein called the Company, insures, as of Date of Policy shown in Schedule A, against loss or damage, not exceeding the Amount of Insurance stated in Schedule A, sustained or incurred by the insured by reason of:

1. Title to the estate or interest described in Schedule A being vested other than as stated therein;

2. Any defect in or lien or encumbrance on the title;

3. Unmarketability of the title;

4. Lack of a right of access to and from the land;

5. The invalidity or unenforceability of the lien of the insured mortgage upon the title;

6. The priority of any lien or encumbrance over the lien of the insured mortgage;

7. Lack of priority of the lien of the insured mortgage over any statutory lien for services, labor or material:

(a) arising from an improvement or work related to the land which is contracted for or commenced prior to Date of Policy, or (b) arising from an improvement or work related to the land which is contracted for or commenced subsequent to Date of Policy, and which is financed in whole or in part by proceeds of the indebtedness secured by the insured mortgage which at Date of Policy the insured has advanced or is obligated to advance;

8. The invalidity or unenforceability of any assignment of the insured mortgage, provided the assignment is shown in Schedule A, or the failure of the assignment shown in Schedule A to vest title to the insured mortgage in the named insured assignee free and clear of all liens The Company will also pay the costs, attorney's fees and expenses incurred in defense of the title or the lien of the insured mortgage, as insured, but only to the extent provided in the Condition and Stipulations.

[Witness clause optional]

NATIONAL TITLE INSURANCE COMPANY

BY: 
    PRESIDENT

BY: 
    SECRETARY

ALTA LOAN POLICY (10/17/92

FIG. 15

| debt⊠ | ▷about us | ▷news | ▷mark to market | ▷research | sellers | glossary | help | contact us |
|---|---|---|---|---|---|---|---|---|
| All Loans | My Loans | Loan Filter | Confidentiality & Certification | Edit Profile | Edit Preferences | | Log Out | |

Mark to Market
*=required

| | | |
|---|---|---|
| Loan Type * | Real Estate ▽ | |
| Documentation * | Bank Documents ▽ | |
| Principal Balance * | 100000 | |
| As of Date | | |
| Maturity Date * | 2004 | |
| State/Province * | Texas ▽ | |
| Location Description * | Rural ▽ | |
| Monthly P&I Due | | |
| Coupon * | 10 | (e.g. enter 10 for 10%) |
| Fixed or Variable * | Fixed ▽ | |
| Index Used (* if Fixed or Variable=Variable) | Other ▽ | |
| Current Index Rate (* if Fixed or Variable=Variable) | variable | (e.g. enter 8 for 8%) |
| Margin (* if Fixed or Variable=Variable) | 2 | (e.g. enter 2 for 2%) |
| Next Change Date (* if Fixed or Variable=Variable) | variable | |
| Interest Accrual Method * | 30/360 ▽ | |
| Performance Level * | New Origination ▽ | |
| Days Past Due (* if Performance Level = Sub- or Non-) | non | |
| Times 30 Days Late Past 12 Months | ▽ | |
| In Bankruptcy? * | ○ Yes ⦿ No | |
| Prepayment Penalty or Lockout? * | ○ Yes ⦿ No | |
| Later of Lockout/Yield Maintenance/Defeasance End Date (if Prepayment Penalty or Lockout=Yes) | | |
| Current or Next Prepayment Penalty as % of Outstanding Principal (if Prepayment Penalty or Lockout=Yes) | | (e.g. enter 2 for 2%) |
| Current or Next Penalty End Date (if Prepayment Penalty or Lockout=Yes) | | |
| Recourse?* | ○ Yes ⦿ No | |
| Guarantor/Sponsor Net Worth | | |
| Lien Position * | First ▽ | |
| Prior Lien Balance (* If Lien Position=Subordinate or Other) | | |
| Past Due Taxes | | |
| Collateral Type * | Other ▽ | |
| Collateral Quality * | A ▽ | |
| Environmental Issues * | None ▽ | |
| LTV * | 80 | (e.g. enter 80 for 80%) |
| DSC* | 120 | (e.g. enter 120 for 120%) |

810 points to "Current or Next Penalty End Date" row.

[Calculate] [Get Monthly Cash Flow] [Get Yearly Cash Flow] [More] —814

812— Please be advised that the values show are approximations using assumptions that are not necessarily accurate.

FIG. 20

| debt⊠ | ▸about us | ▸news | ▸mark to market | ▸research | sellers | glossary | help | contact us |
|---|---|---|---|---|---|---|---|---|
| All Loans | My Loans | Loan Filter | Confidentiality & Certification | | Edit Profile | Edit Preferences | Log Out | |

Loan Modeling

Select Performance Scenario, and enter fields as appropriate. Depress the "Calculate" button to display an estimated price for the loan based on the input assumptions.

Perform As Agreed
Performance Scenario: [Perform as Agreed ▼]   Yield to maturity must be entered

*=Required Fields
* Yield to Maturity:
(e.g. 10 for 10%)   [10]
Override Maturity Date:
(min 6 mos, max 20 years from today)   [02/08/02]

[Calculate]  [Get Monthly Cash Flow]  [Get Annual Cash Flow]  [>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P. & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate.

FIG. 21

| debt ⊠ | ▶about us | ▶news | ▶mark to market | ▶research | sellers | glossary | help | contact us |
|---|---|---|---|---|---|---|---|---|
| All Loans | My Loans | Loan Filter | Confidentiality & Certification | Edit Profile | Edit Preferences | | | Log Out |

Loan Modeling

Select Performance Scenario, and enter fields as appropriate. Depress the "Calculate" button to display an estimat price for the loan based on the input assumptions.

Perform As Agreed
Performance Scenario: [Perform as Agreed ▼]  99.3 cents on the dollar.

*=Required Fields

* Yield to Maturity:
(e.g. 10 for 10%)           [10]
Override Maturity Date:
(min 6 mos, max 20 years from [02/08/02]
today)

[Calculate]   [Get Monthly Cash Flow]   [Get Annual Cash Flow]   [Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please be advised that the value shown is an approximation using assumptions that are not necessarily accurate.

FIG. 22

Loan Modeling

Select performance scenario, and enter fields as appropriate. Depress the "Calculate" button to display an estimat price for the loan based on the input assumptions.

Foreclosure
Performance Scenario: [Foreclose ▼]   Based on the assumptions provided the value of your loan is estimated to be...

*=Required Fields

* Yield to Maturity: (e.g. 10 for 10%) [15]    * Default Date [09/19/03]

Override Maturity Date: (min 6 mos, max 20 years from today) [ ]

Months From Default to Cashflow [3]    Sale Proceeds as % of Appraised Value (e.g. 80 for 80%) [80]

Percent of Cashflow Collected (e.g. 80 for 80%) [80]    Brokerage Expense as % of Sale Proceeds (e.g. 3 for 3%) [3]

Months from Cashflow to Sale [6]

| | Dollar Amount | Period | Date (if Period is "specific date") |
|---|---|---|---|
| Legal Expenses: | | at default ▼ | |
| Appraisal Expenses: | | at default ▼ | |
| Environmental Expenses: | | at default ▼ | |
| Capital Expenses: | | at default ▼ | |
| Taxes & Other Senior Liens Paid: | | at default ▼ | |
| Guarantor Recovery: | | at default ▼ | |

[Calculate]  [Get Monthly Cash Flow]  [Get Annual Cash Flow]  [>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate.

FIG. 24

Loan Modeling

Select performance scenario, and enter fields as appropriate. Depress the "Calculate" button to display an estimate price for the loan based on the input assumptions.

Foreclosure
Performance Scenario: [Foreclose ▼]  69.4 cents on the dollar.

*=Required Fields

| Field | Value | Field | Value |
|---|---|---|---|
| * Yield to Maturity: (e.g. 10 for 10%) | 15 | * Default Date | 09/19/01 |
| Override Maturity Date: (min 6 mos, max 20 years from today) | | | |
| Months From Default to Cashflow | 3 | Sale Proceeds as % of Appraised Value (e.g. 80 for 80%) | 80 |
| Percent of Cashflow Collected (e.g. 80 for 80%) | 80 | Brokerage Expense as % of Sale Proceeds (e.g. 3 for 3%) | 3 |
| Months from Cashflow to Sale | 6 | | |

|  | Dollar Amount | Period | Date (If Period is 'specific date') |
|---|---|---|---|
| Legal Expenses: | | at default ▼ | |
| Appraisal Expenses: | | at default ▼ | |
| Environmental Expenses: | | at default ▼ | |
| Capital Expenses: | | at default ▼ | |
| Taxes & Other Senior Liens Paid: | | at default ▼ | |
| Guarantor Recovery: | | at default ▼ | |

[Calculate]  [Get Monthly Cash Flow]  [Get Annual Cash Flow]  [>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please be advised that the value shown is an approximation using assumptions that are not necessarily accurate.

FIG. 25

| debt ⊠ | ▸about us | ▸news | ▸mark to market | ▸research | sellers | glossary | help | contact us |
|---|---|---|---|---|---|---|---|---|
| All Loans | My Loans | Loan Filter | Confidentiality & Certification | Edit Profile | Edit Preferences | | | Log Out |

Loan Modeling

Select performance scenario, and enter fields as appropriate. Depress the "Calculate" button to display an estimat price for the loan based on the input assumptions.

Extension/Restructure Performance Scenario: [Extension/Restructure ▼]   Based on the assumption provided the value of your loan is estimated to be...

*=Required Fields.

* Yield to Maturity: (e.g. 10 for 10%) [15]    * Restructure/Extension Date [09/19/01]

*New Maturity Date: (maximum 20 years from today) [09/19/05]    % of Principal Refinanced (remainder is considered forgiven) [100]

New Interest Rate (e.g. 10 fro 10%) [10]

*New Amortization Schedule in Years (enter 1000 for interest only) [20]

| | Dollar Amount | Period | Date (if Period is 'specific date') |
|---|---|---|---|
| Legal Expenses: | [ ] | [at default ▼] | [ ] |
| Appraisal Expenses: | [ ] | [at default ▼] | [ ] |
| Environmental Expenses: | [ ] | [at default ▼] | [ ] |
| Capital Expenses: | [ ] | [at default ▼] | [ ] |
| Taxes & Other Senior Liens Paid: | [ ] | [at default ▼] | [ ] |
| Guarantor Recovery: | [ ] | [at default ▼] | [ ] |

[Calculate]   [Get Monthly Cash Flow]   [Get Annual Cash Flow]   [>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate.

FIG. 26

| debt⊠ | ▸about us | ▸news | ▸mark to market | ▸research | sellers | glossary | help | contact us |
|---|---|---|---|---|---|---|---|---|
| All Loans | My Loans | Loan Filter | Confidentiality & Certification | Edit Profile | Edit Preferences | Log Out | | |

Loan Modeling

Select performance scenario, and enter fields as appropriate. Depress the "Calculate" button to display an estimate price for the loan based on the input assumptions.

| Extension/Restructure Performance Scenario: | [Extension/Restructure ▾] 85.1 cents on the dollar. |
|---|---|

*=Required Fields

| * Yield to Maturity: (e.g. 10 for 10%) | [15] | * Restructure/Extension Date | [09/19/01] |
|---|---|---|---|
| *New Maturity Date: (maximum 20 years from today) | [09/19/05] | % of Principal Refinanced (remainder is considered forgiven) | [100] |
| New Interest Rate (e.g. 10 to 10%) | [10] | | |
| *New Amortization Schedule in Years (enter 1000 fro interest only) | [20] | | |

| | Dollar Amount | Period | Date (if Period is specific date) |
|---|---|---|---|
| Legal Expenses: | [ ] | [at default ▾] | [ ] |
| Appraisal Expenses: | [ ] | [at default ▾] | [ ] |
| Environmental Expenses: | [ ] | [at default ▾] | [ ] |
| Capital Expenses: | [ ] | [at default ▾] | [ ] |
| Taxes & Other Senior Liens Paid: | [ ] | [at default ▾] | [ ] |
| Guarantor Recovery: | [ ] | [at default ▾] | [ ] |

[Calculate]  [Get Monthly Cash Flow]  [Get Annual Cash Flow]  [>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | — | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate.

FIG. 27 debtX | ▸about us | ▸news | ▸mark to market | ▸research | sellers | glossary | help | contact us

| All Loans | My Loans | Loan Filter | Confidentiality & Certification | Edit Profile | Edit Preferences | Log Out |

Loan Modeling

Select performance scenario, and enter fields as appropriate. Depress the "Calculate" button to display an estimate price for the loan based on the input assumptions.

DPO/Early Payoff

Performance Scenario: [DPO/Early Payoff ▼]   Based on the assumptions provided the value of your loan is estimated to be...

*=Required Fields

* Yield to Maturity: (e.g. 10 for 10%)   [15]   Default Date, if any   [      ]

* Override Maturity Date: (min 6 mos, max 20 years from today)   [02/08/02]

% of Payment Received Default to Payoff (e.g. 80 for 80%)   [80]   * DPO/Early Payoff Date   [09/27/01]

% of Principal Repaid (e.g. 80 for 80%)   [85]

% of Past Due Interest Paid (e.g. 80 for 80%)   [95]

|  | Dollar Amount | Period | Date (if Period is 'specific date') |
|---|---|---|---|
| Legal Expenses: | [    ] | at default ▼ | [    ] |
| Appraisal Expenses: | [    ] | at default ▼ | [    ] |
| Environmental Expenses: | [    ] | at default ▼ | [    ] |
| Capital Expenses: | [    ] | at default ▼ | [    ] |
| Taxes & Other Senior Liens Paid: | [    ] | at default ▼ | [    ] |
| Guarantor Recovery: | [    ] | at default ▼ | [    ] |

[Calculate]  [Get Monthly Cash Flow]  [Get Annual Cash Flow]  [>>Back]

Loan Information

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
|  |  | DSC | 1.00x |

Please be advised that the value shown is an approximation using assumptions that are not necessarily accurate.

FIG. 28

| debt ⊠ | ▸about us | ▸news | ▸mark to market | ▸research | sellers | glossary | help | contact us |
|---|---|---|---|---|---|---|---|---|
| All Loans | My Loans | Loan Filter | Confidentiality & Certification | Edit Profile | | Edit Preferences | | Log Out |

Loan Modeling

Select performance scenario, and enter fields as appropriate. Depress the "Calculate" button to display an estimate price for the loan based on the input assumptions.

| DPO/Early Payoff Performance Scenario: | [DPO/Early Payoff ▾] | 84.5 cents on the dollar. | |
|---|---|---|---|
| *=Required Fields | | | |
| * Yield to Maturity: (e.g. 10 for 10%) | [15] | Default Date, if any | [ ] |
| *Override Maturity Date: (min 6 mon, max 20 years from today) | [02/06/02] | | |
| % of Payment Received Default to Payoff (e.g. 80 for 80%) | [80] | * DPO/Early Payoff Date | [09/27/01] |
| % of Principal Repaid (e.g. 80 for 80%) | [85] | | |
| % of Past Due Interest Paid (e.g. 80 for 80%) | [95] | | |

| | Dollar Amount | Period | Date (if Period is specific date) |
|---|---|---|---|
| Legal Expenses: | [ ] | [at default ▾] | [ ] |
| Appraisal Expenses: | [ ] | [at default ▾] | [ ] |
| Environmental Expenses: | [ ] | [at default ▾] | [ ] |
| Capital Expenses: | [ ] | [at default ▾] | [ ] |
| Taxes & Other Senior Liens Paid: | [ ] | [at default ▾] | [ ] |
| Guarantor Recovery: | [ ] | [at default ▾] | [ ] |

[Calculate]　[Get Monthly Cash Flow]　[Get Annual Cash Flow]　[>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | — | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate.

Submit a Bid

Offering demo 100 - Demonstration Portfolio 1
6 Assets - Outstanding balance totaling $28,282,620

High bid: $28,282,620

Bid increment: $25,000 (about) — 1200

Your bid: [____]

1210 — ● Proxy bid (about)
1220 — ○ Absolute bid

☐ I (bidder1) have read and agree to the Terms of Sale and agree to disclose my Bid Allocation to DebtX.

[Review bid]

FIG. 32

Submit a Bid

Offering demo 200 - Demonstration Portfolio 2
1 Assets - Outstanding balance totaling $8,577,977

High bid: $9,000,000
Bid increment: $25,000
Your bid: [_____] —1200 (about)

○ —1210 Proxy bid (about)
◉ —1220 Absolute bid

☐ I (bidder2) have read and agree to the Terms of Sale and agree to disclose my Bid Allocation to DebtX.

[ Review bid ]

FIG. 33

| Review and Confirm Bid |
|---|
| Offering demo_100 - Demonstration Portfolio 1<br>6 Assets - Outstanding balance totaling $28,282,620 |
| • Please confirm that your bid is correct.<br>• This is a proxy bid.    (about)<br>• To place your bid, click the "Submit bid" button. |
| Your minimum bid:     $28,225,000  (about)<br>Your maximum bid:    $28,250,125  (about)<br>[ Submit bid ]<br>Cancel this bid<br>By submitting this bid you are agreeing to the Terms of Sale. |

FIG. 34

| Problem With Your Bid |
|---|
| Offering demo_100 - Demonstration Portfolio 1
6 Assets - Outstanding balance totaling $28,282,620 |
| ○ Your bid is less than the sum of the current high bid plus the bid increment.
○ Please use the bid form to submit a higher bid. |

FIG. 35

| New Bid Status | | | | | |
|---|---|---|---|---|---|
| demo_100 - Demonstration Portfolio 1 | | | | | |
| • Although your new bid is the high bid in this auction, your new bid is not the winning bid because the Aggregate Offering bid is winning all of the offerings. | | | | | (why?) |
| Your New Bid | Absolute Bid | Winning | High Bid | Proxy Max | Bid Date |
| | $28,282,620 | No | Yes | Not Applicable | Jan-28-2003 15:15:23 EST |
| Back to Bid Form | | | | | |

| Related Auctions Status | | |
|---|---|---|
| Your high bids are colored red | | |
| Offering | # Bids | High Bid |
| demo 100 | 11 | $28,282,620 |
| demo 200 | 1 | $8,000,000 |
| Total | 12 | $36,282,620 |
| Aggregate Offering | | |
| demo aon | 4 | $36,800,000 |
| Overall Auction Status | | |
| Aggregate Offering bid is winning | | (why?) |

1410 — demo 100
1420 — demo 200
1430 — demo aon
1450 — Aggregate Offering bid is winning
1400, 1440

FIG. 43

| | Auction Status | | |
|---|---|---|---|
| Auction Type: | English Forward | | (about) |
| Auction Opened: | January 15, 2003 09:00:00 EST | | |
| Auction Closes: | January 28, 2003 16:00:00 EST | | |
| Extension Time: | 2 minutes | | (about) |
| Time Remaining: | 41 + minutes | | |
| High Bid: | $28,282,620 | Number Bids: | 11 |
| Bid Increment: | $25,000 | Reserve Price: | None |
| • This offering is part of an Aggregate Offering. <br> • Currently, the Aggregate Offering bid is winning. <br> • Status of Related Auctions is shown in the panel on the right. | | | (about) <br> (why?) |

Labels: 1520, 1530, 1540, 1550, 1560, 1570, 1580, 1590, 1600, 1610, 1620, 1630, 1510

FIG. 45

| | 1650 | Your Best Bid Status 1670 | | 1680 | | |
|---|---|---|---|---|---|---|
| Your Best Bid | Absolute Bid $28,282,620 | Winning No* | High Bid Yes | Proxy Max Not Applicable | Bid Date Jan-28-2003 15:15:23 EST | 1690 1695 |
| *Although your best bid is the high bid in this auction, your best bid is not the winning bid because the Aggregate Offering bid is winning all of the offerings. | | | | | (why?) | |

| Display Your Bid History |
|---|

FIG. 46

| Your Best Bid Status |||||| 
|---|---|---|---|---|---|
| Your Best Bid | Absolute Bid | Winning | High Bid | Proxy Max | Bid Date |
| | $28,282,620 | No* | Yes | Not Applicable | Jan-28-2003 15:15:23 EST |
| *Although your best bid is the high bid in this auction, your best bid is not the winning bid because the Aggregate Offering bid is winning all of the offerings. (why?) ||||||

| Your Bid History |||
|---|---|---|
| Proxy or Absolute | Bid Amount | Bid Date |
| Absolute | $28,282,620 | Jan-28-2003 15:15:23 EST |
| Proxy | $28,250,125 | Jan-28-2003 15:07:39 EST |
| Proxy | $28,200,000 | Jan-15-2003 15:03:54 EST |
| Proxy | $27,000,000 | Jan-15-2003 15:03:29 EST |
| Proxy | $20,000,000 | Jan-15-2003 14:55:40 EST |

FIG. 47 debt(x)

Logout | Main |

1930

(This page will automatically reload every 15 seconds)

1900　　1910　　1920　Auction Monitor Demonstration　1940　1950　1960

| Reference # | High Bidder | Bid Type | Current Bid | Bid Time | Bid Count | Reserve Price |
|---|---|---|---|---|---|---|
| demo 100 | Jakubowski, Bill | Absolute | $28,282,620 | 1/28/03 3:15:23 PM | 11 | Not specified |
| demo 200 | Jakubowski, Bill | Absolute | $8,000,000 | 1/15/03 3:02:08 PM | 1 | Not specified |
| Totals | | | $36,282,620 | | 12 | NAP |
| Aggregate Offering (All or None) | | | | | | |
| demo aon | Jakubowski, Bill | Absolute | $36,800,000 | 1/15/03 3:05:53 PM | 4 | Not specified |

FIG. 49

Offering Bid History
demo_100

| Bid ID | User | Login Name | Type | Amount | Time Submitted |
|---|---|---|---|---|---|
| 1731 | Jakubowski, Bill | bidder 1 | Absolute | $28,282,620 | 1/28/03 3:15:23 PM |
| 1729 | Jakubowski, Bill | bidder 1 | Proxy | $28,250,125 | 1/28/03 3:07:39 PM |
|  | Jakubowski, Bill | bidder 1 | Proxy Generated | $28,250,125 | 1/28/03 3:07:39 PM |
| 1725 | Jakubowski, Bill | bidder 1 | Proxy | $28,200,000 | 1/15/03 3:03:54 PM |
|  | Jakubowski, Bill | bidder 1 | Proxy Generated | $28,200,000 | 1/15/03 3:05:53 PM |
|  | Jakubowski, Bill | bidder 1 | Proxy Generated | $27,025,000 | 1/15/03 3:03:55 PM |
| 1722 | Jakubowski, Bill | bidder 1 | Proxy | $27,000,000 | 1/15/03 3:03:29 PM |
|  | Jakubowski, Bill | bidder 1 | Proxy Generated | $27,000,000 | 1/15/03 3:03:30 PM |
| 1713 | Jakubowski, Bill | bidder 2 | Proxy | $15,000,000 | 1/15/03 2:59:19 PM |
|  | Jakubowski, Bill | bidder 2 | Proxy Generated | $15,000,000 | 1/15/03 2:59:19 PM |
| 1711 | Jakubowski, Bill | bidder 2 | Absolute | $5,000,000 | 1/15/03 2:57:34 PM |
| 1709 | Jakubowski, Bill | bidder 1 | Proxy | $20,000,000 | 1/15/03 2:55:40 PM |
|  | Jakubowski, Bill | bidder 1 | Proxy Generated | $20,000,000 | 1/15/03 3:00:21 PM |
|  | Jakubowski, Bill | bidder 1 | Proxy Generated | $15,025,000 | 1/15/03 2:59:19 PM |
|  | Jakubowski, Bill | bidder 1 | Proxy Generated | $5,025,000 | 1/15/03 2:57:34 PM |
|  | Jakubowski, Bill | bidder 1 | Proxy Generated | $25,000 | 1/15/03 2:58:40 PM |

SYSTEMS AND METHODS FOR TRADING AND ORIGINATING FINANCIAL PRODUCTS USING A COMPUTER NETWORK

FIELD OF THE INVENTION

Embodiments of the present invention generally relate to systems and methods for trading or auctioning products, such as commercial loans or real assets such as boats, and services such as software development. More specifically, embodiments of the present invention are directed to a data processing system for buying, selling, trading, originating and providing information on such products and services over a computer network, such as the Internet. More specifically, embodiments of the present invention are directed to a data processing system which contains improved operating abilities which aid the bidder, the seller and the trading entity, such as an auction house, in the conduct of that auction.

BACKGROUND OF THE INVENTION

Auctions have long been held as a way for a seller of a product or service to obtain the highest price for the item they are selling. There are many types of auctions, such as a closed auction, a Dutch auction and an English forward auction. An English forward auction allows bidders to submit successively increasing bids until the auction closes. The bidder holding the highest bid at the close of the auction, wins the offering or item being auctioned. A typical English forward auction begins with the seller setting a reserve price and a minimum bid. The reserve price is the minimum amount the seller will accept in return for the item being offered, and the minimum bid is the smallest increase in a bid a new bidder must make for an item in order for the bid to be accepted by the seller and/or the auction house. Next a bidder makes a bid for the item being offered. If the bid offered meets the minimum bid, that bid will typically be accepted and automatically becomes the current high bid subject to existing proxy bids as explained herein.

After the first bid is accepted, the next bid in an English forward auction will be accepted only if it meets or exceeds the minimum bid. At this point the new bid must at least equal if not exceed the amount of the current high bid plus the amount of the bid increment. For example, if the current high bid is $15,000, and the bid increment is set at $1,000, a bidder must bid at least $16,000 to become the current high bidder. Bids are typically ranked in order of the amount bid. However, if two bidders submit acceptable bids that are equal in amount, the bidder who first submitted the acceptable bid will be awarded the status of current high bidder. Simply because a bidder is the current high bidder when an auction closes does not mean that bidder will necessarily win that auction. Rather the current high bid must also meet or exceed the seller's reserve price in order to win the auction. If the current high bid fails to meet the reserve price when the auction closes, the seller is typically under no obligation to sell that item to that bidder.

An absolute bid is a single, static bid. Therefore, if a second bidder places a bid that is higher than a first bidder's absolute bid, and the second bidder then becomes the current high bidder, the first bidder must manually submit a new acceptable bid in order to become the current high bidder. Alternatively, the auction entity could provide for a proxy feature, which allows the bidder to specify the maximum amount that he is willing to bid for an offering. For example, in an auction where the reserve price is set at $15,000 and the minimum bid is set at $1,000, Bidder B will replace Bidder A (who opened the bidding at $17,000) as the current high bidder if Bidder B bids $18,000.

However, if Bidder A had previously submitted a proxy bid of $35,000, the auction house or auction system will automatically execute a $19,000 bid on behalf of Bidder A. That $19,000 bid represents an amount equal to the current high bid plus the minimum bid, thereby overtaking Bidder B and making Bidder A the current high bidder. Thereafter, each time another bidder properly outbids Bidder A, the auction house or auction system will place another proxy bid on behalf of Bidder A until Bidder A's maximum of $35,000 is reached. In order to thereafter become the current high bidder again, Bidder A would have to manually submit a new bid. However, Bidder A would not know of this need to manually submit a new bid in excess of his proxy maximum unless he was not only monitoring the progress of the bidding, but also continually executed a screen refresh of the auction house or auction system's bid status web page.

Therefore, it would be advantageous to have a system which automatically refreshed a bidder's bid status web page with the current status of the bidding in which any bidder was tracking or participating when either there was a change in the bidding status, or when a bidder's proxy maximum had been outbid or upon expiration of a predetermined time period. It would also be advantageous if the auction house or auction system sent alerts to a bidder who was tracking or bidding on an item being auctioned off, but not monitoring that auction live.

Another problem with current auction systems is that an offering with a larger number of items will not obtain as high a price as possible if the items were offered individually. For example, a car collector owns a large collection of rare cars and desires to sell them via an auction. Because of limited available time the seller could only monitor a single aggregate sale of all the cars. While advantageous in terms of time for the seller, it is not advantageous in terms of maximizing her pricing premium because only bidders with large financial resources can participate in the auction. However, smaller bidders who could bid on one or two items contained in the aggregate offering, could serve to drive up the price of the entire offering if their bids could be accepted as a single bid.

Therefore, it would be advantageous if an auction system existed where a number of similar items could be offered both individually and aggregately, whereby the seller could accept the largest total bid, regardless of whether it came from a single bidder on the aggregate offering, or from the sum of all the individual bidders combined.

In certain automated auction systems, the auction house presents parties interested in the auction of a certain item with the bid history of that offering. The bid history typically displays to the other bidders or to interested parties at least the bidder's name, the amount bid by each bidder and the time the bidder placed their bid. However, by providing all the bidders interested in an offering with information regarding the other parties also interested in that offering, such as their user name or handle, the bidders could collude with each other against the seller. Such collusion results in the seller not receiving the absolute highest possible bid for each item they offered for auction. Therefore, it would be advantageous to have an auction system that allowed the seller or the auction system to block single bidder or all bidders from viewing or receiving any or all information regarding the other bidders bidding on a given offering.

Another problem with current auction systems is that although bidders must log onto an auction system using a log-in name and password, that password is typically not secure. For example, competitors for the same item being auctioned off might somehow determine the password of another competitor. They might then use that password to withdraw their competitor's bid, thereby leaving the unscrupulous bidder with the winning bid. Therefore, it would be advantageous to have an auction system which knows the IP address of a given user, and only grants that user access to the auction system if the user's log-in and password are submitted from a previously registered IP address. Even if the IP address were randomly assigned by the Internet provider it would still be advantageous to track the user by that IP address assigned by the Internet provider for the reasons discussed herein.

Similarly, it would be advantageous to be able to track a user by their IP address or other identifiers assigned by the auction system as the users move throughout the auction web site. Tracking the user through the web site allows the auction house to gather data regarding products of interest to the user, and allows subsequent data mining of the data gathered. Additionally, employing a user's IP address or other identifier to determine their identity and whether they are logging in from a pre-approved location, thereby boosting security for all users and the auction house.

When bidders are interested in bidding on a certain offering or item, they typically log onto the auction system and find their way to the web page detailing that specific offering or item. However, once the user receives that information as it exists at that time, the user is not presented any updated information regarding that offering afterwards. Therefore, if the potential bidder wanted to bid on a selected offering, but wanted to wait until the last possible second to do so, he might be lulled into thinking that a certain bid could successfully win the auction. For example, Bidder D pulls up the web page for Offering #443, and that web page lists the current high bid at $550, and states that the time remaining is 1 minute and 20 seconds. Because the figure displayed as the current high bid is not updated by the auction system, Bidder D might be lulled into thinking it is safe to wait until 5 seconds before the close of the auction on Offering #443 to submit a bid of $560. Unfortunately for Bidder D, other bidders could have been placing bids during that last 1 minute and 20 seconds without Bidder D's knowledge. This scenario might result in Bidder D submitting her bid of $560 at 5 seconds prior to the auction closing, but the current high bid with 5 seconds to go before the auction closes is actually $595. Accordingly, Bidder D would lose that auction. Therefore, it would be advantageous if the web page of all bidders interested in the auction of a certain item or offering be updated either after a predetermined amount of time, or each time a new bid is placed on that item or offering.

Another problem with current auction systems is that the seller or auction house will set a date and/or time at which the auction will end. In order to aid the bidders to ensure that their bid is placed prior to the auction's close, the seller or auction entity may choose to display the time remaining during which bids will continue to be accepted by the auction entity. However, bidders will often wait until the last possible second to submit their bid. Doing so presents various disadvantages. For example, if a Bidder G waits until the last possible second to submit his bid, it might not be processed and accepted before the auction period ends. Accordingly, Bidder G will not have his higher bid accepted by the auction system, and loses the auction. Similarly, even if Bidder G's last second bid is accepted by the auction system, Bidder G might still lose the auction to Bidder H if Bidder H had previously submitted a proxy bid with a limit higher than Bidder G's last-second bid. Such an auction system which automatically ends and accepts no more bids after a certain point in time is also disadvantageous to the seller because she could have received a higher price for the item being auctioned if the auction had not ended until every bidder that wished to participate submitted their best and final bid and that bid was accepted.

A further problem is that existing systems do not provide intelligent offering management for traders or broker intermediaries. Traders require information not only about the buyers sellers and products, but about the likelihood that a buyer will bid on a product.

Therefore, it would be advantageous if an auction system existed which provided buyer bidding likelihood information to traders that was based on information about the buyer's behavior in the system relative to the products being offered.

SUMMARY OF THE INVENTION

Accordingly, it is an advantage of the present invention to provide a computerized system for trading products which determines the likelihood that a buyer will bid on a product.

An advantage of the present invention is to provide a computerized system for trading products between buyers and seller; detailed product information; buyer activity information for each buyer that includes a frequency with which said buyer has accessed said computerized system for trading products, frequency with which buyer has viewed said product, and whether said buyer has viewed detailed information about said product; and historical information for each of said buyers that includes the number of other products that said buyer has bid on previously, number of winning bids from said buyer for other products; and a rank determined for each buyer relating to the likelihood that said buyer will bid on said product, said ranking determined based on said buyer activity information and said buyer historical information.

A further advantage of the present invention is to provide at least one document relating to said product which contains information different from the detailed product information.

A further advantage of the present invention is to provide buyer activity information for each of said buyers that includes whether said buyer has accessed said document.

A further advantage of the present invention is to provide information about whether a buyer has accessed the document based on whether the buyer has purchased the document.

A further advantage of the present invention is to provide historical information for each of said buyers further including the proximity of said buyer's losing bid in relation to the winning bid for each product offering in which the buyer's bid was not the winning bid.

A further advantage of the present invention is to provide historical information for each of said buyers including the rank of said buyer's losing bid in relation to the winning bid and all other bids for each product offering in which the buyer's bid was not the winning bid.

A further advantage of the present invention is to provide buyer activity information for each of said buyers that also includes the amount of time each of the buyers spent viewing the product on said computerized system.

A further advantage of the present invention is to provide a rank that includes placing each of the buyers into a predetermined category based on their likelihood of bidding.

A further advantage of the present invention is to provide a rank that includes a unique ranking of the likelihood of each of the buyers entering a bid for said product.

A further advantage of the present invention is to provide a rank that includes a score calculated based on quantitative measurements of buyer activity information and buyer historical information for each of the buyers.

A further advantage of the present invention is to further provide qualitative information about the likelihood of a buyer bidding on said product.

A further advantage of the present invention is to further provide acquisition preference information for each buyer, wherein the unique rank is determined based on said buyer activity information, the buyer historical information, and the buyer acquisition preferences.

A further advantage of the present invention is to further provide that the ranking is recalculated whenever the buyer activity information is updated based on additional buyer activity.

Another advantage of the present invention is that it provides a computerized system for trading products having at least one buyer; at least one seller offering at least one product for sale on said computerized system; a bid likelihood indicator for the buyer based on the buyer's likelihood of entering a bid on a product; a range of prices that said buyer would be willing to bid for said product; and a market assessment for each of said products determined based on the number of buyers whose likelihood of bidding on said product exceeds a predetermined threshold.

A further advantage of the present invention is to provide a bid likelihood indicator determined based on the buyer's activity in the system relating to said product.

A further advantage of the present invention is to provide a bid likelihood indicator determined based on the buyer's bidding history relating to other products offered on the system.

A further advantage of the present invention is to provide a bid likelihood indicator determined based on the buyer's activity in the system relating to the current product and buyer's bidding history relating to other products.

The foregoing and other objects, aspects, features, and advantages of the invention will become more apparent from the following description and from the appendices.

BRIEF DESCRIPTION OF THE FIGURES

The advantages and aspects of the present invention will be more fully understood in conjunction with the following detailed description and accompanying drawings, wherein:

FIGS. 5A through 5D are representative screen shots illustrating a form for sellers to list a financial product, in accordance with an embodiment of the invention.

FIG. 7 is a representative screen shot illustrating an input form used to search for a financial product, in accordance with an embodiment of the invention;

FIG. 8 is a representative screen shot illustrating the results of a search for a financial product, in accordance with an embodiment of the invention;

FIG. 10 is another representative screen shot illustrating the financial product information provided to a user, in accordance with an embodiment of the invention;

FIG. 12 is a representative screen show illustrating financial product statistical information provided to a user, in accordance with an embodiment of the invention;

FIG. 13 is a representative screen show illustrating financial product information provided to a user, in accordance with an embodiment of the invention;

FIG. 14 is a representative screen shot showing an example of a portion of the mortgage note documentation available to a user, in accordance with an embodiment of the invention;

FIG. 15 is a representative screen shot showing an example of a portion of the title insurance documentation available to a user, in accordance with an embodiment of the invention;

FIG. 20 is a representative screen shot illustrating a form for pricing a financial product, in accordance with an embodiment of the invention;

FIG. 21 is a representative screen shot illustrating a form for performing a computation on a financial product, in accordance with an embodiment of the invention;

FIG. 22 is a representative screen shot illustrating the results of the computation requested in the screen shot of FIG. 21, in accordance with an embodiment of the invention;

FIG. 24 is a representative screen shot illustrating a form for performing a foreclosure computation on a financial product, in accordance with an embodiment of the invention;

FIG. 25 is a representative screen shot illustrating the results of the computation requested in the screen shot of FIG. 23, in accordance with an embodiment of the invention;

FIG. 26 is a representative screen shot illustrating a form for performing an extension/restructure computation on a financial product, in accordance with an embodiment of the invention;

FIG. 27 is a representative screen shot illustrating the results of the computation requested in the screen shot of FIG. 25, in accordance with an embodiment of the invention;

FIG. 28 is a representative screen shot illustrating a form for performing a DPO/Early Payoff computation on a financial product, in accordance with an embodiment of the invention;

FIG. 29 is a representative screen shot illustrating the results of the computation requested in the screen shot of FIG. 27, in accordance with an embodiment of the invention;

FIG. 31 is a representative screen shot illustrating loans that are available for bidding, in accordance with an embodiment of the invention;

FIG. 32 is a representative screen shot illustrating the proxy bid form, in accordance with an embodiment of the invention;

FIG. 33 is a representative screen shot illustrating the submit a bid form used by bidders to submit a bid, in accordance with an embodiment of the invention;

FIG. 34 is a representative screen shot illustrating the bid verification form used by bidders to verify their bid, in accordance with an embodiment of the invention;

FIG. 35 is a representative screen shot illustrating the bid not accepted form informing a bidder that their bid had not been accepted, in accordance with an embodiment of the invention;

FIG. 36 is a representative screen shot illustrating that a bid had been accepted and that the bidder was the current high bidder, in accordance with an embodiment of the invention;

FIG. 37 is a representative screen shot illustrating the bid status form, in accordance with an embodiment of the invention;

FIG. 38 is a representative screen shot illustrating the bid status form prior to submitting a bid, in accordance with an embodiment of the invention;

FIG. 41 is a representative screen shot illustrating an aggregate offering, in accordance with an embodiment of the invention;

FIG. 42 is a representative screen shot illustrating the a single offering, in accordance with an embodiment of the invention;

FIG. 43 is a representative screen shot illustrating the status of related items being auctioned, in accordance with an embodiment of the invention;

FIG. 45 is a representative screen shot illustrating the auction status portion of the bid status form, in accordance with an embodiment of the invention;

FIG. 46 is a representative screen shot illustrating the status of a bidder's best bid on a specific offering and illustrating the bid history link, in accordance with an embodiment of the invention;

FIG. 47 is a representative screen shot illustrating the operation of the bid history link and form, in accordance with an embodiment of the invention.

FIG. 49 is a representative screen shot of the summary view of the Auction Monitor Form, in accordance with an embodiment of the present invention.

FIG. 50 is a representative screen shot of the detailed view of the bidding history of a specific auction, in accordance with an embodiment of the present invention.

FIG. 51 is a representative screen shot of the detailed view of the Setup Form, in accordance with an embodiment of the present invention.

FIG. 54 illustrates the buyer and product data as displayed according to an embodiment of the present invention.

FIG. 55 illustrates detailed buyer information according to an embodiment of the present invention.

Figure 1:
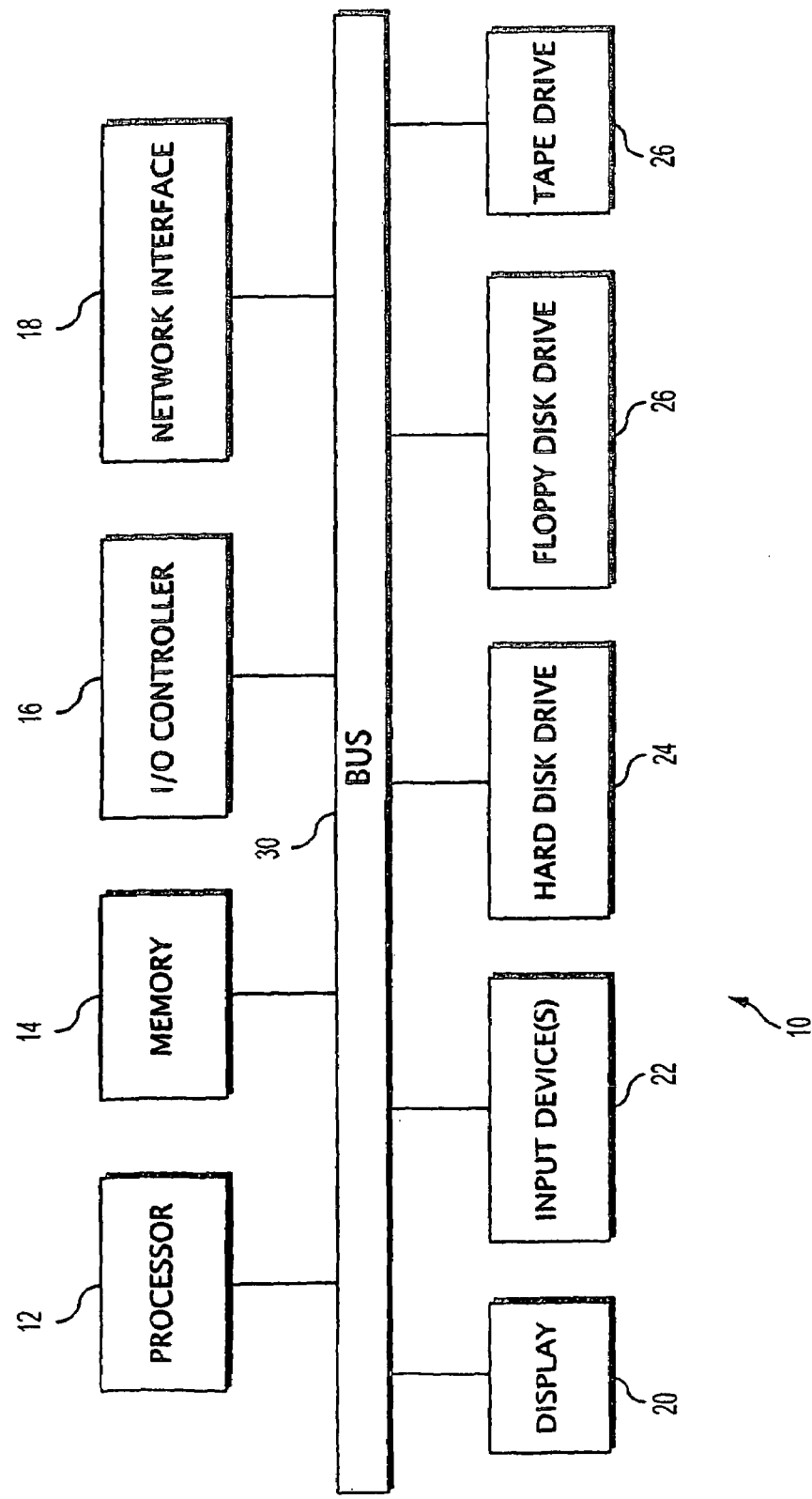
FIG. 1 is an illustration of a computer system in which at least one embodiment of the present invention can be embodied.

The drawings are not necessarily to scale, emphasis instead generally being placed upon illustrating the principles of the invention.

DETAILED DESCRIPTION

Although any one of the available auction methods could be used to auction various products and services, such as a closed auction, the present invention will be discussed in relation to the English forward auction type for convenience. It is understood that the present invention is also applicable to other auction types, such as sealed bid auctions, for example.

The pricing premium is the amount of proceeds a seller receives that is in excess of an offering's reserve price. This pricing premium has been maximized for items that are uniform or homogenous in nature and that can be valued with relative accuracy. For example, in regard to an offering class of commercial loans, the pricing premium is greater for loan packages that are clean performing loans.

An inventive embodiment achieves an increased pricing premium because the online English auction format enhances competition by increasing the bidder's level of control and ability to compete. Specifically, an inventive embodiment in an online English auction format garners an increased number of bidders and bidder activity on comparison to a closed auction format. This increased bidding results in subsequent increased pricing premiums. Although simply increasing the number of bidders will not necessarily lead to higher proceeds, the increased level of participation will positively impact other competitive issues, thereby driving up the pricing premium.

Typically, the bidding in an English forward auction is open. Therefore, in other auction systems all the participants bidding on a specific offering or item know the cover bid and the bidder's identity or handle, at any time they access the offering's web page. Additionally, every bidder can view how other bidders are participating in a specific offering by viewing the bid history web page, which displays the history for all bidders. Such market feedback allows each bidder to validate their own level of participation and provides a comfort level that their own bid is not out of market. However, too much information about other bidders may cause a bidder to suspend their bidding. In one embodiment the bidding is anonymous. Therefore, a bidder can only learn limited information about the auction, such as the current high bid. By not providing the bidder with other bidders' bid histories for a given item, each bidder only knows that she is competing against at least one or more bidders, but cannot determine where any other bidder dropped out of the bidding competition. This satisfies the requirement that allows the bidder know that her bid is not out of market, but prevents a bidder from experiencing "buyer's remorse" by comparing her own bid to those bidders who dropped out of the competition at a lower bid amount. Because of this, the present invention results in higher pricing premiums. The present invention also creates higher pricing premiums by preventing the bidders from learning each other's identity. Therefore, collusion among the bidders is prevented. Similarly, by extending the close of the auction each time a new bid is received, the present invention ensures that each bidder submits their best and final offer. Consequently, the offering is sold to the genuine highest bidder, thereby increasing the pricing premium.

The present invention accomplishes these and other improvements by employing the system described herein. As used herein, the Internet refers at least to a collection of networks and gateways that use the transmission control protocol/Internet protocol (TCP/IP) suite of protocols to communicate with one another. The World Wide Web (WWW) refers at least to a set of inter-linked hypertext documents residing on hypertext transport protocol (HTTP) servers. As used herein, the WWW also refers at least to documents accessed on secure servers, such as HTTP servers (HTTPS), which provide for encryption and transmission through a secure port. WWW documents, which may be referred to herein as web pages, can, for example, be written in hypertext markup language (HTML). As used herein, the term "web site" refers at least to one or more HTML documents and associated files, scripts, and databases that may be presented by an HTTP or HTTPS server on the WWW. The term "web browser" refers at least to software that lets a user view HTML documents and access files and software related to those documents. The term "web page" refers to the display of one page of a web site which displays one or more of the HTML documents and/or data from the associated files, scripts and databases.

Systems and methods in accordance with the invention can be implemented using any type of general purpose computer system, such as a personal computer (PC), laptop computer, server, workstation, personal digital assistant (PDA), mobile or wireless communications device, interconnected group of general purpose computers, and the like, running any one of a variety of operating systems. An example of a general-purpose computer system 10 usable with at least one embodiment of the present invention is illustrated in FIG. 1.

Referring briefly to FIG. 1, the general purpose computer system 10 includes a central processor 12, a main memory unit 14 for storing programs and/or data, an input/output controller 16, a network interface 18, a display device 20, one or more input devices 22, a fixed or hard disk drive unit 24, a tape drive unit 26, a tape drive unit 28, and a data bus 30 coupling these components to allow communication therebetween.

The central processor 12 can be any type of microprocessor, such as a PENTIUM processor, made by Intel of Santa Clara, Calif. The display device 20 can be any type of display, such as a liquid crystal display (LCD), cathode ray tube display (CRT), light emitting diode (LED), and the like, capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment of the present invention, the network interface 18 enables the computer system 10 to connect to a computer network such as the Internet.

Those skilled in the art will appreciate that computer systems embodying the present invention need not include every element shown in FIG. 1, and that equivalents to each of the elements are intended to be included within the spirit and scope of the invention. For example, the computer system 10 need not include the tape drive 28, and may include other types of removable media drives, such as compact disk read-only memory (CD-ROM) drives. CD-ROM drives can, for example, be used to store some or all of the databases described herein.

In at least one embodiment of the invention, one or more computer programs define the operational capabilities of the computer system 10. These programs can be loaded into the computer system 10 in many ways, such as via the hard disk drive 24, the floppy disk drive 26, the tape drive 28, or the network interface 18. Alternatively, the programs can reside in a permanent memory portion (e.g., a read-only-memory (ROM)) chip) of the main memory 14. In another embodiment, the computer system 9 can include specially designed, dedicated, hard-wired electronic circuits that perform all functions described herein without the need for instructions from computer programs.

In at least one embodiment of the present invention, the computer system 10 is part of a client-server system, in which a client sends requests to a server and a server responds to requests from a client. That is, the computer system 10 can be either a client system or a server system. In one embodiment, the invention is implemented at the server side and receives and responds to requests from a client, such as a reader application running on a user computer.

The client can be any entity, such as a the computer system 10, or specific components thereof (e.g., terminal, personal computer, mainframe computer, workstation, hand-held wireless device, electronic book, personal digital assistant, peripheral, etc.), or a software program running on a computer directly or indirectly connected or connectable in any known or later-developed manner to any type of computer network, such as the Internet. For example, a representative client is a personal computer that is x86-, PowerPC.RTM., PENTIUM-based, or RISC-based, that includes an operating system such as IBM.RTM, LINUX, OS/2.RTM. or MICROSOFT WINDOWS (made by Microsoft Corporation of Redmond, Wash.) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications. A client may also be a notebook computer, a handheld computing device (e.g., a PDA), an Internet appliance, a telephone, an electronic reader device, or any other such device connectable to the computer network.

The server can be any entity, such as the computer system 10, a computer platform, an adjunct to a computer or platform, or any component thereof, such as a program that can respond to requests from a client. Of course, a "client" can be broadly construed to mean one who requests or gets the file, and "server" can be broadly construed to be the entity that downloads the file. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

Embodiments of the invention can be implemented using computer technologies such as software applications, computer-readable program media, data structures, carrier wave signals, user interfaces, and application program interfaces. For example, software embodying the present invention, in one embodiment, resides in at least one application running on the computer system 10. In at least one embodiment, the present invention is embodied in a computer-readable program medium usable with the computer system 10. In at least one embodiment, the present invention is embodied in a data structure stored on a computer or a computer-readable program medium. In addition, in one embodiment, the present invention is embodied in a transmission medium, such as one or more carrier wave signals transmitted between the computer system 10 and another entity, such as another computer system, a server, a wireless network, etc. The present invention also is embodied in an application programming interface (API) or a user interface. In addition, the present invention, in one embodiment, is embodied in a data structure.

In at least one embodiment, the invention provides a system that enables interaction between a number of parties that can participate in transactions involving auctions or involving financial products, such as debt transactions. In accordance with at least one embodiment of the invention, analysts, bidders and sellers of products or services, as well as other interested parties can access a computerized system via a website or portal, over a computer network to access a variety of debt related features and functions. At least some embodiments of the invention provide features and functions whereby potential buyers can search for, view information about, obtain documentation for, originate, and bid on, products and services. These products can include by way of example and limitation, boats, stamps or tickets to sporting events, which are offered for auction to bidders by sellers. These products can also include financial products such as commercial loans, offered for sale by sellers. The services offered for auction can include development of software, or medical services.

In addition, at least some embodiments of the invention provide features and functions whereby potential sellers can upload information about their offering. These embodiments also allows potential sellers to list, compute a price for, provide documentation for, originate, and accept bids on the offered products and services, which include commercial loans. Further, at least some embodiments of the invention permit users, including buyers, sellers, and entities that are neither buyers nor sellers, to search for, price, and obtain information about the offerings put up for auction, which include financial products.

Throughout this disclosure, the terms "buyer" and "bidder" are used interchangeably, although it should be understood that at least some embodiments of the invention, as described herein, the "buyer" is the "bidder" that wins the bidding process. Also throughout this disclosure the term "auction house" and auction system are used interchangeably, and mean the entity which accepts offerings from sellers and provides bidders with the opportunity to bid on those offerings.

Figure 2:
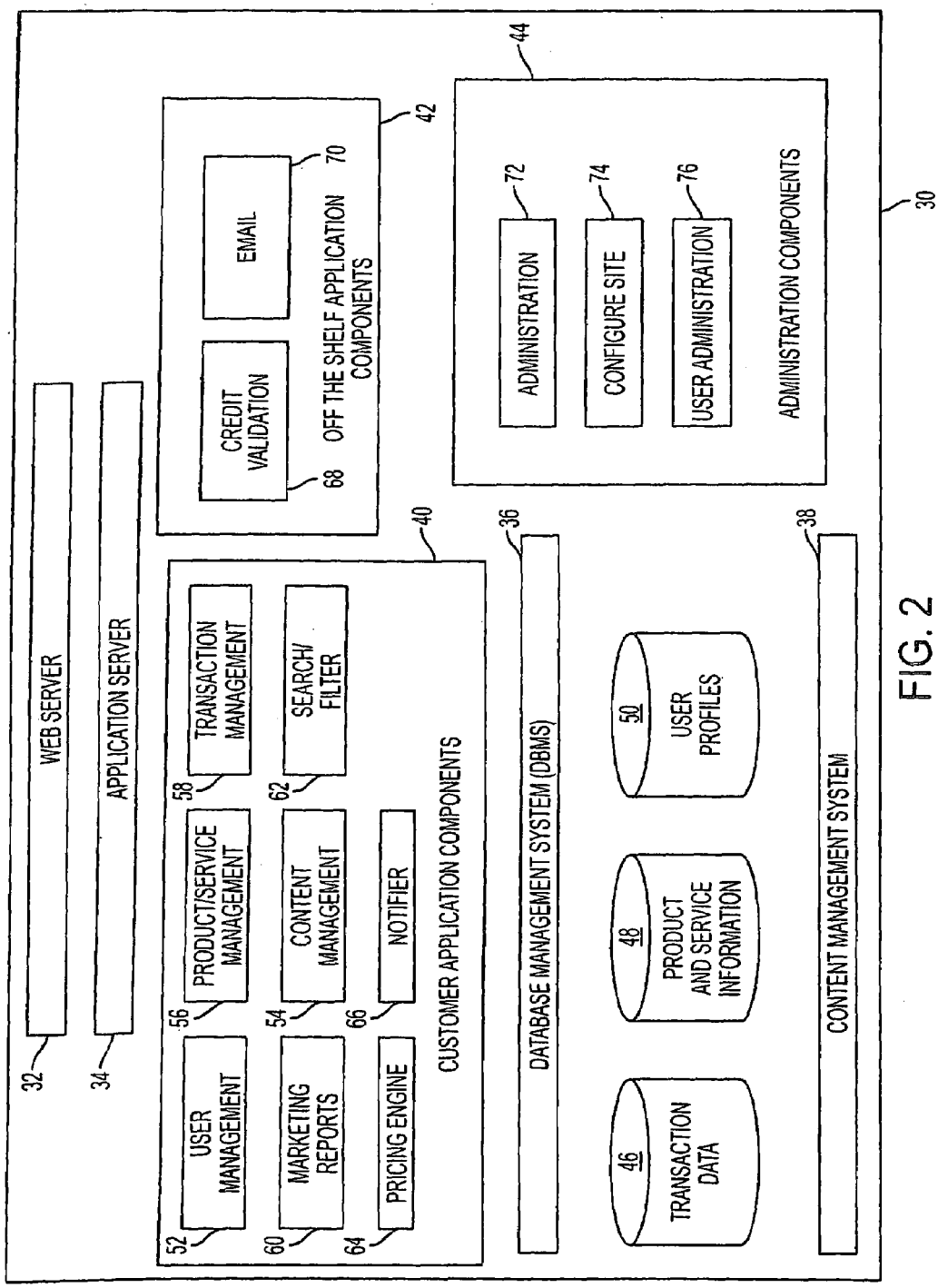
FIG. 2 is a block diagram giving an architectural overview in accordance with one embodiment of the invention.

FIG. 2 is a block diagram giving an architectural overview of a system 30 implemented in accordance with one embodiment of the present invention. The system 30 of FIG. 2 is made available to potential bidder, sellers and other users, in at least one embodiment, through a web site accessible to users of a global information network such as the Internet. The system 30, in one embodiment, includes a set of infrastructure components which include but are not limited to a Web Server 32, an Application Server 34, a database management system (DBMS) 36, and a Content Management System 38. The system 30 also includes Application Components such as Custom Application Components 40 and Off-The-Shelf Application Components 42, as well as includes Administration Components 44. Moreover, the system 30 also includes Database Components, which include Transaction Data 46, Product and Service Information database 48, and User Profiles 50. Each component or subsystem of the system 30 can be in operable communication with at least one other component of the system 30, as necessary.

In one embodiment of the invention, the Web Server 32 includes the Microsoft Internet Information Server (IIS), manufactured by Microsoft Corporation, Redmond, Wash. The server software for the Microsoft IIS uses HTTP to deliver WWW documents, incorporates various functions for security, permits common gateway interface (CGI) programs, and provides for Gopher and file transfer protocol (FTP) services. However, those skilled in the art will recognize that other types of web server software may be used for the Web Server 32 in accordance with the invention. The Application Server 34, in at least one embodiment, includes Microsoft Active Server Pages (ASP), which enable server side scripting (versus client-side scripting). An ASP can, for example, contain code written in visual basic script (VB Script) or JavaScript (Jscript). The Application Server 34 can also comprise other types of application server programs such as Unix-based CGI scripts.

The DBMS 36, in one embodiment, is achieved using the Microsoft structured query language (SQL) system, but other DBMS systems, such as those manufactured by Oracle and Sybase, are of course usable in accordance with the invention. The content pages of the Content Management System 38, in one embodiment, include a plurality of content pages, such as content pages displaying financial product information, due diligence documents, and third party information. Examples of some of these content pages are provided herein. In one embodiment, the web pages display various type of information in various formats. For example, the web pages displaying content include HTML templates, as well as and pages for dynamic and static content pages, a splash page, pages for each of the present invention's products or capabilities (e.g., user registration, viewing loan documents, etc.), link pages, and general content pages. This list of web content pages is not limiting; those skilled in the art will of course recognize that many other types of content pages can be provided in accordance with the invention.

Referring again to FIG. 2, the Custom Application Components 40 includes components developed to accomplish some of the functions of the system 30 performed by the present invention as described herein. In at least one embodiment, the Custom Application Components 40 includes components such as User Management 52, Content Management 54, Product/Service Management 56, Transaction Management 58, Marketing Reports 60, Search/Filter 62, Pricing Engine 64, and a Notifier 66.

User Management 40 is a subsystem providing user management functions for users of the system 30. These users can include buyers and sellers of any type of product or service that can conceivably be sold at auction. In at least one embodiment, these users can be sellers and potential sellers of financial products, buyers and potential buyers of financial products, so-called market observers (users who can view the transactions occurring on the site and/or the financial products available on the site, but who are not necessarily participating in any transactions), visitors, "guest" users, auditing personnel, etc. For example, in at least one embodiment, the User Management 40 subsystem provides an interface to data such as user profile data, user preference data, stored search/filter results, lists of financial products for which a user has purchased due diligence or other information, a user registration component to handle initial site registration, login/authentication functions, an interface that allows a system administrator or quality control person to "activate" the ability for a Buyer or Seller to conduct transactions, and the like.

Content Management 54 is a subsystem providing interface to the Content Management System (CMS) 38 that allows for the management of all of the content related to the items listed within the system 30 which are being auctioned off. In one embodiment, the Content Management System 38 manages all of the content related to the financial products listed with the system 30. Content Management 54, in at least one embodiment, includes a dynamic data-driven user content display component to handle access to and display of the site content based on the type of user (buyer, Seller, Quality Control Rep, Admin, etc.). In addition, Content Management 54, in one embodiment, includes an interface permitting the management and download of templates used by Sellers to prepare the documentation for financial products they want to sell, along with the ability to upload this information to the site. Examples of this interface are provided herein.

Product/Service Management 56 is a subsystem for allowing a Seller to specify a product or service that they wish to offer for auction. In one embodiment the Product/Service Management 56 subsystem allows the Seller to specify the financial product they wish to offer for auction (e.g., loan, security, certificate of deposit, mutual fund, etc.). The Product/Service Management 56 subsystem also allows a Buyer to specify the type of product or service that they are interested in bidding on. In one embodiment the Product/Service Management 56 subsystem allows the Buyer to select or specify the type of financial product she is interested in buying. The Product/Service Management 56 subsystem also matches Buyers to Sellers based on the criteria specified by each.

Product/Service Management 56 subsystem, in at least one embodiment, includes screens and forms used to collect information about the product or service being offered for auction by the Seller. For example, if the item being offered for auction by the Seller was a car, the Product/Service Management 56 subsystem can include features such as vehicle registration reports from every Department of Motor Vehicles from every state it was ever registered in, accident reports for the entire time the vehicle was owned by any particular user, as well as any other information which can be provided by the Seller, a third party, and/or, the administrator of the system 30, including pricing of the product or service being offered. In one embodiment the Product/Service Management 56 subsystem can include features such as financial product summaries, detailed financial product information (such as pictures, maps, text and spreadsheets), which can be provided by the Seller, a third party, and/or, the administrator of the system 30, and financial product pricing. In addition, the Product/Service Management 56 subsystem, in one embodiment, includes all screens and logic to display financial product information to potential Buyers. These features and functions are illustrated and described more fully herein.

The pricing of a product or service can be provided in a number of ways. For example, if the product is a car, the most commonly accepted method of pricing that car would be to have the Seller enter certain characteristics of the car, and compare those characteristics to a similarly situated car in the Blue Book. Once a similarly situated car was located in the Blue Book, the Pricing Engine subsystem 64 could suggest to the Seller that they offer their car for about the same price as the Blue Book value. Alternatively, if the product being auctioned off was a package of commercial loans, the financial product pricing in accordance with an embodiment of the present invention can be determined by using the Pricing Engine subsystem 64, described more fully herein. In at least one embodiment, the financial product pricing is determined by an analyst (i.e., a person). In at least one embodiment, the financial product price is determined using a combination of information from both the Pricing Engine 64 and the analyst. However, in at least one embodiment, the Pricing Engine 64 is entirely automatic.

In one embodiment of the invention, the characteristics of the car being sold and the Seller's offering price are provided to a prospective Buyer or other user. In an embodiment of the present invention, financial product information pertaining to the commercial loan package is provided in summary form to a prospective Buyer or other user. In one embodiment the summary form of the commercial loan package is generated automatically, using templates a user receives from information provided in forms filled out by a Seller. In at least one embodiment, the summary form of financial product information is created at least in part by an individual accessing the information.

Buyers can obtain detailed information and/or materials about a product or service as well. For example, in regard to a financial product the potential Buyer could find certain due diligence information, such as certificates of insurance. Alternatively, the potential Buyer of a medical service could find out whether the doctor had ever been charged with malpractice, or ever had her license revoked by a state licensing board. In at least one embodiment, a fee can be charged for at least some of the detailed information about the product or service being auctioned off. In addition, in one embodiment of the invention, Buyers cannot bid on or purchase a financial product for sale unless the system 30 has proof that the Buyer has at least been provided with the appropriate due diligence information. This feature, provided in at least one embodiment of the invention, can help to satisfy National Association of Securities Dealers (NASD) requirements. For example, in one embodiment, this proof is satisfied by a Buyer's purchasing the due diligence materials. Examples of these materials and this process are discussed in more detail herein.

In at least one embodiment, Product/Service Management subsystem 56 includes an interface permitting a Seller to upload data and materials related to the product or service offered for auction. In at least one embodiment, a user can request the generation of a detailed summary of the product or service the Seller is offering for sale, so that potential buyers can have access to that information. As noted previously, the generation of the detailed product or service summary can be automated, can be accomplished by one or more persons, or a combination of the two. In at least one embodiment, selected individuals (called "Quality Control" representatives and managers) are assigned to manage and monitor one or more products or services associated with one or more Sellers. Therefore, in at least this embodiment, the Product/Service Management subsystem 56 includes screens and logic to allow a Quality Control Representative to view the list of products and/or services they are responsible for. In at least this embodiment the Quality Control Manager can allocate and assign loans to Quality Control Representatives.

For example, a Quality Control Representative can assist a bidder with questions about a financial product for sale, any information regarding or documentation for the financial product being auctioned off, questions about the bidding process, or questions about the Seller offering a certain financial product. Quality Control Representatives, in one embodiment, have access to at least a portion, if not all, of the Seller and Buyer information (including, for example, lists of financial products that a Buyer has bid on, lists of documentation associated with a given financial product, etc.), and can monitor the bidding process for one or more financial products. Quality Control Managers, in one embodiment, have access to at least a portion of the Seller and Buyer information, as well, and further have access to and can monitor the actions of the Quality Control Representatives.

Transaction Management 58, in one embodiment, is a subsystem that provides for the handling and tracking of transactions, such as between Buyers and Sellers. In an embodiment, the Transaction Management subsystem 58 handles and tracks among other things, which Bidder won a certain offering and what price the bidding closed at. Transaction Management subsystem 58 includes substantially all screens and logic to allow a Buyer to bid on or to buy a specific product or service offered by a Seller. The Transaction Management subsystem 58 also allows the Seller to accept or reject a specific bid from a Buyer. In at least one embodiment, the Transaction Management subsystem 58 includes logic and/or rules that permit the system 30 to take action on behalf of a Buyer or a Seller. For example, Transaction Management subsystem 58 can include logic whereby it is authorized to accept a bid from a Buyer on behalf of a Seller if a specified condition (e.g., price) is met. In a similar example, Transaction Management subsystem 58 can include logic whereby it is authorized to place bids for a financial product on behalf of a Buyer, in accordance with one or more conditions.

In one embodiment, Transaction Management subsystem 58 includes logic to implement one or more types of auctions of a financial product offered for sale, including sealed-bid format and English forward auction format. In one embodiment, the sealed bid format presents the bidder with a form with which to enter the bid, and provide any contingencies attached to the bid. Such a contingency would state "This bid is valid if the seller can substantiate that the borrower is willing to close on Sep. 19, 2001." In the English auction format, bids are accepted without contingencies.

In one embodiment, the Transaction Management subsystem 58 can also include the logic and screens required to allow Buyers and Sellers to end or close the transaction (either by completing it or aborting it) using the system 30. In at least one embodiment, however, closing the transaction is accomplished outside of the system 30.

Referring again to FIG. 2, the Marketing Reports subsystem 60 includes logic and forms to interface with tools such as Crystal Reports (available from Crystal Decisions, Inc. of Palo Alto, Calif.) and the like to generate ad hoc marketing reports. In one embodiment, the Marketing Reports subsystem 60 includes design and implementation within Crystal Reports or similar tool containing approximately twelve standard marketing reports.

The Search/Filter subsystem 62 is a component that matches search criteria provided by a user, such as a Buyer or third party, with information provided by a Seller regarding the product or service to be auctioned off. Preferably the Seller provided information would have been previously uploaded into the system 30. In one embodiment, searches (also referred to herein as a product or service "filter," e.g., "a loan filter") are filtered by one or more criteria. For example, the Search/Filter subsystem 62 of one embodiment can filter a search for a boat by criteria which include Make, Model, Year Built, Length, Condition and Geographic Location. Similarly, a further embodiment can filter a search for a certain package of loans according to Geographical Location, Loan Type, Loan Amount, Interest Rate Range, Maturity Status, Loan Quality (four subcategories), and/or other criteria, as those skilled in the art will appreciate. Examples of searches and filtering in accordance with an embodiment of the invention are provided herein. In one embodiment, the Search/Filter subsystem 62 includes substantially all forms and logic to perform the search function and present the information back to the user (e.g., a Buyer) conducting the search.

The Pricing Engine 64 is a subsystem that computes a price for the object being auctioned off, and offers that computed price to Sellers, Buyers, Analysts or Quality Control Reps. In one embodiment, the Pricing Engine subsystem 64 would accept from the Seller the characteristics of the car being offered at auction, compare those characteristics to similarly situated cars which are stored in the Product and Service Information database 48, and suggest a price that modifies the Blue Book price according to the characteristics that differ from the car being auctioned off. In an embodiment where a loan is being offered for auction, the Pricing Engine subsystem 64 uses loan data received from the Seller, information (such as the current prime interest rate) obtained from third parties, historical financial product trade information, and/or information provided by an Analyst to generate data that is used to compute a price for the offered loan. For example, in one embodiment, such data is provided to a spreadsheet program, such as MICROSOFT EXCEL (available from Microsoft Corporation of Redmond, Wash.), to price the loan. The resulting calculations are stored in the Product and Service Information database 48 and thereby made available to the Buyers, the Seller, Analysts or Quality Control Reps.

The Pricing Engine subsystem 64, in one embodiment, includes substantially all screens and logic to allow a user to specify the loan to "price." In one embodiment, the Pricing Engine 64 also bases its computations on additional loan pricing parameters, such as those provided by a Seller or an Analyst. In one embodiment, the Pricing Engine 64 includes a "back-end" process that runs an instance of MICROSOFT EXCEL using the loan data, captures the MICROSOFT EXCEL output, and stores the information in the Product and Service Information database 48. Examples of the operation of the Pricing Engine 64, in accordance with an embodiment of the invention, are provided herein. The Pricing Engine subsystem 64, in one embodiment, includes logic to generate notifications to parties (e.g., Buyers, Sellers, etc.) to a transaction or potential transaction.

In at least one embodiment, the Pricing Engine 64 can provide a substantially "quick" estimate of the value of the product or service being offered. This feature is referred to in the example embodiments shown herein as "Quick Price". The price estimate is based at least in part on one or more assumptions. For example, the assumption might be that car being auctioned is in good and working order. Similarly, an assumption for another embodiment is that a given financial product being auctioned off will perform according to its stated terms.

In one embodiment, a Notifier subsystem 66 generates these and other notifications. For example, Sellers can be notified, such as by a telephone call, letter, electronic mail message ("email"), wireless transmission, facsimile ("fax"), automated message, or other appropriate notification whenever a Buyer has expressed interest in a financial product that the Seller is selling, such as when a Buyer has ordered due diligence materials relating to a financial product that the Seller is auctioning. In another example, when a Buyer who has viewed a product or service being auctioned off and ordered information corresponding to that product or service can be notified as to the closing date for bids on the desired product or service. In still another example, a bidder who has bid on a financial product can receive notifications as to who has "won" or "lost" the bidding process.

Referring again to FIG. 2, the Off-the-Shelf Application Components 42 can include virtually any type of application component, including those regularly used in electronic commerce web sites, such as Credit Validation 68 and E-Mail 70. The Credit Validation subsystem 68, on one embodiment, is an interface to an off-the-shelf credit card validation system used to handle the acceptance of payment for information about the product or service being auctioned off. For example, if the product being auctioned off is a car, the Bidder can pay for and obtain the vehicle's accident history and/or odometer readings for every year the car registered at a given department of motor vehicles. The Bidder can also pay, via the Credit Validation subsystem 68 for detailed financial product summaries, due diligence information, and other information provided to a Buyer or potential Buyer. Credit Validation subsystem 68, in one embodiment, includes substantially all forms and logic to allow the Buyer to initiate the interaction with the Credit Validation 68, and to authorize the purchase, such as via a credit card or other suitable payment mechanism.

In accordance with one embodiment of the invention, E-Mail 70 is an off-the-shelf component (such as MICROSOFT OUTLOOK) employed to allow a Buyer, Seller, or other entity to receive alerts from the system 30 when events impacting a product or service being auctioned off occurs. For example, a Buyer can receive notification when a new contingency has been added to the boat they might be interested in. Alternatively, a Bidder can receive notification when new due diligence materials become available, when a condition to the loan (e.g., term) has changed, when a bid higher than the Buyer's bid has been submitted, etc. The E-Mail subsystem 70, in one embodiment, includes logic that detects these events and includes software to generate the e-mail using the commercial e-mail package.

The Administration Components 44 of at least one embodiment of the invention include Administration 72, Configure Site 74, and User Administration 76. The Administration subsystem 72 is the administration tools used with the system 30. For example, in one embodiment the administration tools are the standard administrative tools provided with the Web Server 32, Application Server 34, DBMS 36, and Off-the-Shelf Components 42. In another embodiment, depending on the final reporting requirements, Administration Components 44 include tools such as third party site monitoring or usage analysis/reporting tools.

The Configure Site subsystem 74 is, in one embodiment, a site configuration component. This is a set of tools to enable an entity such as a Site Administrator to configure the web site associated with the system 30. Depending on specific requirements, these tools can be developed as a web-based application or as a standalone client/server application.

User Administration 76 is, in one embodiment, a user administration component and includes a set of tools to enable an entity such as a Site Administrator to administer users. User Administration 76 provides add, delete, and modify functions. Depending on specific requirements, User Administration 76 can, for example, be a web-based application or can operate as a standalone client/server application.

The components of the database for the system 30, in accordance with one embodiment of the invention, include databases for Transaction Data 44, Product and Service Information 48, and User Profiles 50. The Transaction Data database 44 contains information used to track all transactions that occur on the site between Bidders and Sellers of the products and services being auctioned off. The Transaction Data database 44 allows entities such as Quality Control personnel to obtain transaction history of any product or service offered for sale in connection with the system 30. The transaction history is, in one embodiment, used to help compute a price for the offered product or service.

The Product and Service Information database 48 contains information on each product or service being auctioned which was submitted to the site and, in at least one embodiment, includes links to all associated supporting materials for a given product or service. These supporting materials can include, for example, due diligence materials, summary information, related third party information such as maps and demographic profiles.

The User Profiles database 50 contains user profile information. In at least one embodiment, User Profiles 50 stores "site-wide" user attributes such as username, associated passwords, Buyer preferences, Seller preferences, payment information, etc. This information may vary depending on the type of user (e.g., Buyer vs. Seller vs. Quality Control, etc.).

In one embodiment, the configuration of FIG. 2 is implemented using at least one web server, one application server, and one database server. In this embodiment, this configuration can be used regardless of whether NT or UNIX is used as the technology platform. This configuration has the ability to scale by adding additional web servers, application servers, database servers and bandwidth. Moreover, these technology platforms have the ability to scale by adding additional processors, memory and disk space. In addition, in another embodiment, each database is segmentable and scaleable.

In yet another embodiment, the invention is implemented with fault tolerant features. For example, failure of the web servers and application servers of the system 30 are covered by complete machine redundancy (each of the initial machines is identical) coupled with an appropriate load balanced solution (such as the LOCAL DIRECTOR available from Cisco Systems of San Jose, Calif.).

In another example, failure of the database servers of the system 30 is covered by use of reliable components with built in redundancy (power supplies, CPUs, memory) as well as complete machine redundancy. In still another example, using a redundant array of independent disks (RAID) for the database and disk mirroring for the Web servers covers disk failure. In still another embodiment, the system of the invention is hosted at an appropriate data center (such as NaviSite or the like) with firewall services, load balancing services, burstable bandwidth, room for growth and appropriate network/infrastructure redundancy.

Figure 3:
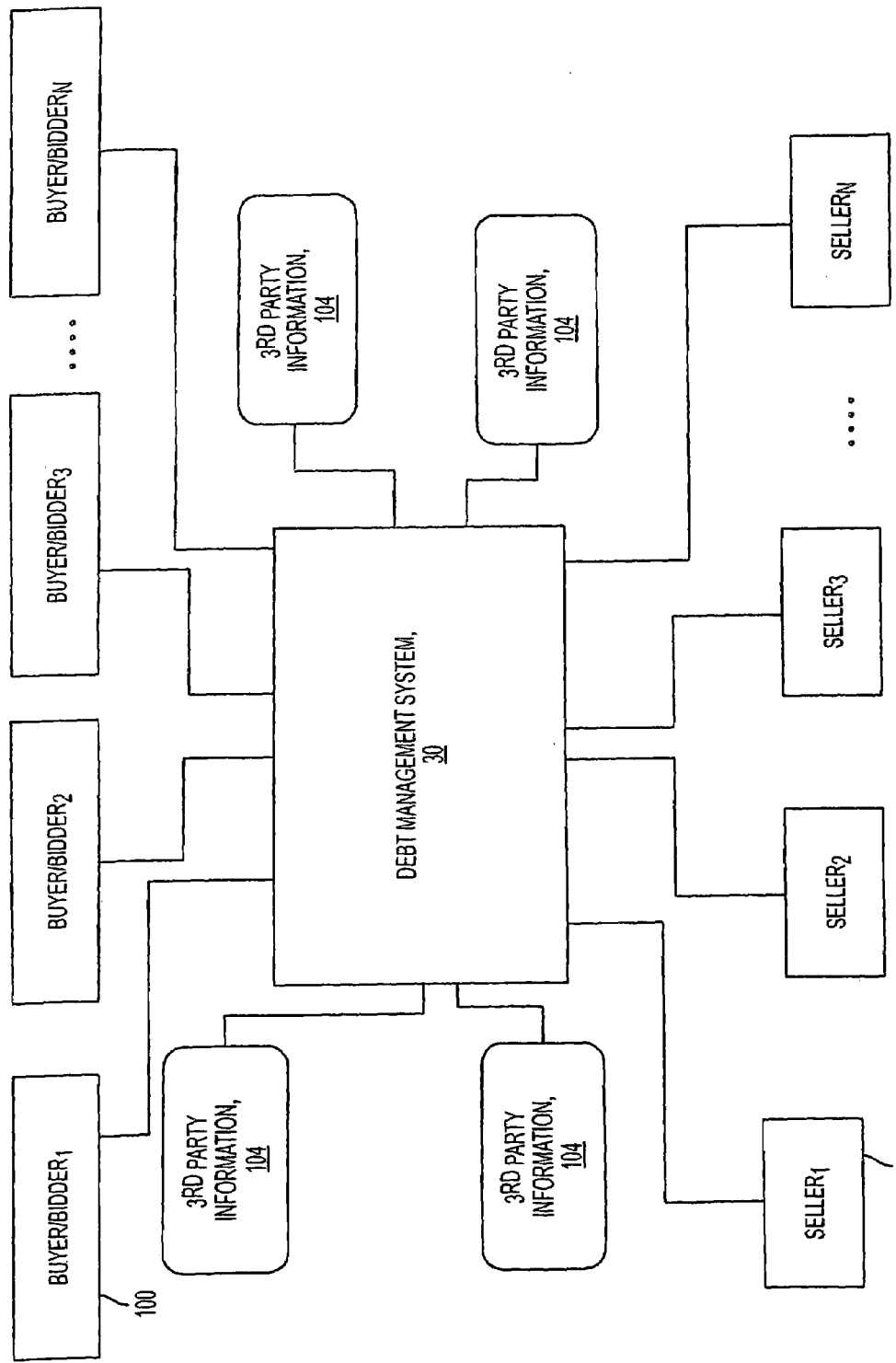
FIG. 3 is a block diagram providing an overview of the interaction of the system of an embodiment of the invention with buyers, sellers, and third parties.

FIG. 3 is a block diagram providing a perspective of how an embodiment of the system 30 of the present invention operates in an environment of Bidders 100 (referred to herein interchangeably as "Buyers" and "Bidders"), Sellers 102, and third parties 104. The Bidders 100 are entities, such as individuals or organizations, which want to buy or bid on the product or service being offered by the Seller 102.

In accordance with one embodiment of the invention, a Bidder 100 is an entity, such as a person, organization, or other user of the system 30, who is interested in getting information about (and possibly purchasing) a product or service, such as a boat or a loan, which is being sold by a Seller via an auction. A Buyer can bid on financial products available for sale by Sellers 102 via the auction house's system 30. In one embodiment, the category of Buyers 100 includes both those entities that have registered with the system 30 ("registered Buyers") and those who have not ("Guests"). In one embodiment of the invention, Guests have limited ability to access the information that is available to registered Buyers. Also, FIG. 3 illustrates, the auction house's system 30 is capable of interacting with any number of Bidders 100 and Sellers 102. Although only four third parties 104 are illustrated in FIG. 3, any number of third parties 104 can interact with the system.

In accordance with one embodiment of the invention, a Seller 102 is an entity, such as a person or organization, offering one or more products or services, such as cars, boats, baseball cards, commercial loans, legal services, for sale. A Seller 102 also can be an entity, such as a broker or agent, authorized to act on behalf of another entity selling a given product or service.

A third party 104, in accordance with one embodiment of the invention, is an entity, such as a person or organization, that provides information to the system 30 which is usable and/or useful to a Buyer 100 or a Seller 102 either contemplating or actively bidding on an offering. Some of this information can, for example, include "background" information of interest to a Buyer 100. For example, such background information can include whether a doctor auctioning off his services has ever been sanctioned by a state medical board. Such information can also include statements and documents from insurance companies insuring a Seller 102, as well as demographic organizations providing information about a physical location associated with a given financial product.. Third parties 104 also can include suppliers of information used to price financial products. For example, such a supplier of financial information could include a website that provides information regarding Federal Money Funds rates. Those skilled in the art will recognize that, depending on the product or service being auctioned off, many different types of third parties can provide information that is relevant to that auction.

Other parties and entities (not shown in FIG. 3) that can interact with the system 30 include Analysts, Marketing personnel, Quality Control Personnel, and Site Administrators.

An Analyst is an entity that, in at least one embodiment, computes prices for the products or services being auctioned off by Sellers. The Analyst's computations can be based on factors that can include the profile of the loan, historical information, and external information. In one embodiment of the invention, the Analyst also can use a "black box" pricing calculator, such as one provided by another third party, or even the Pricing Engine 64 of FIG. 2. In another embodiment of the present invention, the system 30 does not employ an Analyst, but instead automatically computes prices for the product or service being auctioned off. This feature is described more fully herein.

Marketing is, in one embodiment, an internal user associated with the administrator/owner of the system 30 and/or its associated website. This party can monitor Buyer/Seller activity and interests with an existing contact management system, such as ACT!, which is available from Internet Commerce Corporation of Scottsdale, Ariz.

Quality Control Personnel, in one embodiment of the invention, includes Quality Control Representatives and Quality Control Managers. The Quality Control Representative is an internal user associated with the administrator/owner of the system 30, who can, if necessary, facilitate the relationship between Buyers 100 and Sellers 102. This facilitation can, in one embodiment, include contacting the parties to resolve questions and disputes either may have. The Quality Control Manager is an entity, such a person, that can allocate loans among Quality Control Representatives.

In accordance with at least one embodiment of the invention, analysts, Buyers 100 and Sellers 102 of financial products, and other interested parties can access the system 30 via a website or a portal, over a computer network to access a variety of financial products, related features and functions. For example, in the case of a loan for sale, a Buyer 100 can view a Loan Summary page to view summaries of available loans and to get news related to loans, both specifically and generally. The Buyer 100 can also search for loans using one or more criteria.

Although the examples for pricing, trading, analyzing, buying, and selling products and services described herein are provided using the example of a commercial loan, the example of loans is not limiting. As noted previously, the type of product or service includes cars, boats, stamps, legal services, medical services and software development services. Moreover, the financial product auctioned off using the financial products described herein can be virtually any type of financial product, including commercial and residential loans, lines of credit, savings accounts, securities, bonds, insurance products, annuities, certificates of deposit, student loans, personal loans, and the like. The financial product can be a single product (e.g., a single loan) or a group of products (e.g., a group of loans, or a group of various types of financial products). Moreover, as described herein, at least some of the other types of actions provided by systems and methods of the present invention (such as pricing a financial product and bidding on a financial product) are similarly usable with at least some of these types of financial products.

Figure 4:
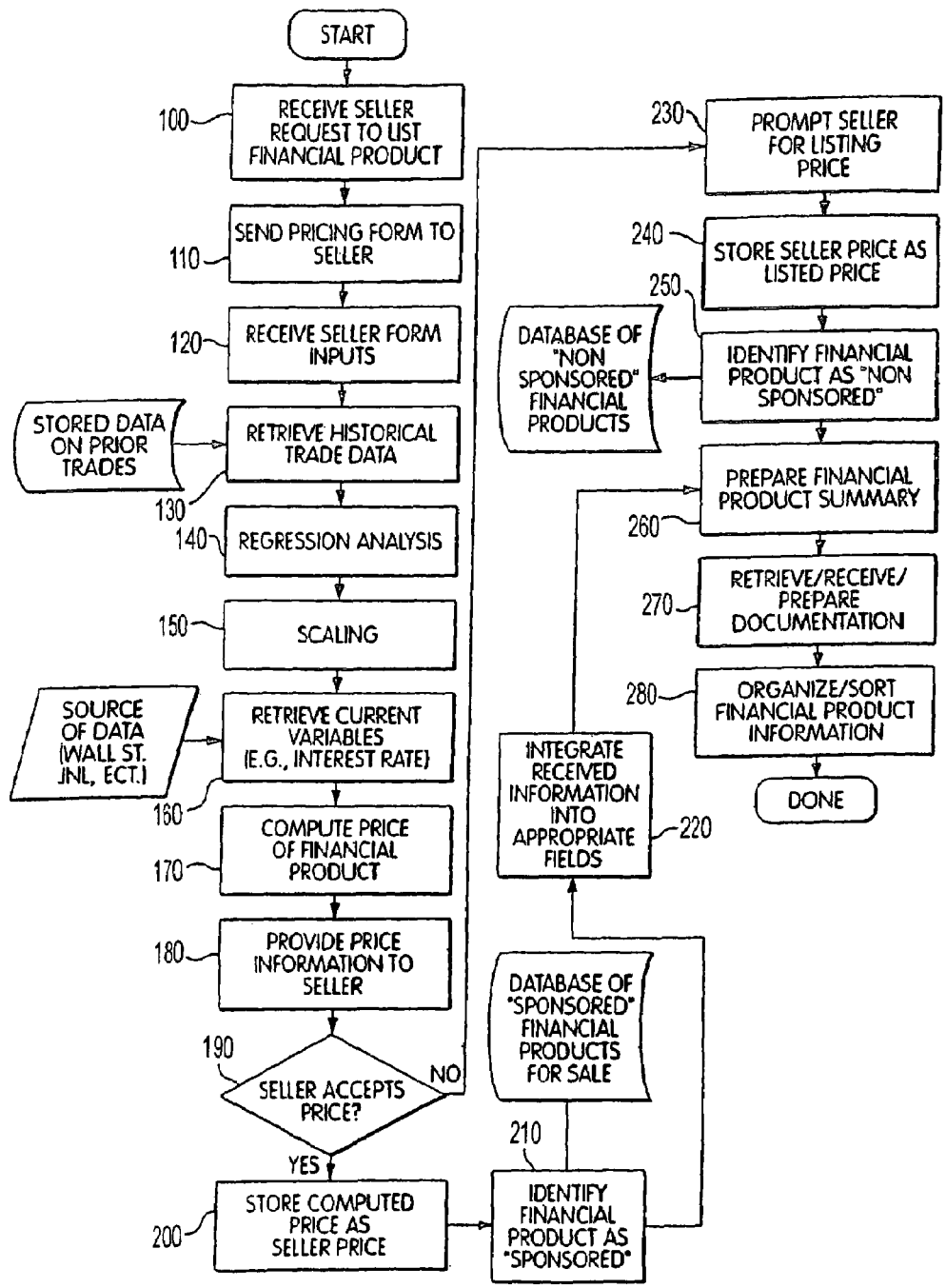
FIG. 4 is a flow chart illustrating a process for pricing financial product, in accordance with an embodiment of the invention.

FIG. 4 is a flow chart illustrating one embodiment of a process for pricing a product or service, in accordance with the present invention. A Seller 102 can use this process to determine a price for the product or service he is auctioning off. Although FIG. 4 illustrates one particular embodiment that pertains to auctioning a financial product, FIG. 4 is applicable to any product or service that can be auctioned. Referring to FIGS. 2, 3 and 4, the process of FIG. 4 begins when the system 30 receives the request of a Seller 102 to list a financial product for sale (step 100). The Seller 102 can send the request to the system by sending a message from a computer, such as a personal computer or workstation, over a computer network or via a wireless device to the system 30. In one embodiment, this is done by the Seller 102 going to a web page associated with the system 30, and accessing various functions on the web page using links, buttons, pull down menus, etc., located on the web page.

When the system 30 receives the request (step 100), it provides one or more forms to the Seller 102, such as pricing forms, so that the Seller 102 can provide the system 30 with some of the information needed to compute a price for the financial product. FIGS. 5A through 5D are representative screen shots illustrating forms 282, 284, 286, 288 that the system 30 provides to the Seller 102, in accordance with an embodiment of the invention. In one embodiment, the forms 282, 284, 286, 288 are constructed and arranged to automatically upload information that a Seller 102 has stored in another file, such as a spreadsheet file. In one embodiment, the system 30 stores a profile of the Seller 102, such that portions of the forms 282, 284, 286, 288 can be "filled out" by the system in advance (e.g., "Seller's reference Number, Seller's name, etc.). The profile of a Seller 102, in one embodiment, also stores other information provided by a Seller 102, such as preferences, criteria for accepting bids, restrictions on bids (e.g., certain users may be prohibited from bidding), restrictions on access to information (bidders may be required to sign on and/or acknowledge specific conditions before receiving information), specification of type of bidding to occur (e.g., type of auction), permission for the system 30 to accept bids on behalf of the Seller 102, etc. This type of information also can be provided in the forms 282, 284, 286, 288.

Referring again to FIG. 4, after the system 30 sends the forms 282, 284, 286, 288 to the Seller 102 (step 110) and receives a response (step 120), the system 30 can compute a price for the financial product. In at least one embodiment, the Pricing Engine 64 uses data and characteristics about the financial product to compute the price for the financial product. The data and characteristics can include, but are limited to, parameters such as terms, time periods, conditions, locations, appraisals, discounts, liens, status, sponsors, servicing type, status, maturity, principal balance, financial product type, origination date, monthly payment, maturity date, interest rate, interest accrual method, and performance level.

As part of the price computation, the system 30 retrieves historical trade data (step 130) that it has stored relating to prior trades. For example, the system 30 can use the Transaction Management subsystem 58 and query its Transaction Data database 46 (FIG. 2) to retrieve this data. This data helps the system 30 to analyze the relationship and similarity between the financial product being offered for sale and previous trades of financial products having one or more similar characteristics. For example, a Seller 102 may be listing a residential mortgage for a property with an outstanding loan balance of $310,000, an interest rate of 8.65%, a 30-year term, with an excellent payment history, which is located in a suburban community. The system 30 could then search for prior trades of other residential mortgages sharing some or all of these characteristics. The prior trade history could, for example, provide data, such as cents on the dollar that the mortgage sold for on the secondary market, as well as provide what factor or factors had the greatest impact on the price of the previously sold mortgage.

Based on the retrieved historical trade data, the system performs regression analysis (step 140) using both the historical trade data and the seller's inputs, to get an estimate for how at least a portion of the various characteristics of the financial product affects the price of the financial product.

Based on the results of the regression analysis, the system 30 then assigns a scaling factor (step 150) to at least a portion of the characteristics (i.e., the various fields on the forms 282, 284, 286, 288). The system 30 also takes into account external variables (step 150), such as the U.S. Federal Funds rate, U.S. prime rate, bond rate, U.S. Treasury bill rate, U.S. Treasury bond rate, U.S. Treasury note rate, S&P 500 index, Dow Jones Industrial Average, and NASDAQ Combined Composite Index. The system 30 can be provided with external variables from virtually any known source of the information, including trade journals such as the *Wall Street Journal, Bloomberg Business News*, etc. In one embodiment, the system 30 can automatically retrieve the information from a known location (such as on a computer network). In one embodiment, a user such as a system administrator also can provide the information to the system 30 via manual input.

Referring again to FIG. 4, the system 30 computes a price for the financial product (step 180) and provides the price to the Seller 102 (step 180). If the Seller 102 accepts the computed price (step 190), the system 30 stores the computed price as the selling price (step 200) of the financial product. In at least one embodiment, if the Seller 102 has accepted the computed price, the financial product is identified as a "sponsored" product (step 210) and is stored as such. "Sponsored," in one embodiment, indicates to potential Buyers 100 at least that the price of the financial product can be relied on as having the approval of the entity sponsoring the website of the system 30. This entity that is sponsoring the website on which the auction is taking place is also referred to herein as the auction house.

The price computed in FIG. 4 can, in one embodiment, provide a benchmark for a Seller 102 to determine what price is appropriate for the financial product being auctioned off, given current market conditions and historical trade data.

Sellers 102 can revisit the process of FIG. 4 at any time and can get a price appropriate to the market conditions and trade history then in existence. This feature may help Sellers 102 recognize the true market value of their financial products.

If, however, the Seller 102 does not accept the computed price, the system 30 prompts the Seller 102 for their own price (step 230), which the system 30 receives and stores as the listed price for the financial product (step 240). In at least one embodiment of the present invention, financial products having seller-provided prices are identified in such a manner. Identifying financial products as having seller-provided prices allows potential Buyers 100 to determine that the financial product is not "sponsored" (step 250) by the auction house. In at least one embodiment, products with seller-provided prices are labeled as "direct events."

Figure 11:
FIG. 11 is a representative screen show illustrating financial product summary information provided to a user, in accordance with an embodiment of the invention.

After the system 30 has a price for the financial product (whether the system 30 computes it or whether the Seller 102 provides it), the system 30 prepares a summary of the financial product based on the information it has about the financial product (step 260). In one embodiment, the summary is created by taking selected inputs from the forms 282, 284, 286, 288 and putting them into a predetermined template. In at least one embodiment, the financial product summary is created automatically by the system 30, without human intervention. In one embodiment, the summary is created in whole or in part by a person, such as an Analyst (as described previously) who reviews the information to create the financial product summary. Examples and illustrations of the loan summary are provided herein. For example, FIG. 11 illustrates an example screen shot of a loan summary for an example loan for sale, in accordance with an embodiment of the invention.

The system 30 also prepares a set of documentation on the financial product being auctioned off (step 280), so that potential Buyers 100 can view the documents and conduct any necessary due diligence. These documents include, for example, documents, such as those shown in Table 1 (which by way of example only shows documents used or relied upon in the sale of a loan):

TABLE 1

Documents provided for a Financial Product Document

1: Table of Contents
2: Narrative
3: Statistics For Purchase
4: Note
5: Mortgage/Security Agreements
6: Guaranty
7: Assignments
8: UCC
9: Title Insurance
10: Environ. Indemnity Agreement
11: Property Condition Asses.
12: Appraisal
13: Environ. Site Assessment
14: Other Collateral Information
15: Other Sponsor Information By comparison, a boat being auctioned off by an embodiment of the present invention would include at least the following documentation:

TABLE 2

Documents provided for a Boat Document

1: Table of Contents
2: Narrative
3: Statistics For Purchase
4: Title to Boat
5: Mortgage/Security Agreements
6: Warranty
7: Mechanic's Assessment
8: UCC
9: Title Insurance
10: Picture of Harbor
11: Property Condition Asses.
12: Appraisal
13: Environ. Site Assessment
14: Other Collateral Information
15: Other Sponsor Information Unlike known systems and web sites that simply act as "bulletin boards," in at least one embodiment, the present invention provides the unique ability to perform the entire due diligence and auction process online. Buyers 100 and other investors are immediately able to review complete, original loan documentation and other critical information directly through the system 30 of the invention, eliminating the time and costs associated with traditional due diligence methods. These traditional methods of due diligence include traveling to the location where all the due diligence information is held; manually searching for needed due diligence material; copying and/or scanning the due diligence material so that it can be reviewed at a later date at a remote location; as well as traveling to the location of the product, property or service being offered and inspecting it to ensure it actually exists.

In addition to immediate information access, the features and advantages of the some embodiments of the invention (including at least the Quick Price feature, the financial product computation tools module, the Forward Loan workflow tools, and automated email alerts that notify users when information on a selected financial product is updated,) as described herein, may facilitate the evaluation and workflow processes associated with trading products and services.

In one embodiment, the system 30 queries the Seller 102 for the necessary documents, which the Seller 102 can provide to the system in many different ways, including electronic transmission, or physically mailing the actual documents (in paper form, on diskette or CD-ROMs, etc). In at least one embodiment, the Seller 102 can upload some or all of the information, which can include standard financial product information data, to the system 30 in predetermined formats such as Microsoft Word, Microsoft Excel, Adobe ACROBAT, and the like. In at least one embodiment, the seller-provided information includes due diligence information that is capable of fulfilling at least a portion of a buyer's need for due diligence on the financial product. In at least one embodiment, the due diligence information comprises an electronic representation of a physical due diligence document, such as an electronic image substantially replicating the physical due diligence document. This is accomplished, in at least one embodiment, by using a document format such as PDF. In at least one embodiment, the due diligence information is scanned to create electronic image files representing the physical due diligence documents.

In one embodiment, the data uploaded to the site is in PDF format files built from Microsoft Word and Microsoft Excel templates downloaded from the system 30. For example, this data can be original product data or updates to product data (if the Seller 102 resells the product). After the necessary documentation and financial product information is received, the system 30 organizes the information (step 280) for viewing and/or purchase by entities such as by potential Buyers 100. In at least one embodiment, the system 30 uses a standardized format to organize the documents and/or the product or services summary, so that those accessing products, such as financial products, have a consistent view and interface. The system 30 also can, if applicable, add links to information from third parties 104 that is of interest and/or relevant to the product or service being auctioned off. Examples of these documents are provided and described herein (see, for example, FIGS. 9-17).

Figure 6:
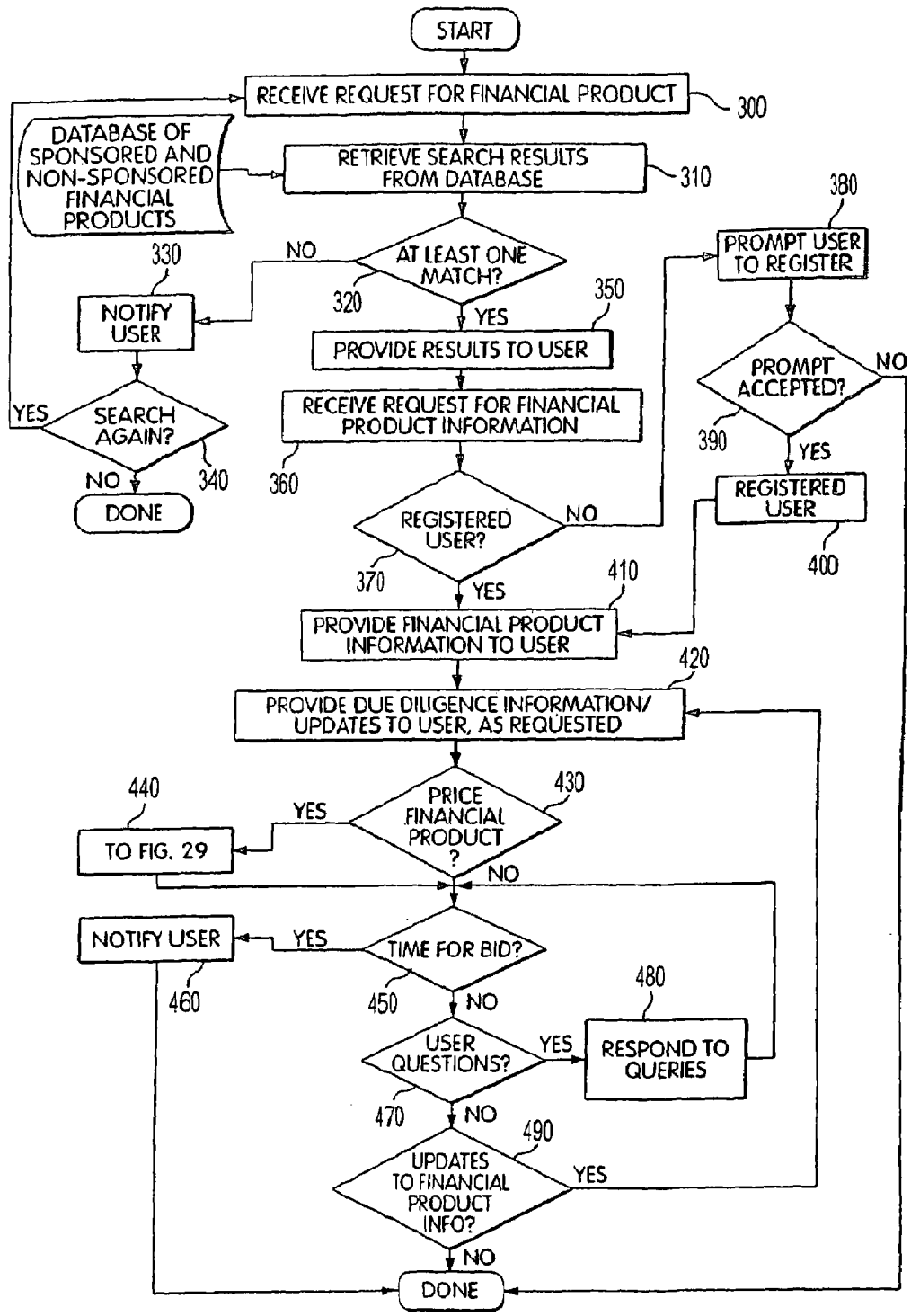
FIG. 6 is a flow chart illustrating a process for searching for a financial product, in accordance with an embodiment of the invention.

FIG. 6 is a flow chart illustrating an embodiment of the present invention which searches for a specific product or service. Any user of the system 30, including Buyers 100, Sellers 102, third parties 104, visitors, and site administrators can conduct this search. The search can locate, for example, financial products listed with the system 30 using the process of FIG. 4.

Referring to FIGS. 2, 3, and 6, and by way of illustration only, the system 30 receives a request from a user for a financial product (step 300). In another embodiment of the present invention, the user's request could be directed at a boat or legal services. The request can be for all listed financial products, or the request can be for financial products meeting one or more criteria. For example, in one embodiment, when a user accesses the system 30, if the user has a profile stored on the system 30, and the profile lists loan criteria, the system 30 can automatically bring up financial products meeting the stored criteria. Although not shown here, in one embodiment, a user may store the results of previous searches and bring those searches up, as part of step 300.

The request of step 300, in one embodiment, is in the form of a search form, presented to the user as part of a graphical user interface (GUI). For example, in one embodiment, the system 30 displays a search form capable of receiving user inputs. FIG. 7 illustrates a representative screen shot of a search input form 500 used to search for a financial product, in accordance with an embodiment of the invention. The search form 500 shown in FIG. 7 is provided by way of example only. Those skilled in the art will appreciate that many different types of form and inputs can be used for querying for a product or service which satisfies a user's requirements. For example, in one embodiment, the system 30 can store a profile of a given user, where the profile specifies criteria that a user may have concerning financial products of interest and, based on that profile, conduct a search for products or services automatically or upon request by a user.

Referring again to FIG. 6, based on the search criteria, the system 30 retrieves search results from its databases (step 310) which match the search criteria. If there are no matches (step 320), the system notifies the user (step 330) and, if the user wants to search again (e.g., using different criteria) (step 340), the system 30 conducts the search again. If the user does not want to search again, the process ends.

Figure 8:
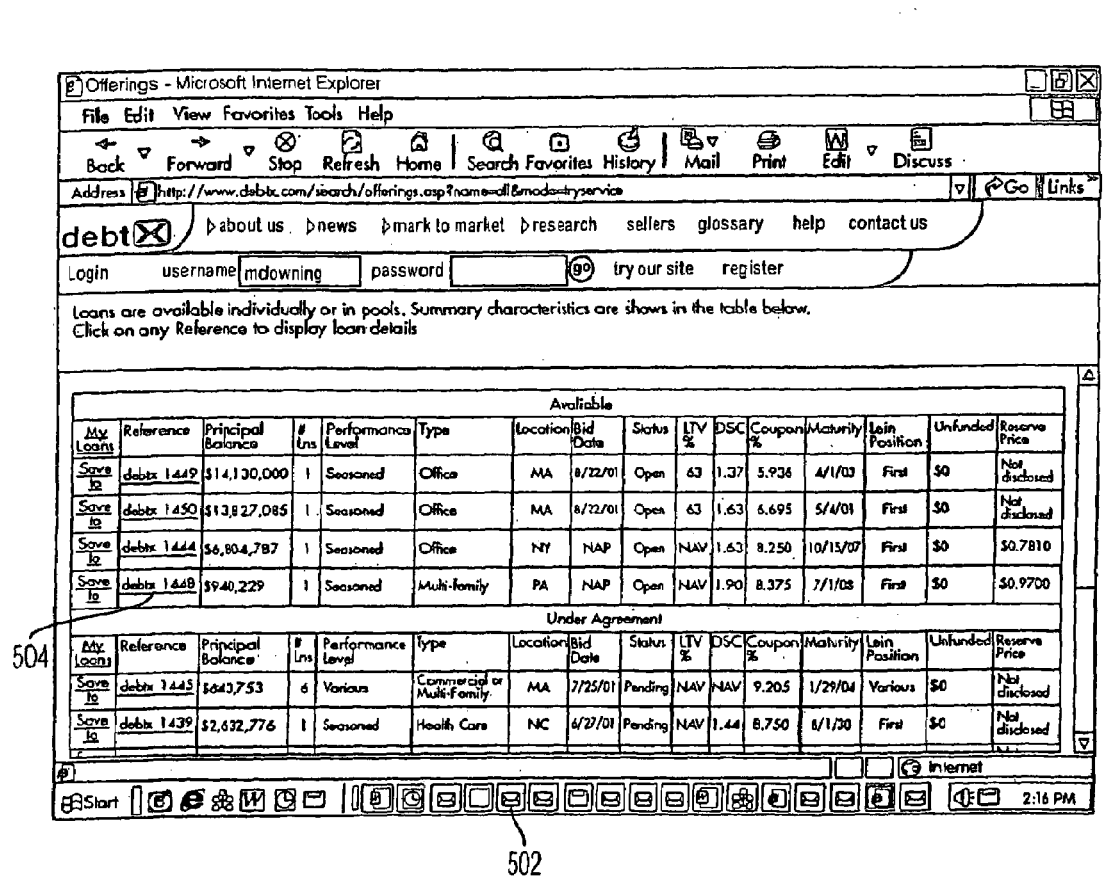

If there were matches to the search (step 320), the system provides the results to the user (step 350). FIG. 8 is a representative example screen shot illustrating the search results 502 resulting from a search for a financial product, in accordance with an embodiment of the invention. As FIG. 8 illustrates, selected information is provided about the financial products for sale, including the status of the financial product (e.g., "Available" or "Under Agreement"), the loan balance, the type, etc. In this example, a price for the financial product is not provided. As explained further herein, users are able to compute a price for the financial product based on specific requirements and terms. As with the processes of computing a price for Sellers 102, Buyers 100 can use at least one embodiment of the invention to determine an appropriate price for a given financial product, given the current market conditions and the trade history of that offering, or in regard to similarly situated offerings. As discussed herein, the trade history of a particular offering can alternately be available and unavailable to a Bidder.

Referring again to FIG. 6, a user can request further information, including due diligence materials, about any financial product listed in the search results (step 360). In at least one embodiment of the invention, if the user making such a request is not registered with the system 30 (step 370), the user is prompted to register (step 380) and, if the prompt is accepted (step 390), the appropriate steps are taken to register the user (step 400). If the user declines to register, the process ends and further information about the financial product is not provided. Registration can require the user to provide specific types of information and may require the user to agree to, execute or otherwise acknowledge certain obligations, such as confidentiality obligations, relating to the information to be provided to the user.

Registration can include the user reviewing the terms of his or her registration, and, if desired, can review the terms in another format, such as PDF. At this point, the newly registered user can be added to the system 30 using various techniques. For example, the user might be required to print out a form, fill it in, and return it to the administrator of the system 30. Alternatively, the system 30 can automatically enroll the user to the system, or the user can be added to the system using a combination of automatic enrollment and filling out forms. Those skilled in the art will appreciate that many different methods for registering users and assigning corresponding authentication information (for example, a username and password) are within the spirit and scope of the invention.

The process shown in steps 370, 380, 390, and 400 also can be used in one embodiment to obtain additional information from users (registered or otherwise) where applicable. For example, a Seller 102 may have as a condition of its listing the requirement that the system obtain certain additional information from a user before providing some or all of its product or service information to a user.

Figure 9:
FIG. 9 is a representative screen shot illustrating the financial product information provided to a user, in accordance with an embodiment of the invention.
Figure 10:
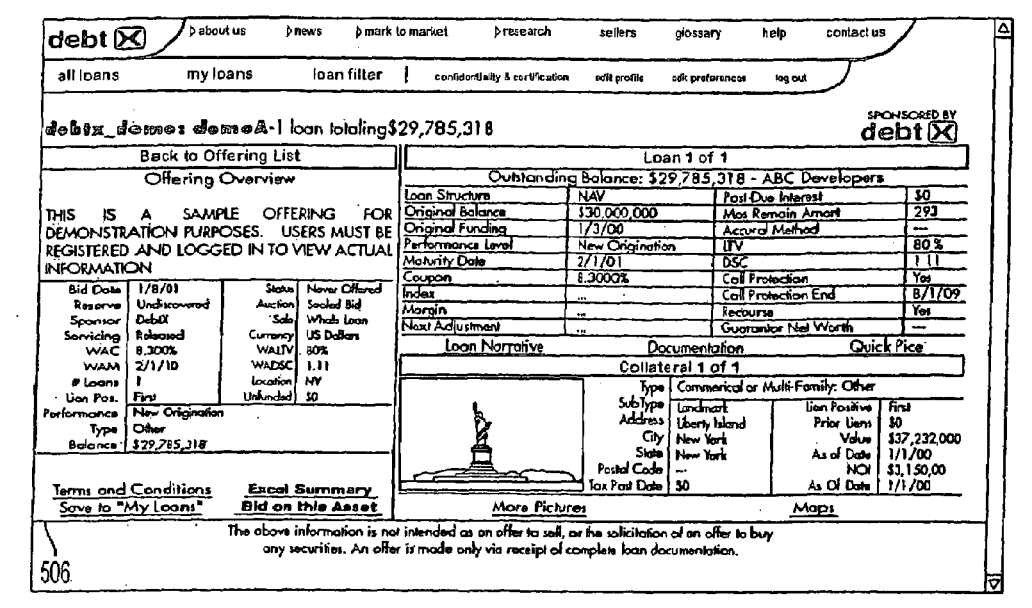

Referring to FIG. 6, when the necessary conditions (e.g., registration or other conditions) are met, the system 30 provides information about the product or service to the user (step 410). A user can, in one embodiment, request this information by "clicking" on a specific listing 504 in the results 502. FIGS. 9 and 10 are representative screen shots illustrating examples of the financial product information provided to a user, in accordance with an embodiment of the invention. As FIGS. 9 and 10 illustrate, the types of information include (but are not limited to) an overview of the financial product, a summary of key information about the financial product, images of collateral (where applicable), a list of documentation available for the financial product (for free or for purchase), and terms of the sale or auction. Of course, those skilled in the art recognize that the information provided in the examples of FIGS. 9 and 10 is not limiting.

In one embodiment, a user can obtain a "Quick Price" 508 (FIG. 9) on the product or service. One example of the system 30 providing this "Quick Price" can be found when the system 30 performs a computation similar to the pricing computation performed in the process of FIG. 4. If the product being auctioned is a boat the system 30 could provide a dollar figure, while if the service being auctioned is a legal service, the system 30 could provide a billable hour and an accompanying estimate of the number of hours required to complete the task, or any combination thereof. Alternatively, if the product is a loan the system 30 can give a loan price to a user cents on the dollar, basis points, or other suitable measure.

In one embodiment of the invention, the financial product information includes listings for financial products called "Brokered events." Brokered events are identified by the specific broker sponsoring the deal and are subject to that broker's parameters, including bid type, setting the Reserve Price (if any) documentation, disclosure, and Asset Sale Agreement. Each broker that lists a financial product provides the system 30 with a written statement describing its offering philosophy. That statement can be posted on-line and accessed by an interested party.

Figure 16:
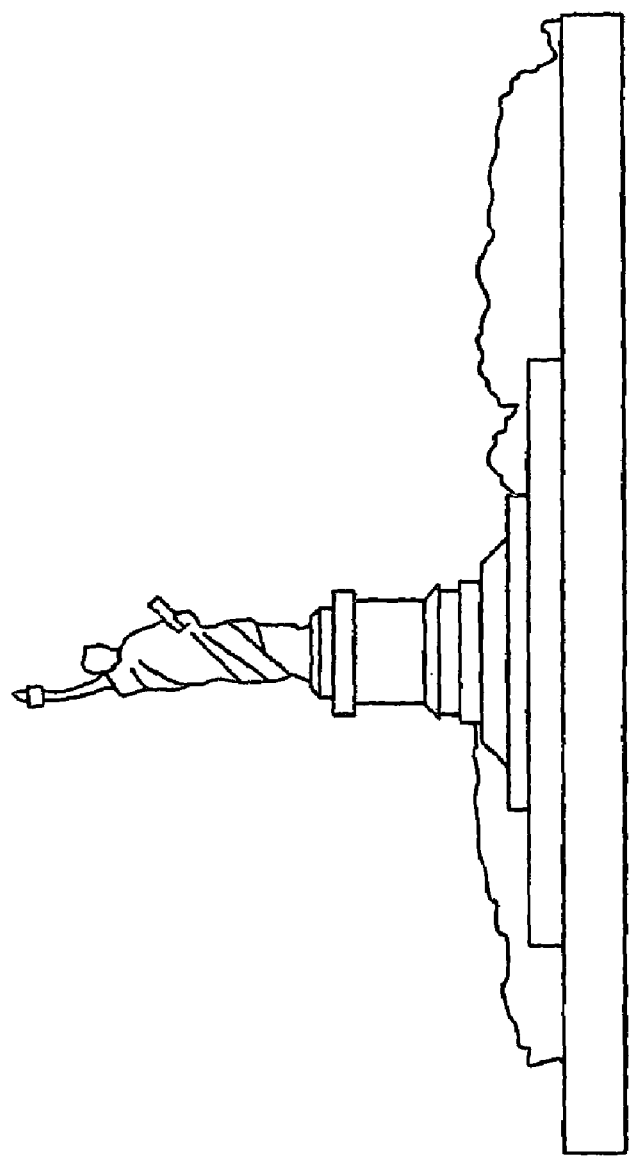
FIG. 16 is a representative screen shot showing an example of a picture of a property associated with a financial product for sale, which picture is available to a user, in accordance with an embodiment of the invention.

Referring again to FIG. 6, the system 30 also can provide more information to the user about the listed product or service, such as loan documentation (step 420) necessary for a buyer's due diligence. A user can obtain this information by clicking on the "buy documents" link 510 shown in FIG. 9. In some embodiments, the system 30 charges the user a fee for these documents. FIGS. 11 through 17 are representative screen shots illustrating some of the types of information that can be provided as a due diligence document. FIG. 11 is a representative screen shot illustrating a financial product's summary information provided to a user, in accordance with an embodiment of the invention. FIG. 12 is a representative screen shot illustrating a financial product's statistical information provided to a user, in accordance with an embodiment of the invention. FIG. 13 is a representative screen show illustrating a financial product's collateral information provided to a user, in accordance with an embodiment of the invention. FIG. 14 is a representative screen shot showing an example of a portion of the mortgage note documentation available to a user, in accordance with an embodiment of the invention. FIG. 15 is a representative screen shot showing an example of a portion of the title insurance documentation available to a user, in accordance with an embodiment of the invention. FIG. 16 is a representative screen shot showing an example of a picture of a property associated with a financial product for sale, which picture is available to a user, in accordance with an embodiment of the invention.

Figure 17:
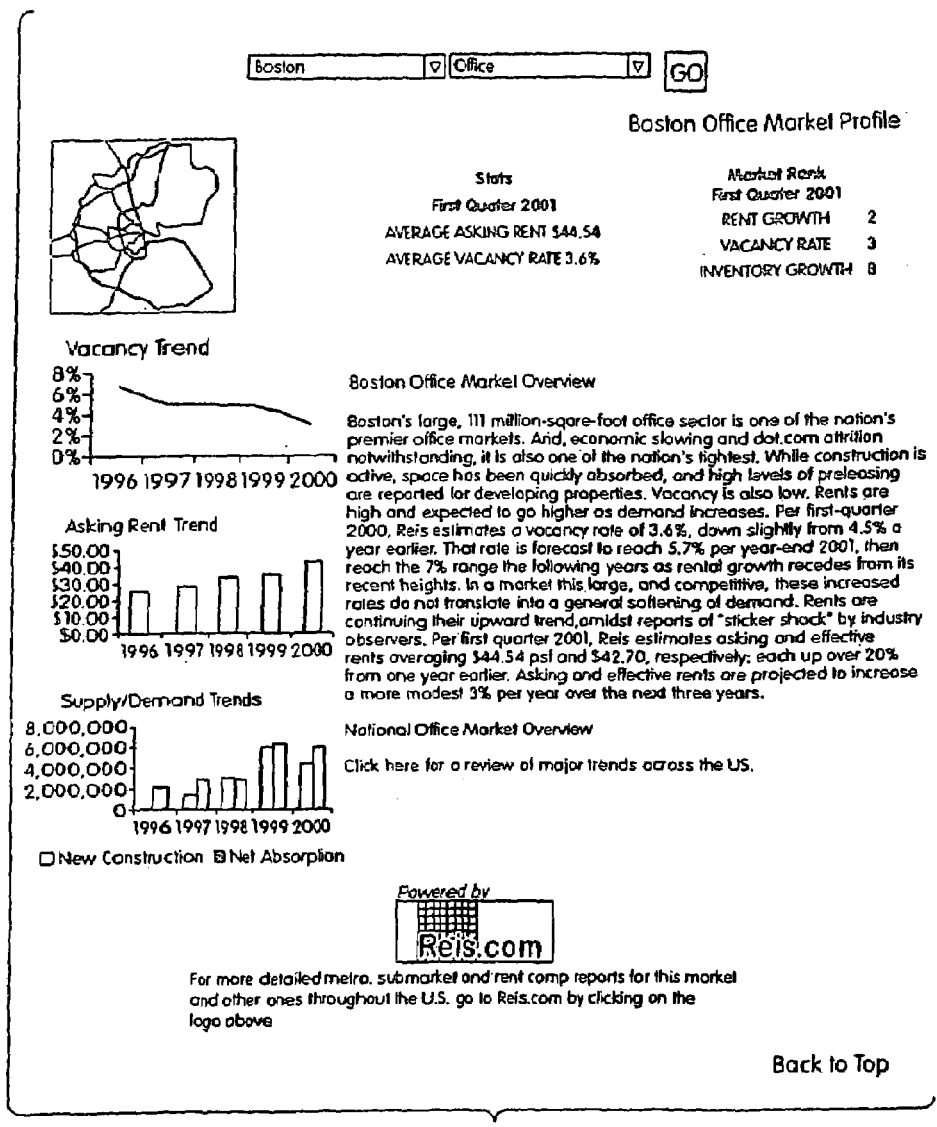
FIG. 17 is a representative screen shot showing an example of third party information available to a user in accordance with an embodiment of the invention.

In addition, in at least one embodiment of the invention, the financial product information provided by a Seller 102 is supplemented with value-added information provided by another entity, such as the administrator of the system 30 and/or third party information. FIG. 17 is a representative screen shot showing an example of third party information available to a user in accordance with an embodiment of the invention. In FIG. 17, the example third party information includes general information provided relating to a geographic area where the collateral for a given financial product may be located.

Referring again to FIG. 9, when appropriate, a user can go from the financial product summary page to a bid process (such as that described in the process of FIG. 30), using the bid link 512. However, in at least one embodiment of the invention, the system 30 tracks whether or riot a Bidder 100 who is attempting to bid on a financial product has obtained the due diligence materials. One reason for doing this is to insure that the Seller 102 and/or the system 30 have satisfied NASD requirements for disclosure prior to the sale of a financial product.

In at least one embodiment of the invention, if a user has obtained loan information, such as due diligence materials, the system 30 can provide the user with automatic updates for any additional information relevant to (or that the system 30 receives) about the loan. The updates can, for example, be provided periodically, or as needed, or at the request of a Seller 102, or at the request of a Buyer 100. Similarly, if the user obtained a report on a particular physician from a state licensing board, if the system 30 receives additional relevant information about that physician, the system can provide those updates to the user or potential Bidder 100.

Referring again to FIG. 6, the user can take other actions after receiving the results of the search (step 310). For example, the user can compute a price for a listed financial product (step 430), which is explained more fully herein. This can be a quick price as described herein, or can be another pricing mechanism, such as that described below. However, if the time to bid for a financial product is approaching, or the time for bidding is a predetermined amount of time away (e.g., three days), the system 30 notifies the user reviewing the information (steps 450 and 460).

A user can also submit questions to the system 30 about a product or service, and/or submit questions to the system 30 about any documentation that the user received about the services or products being auctioned off (step 470). The queries can be submitted in many different ways, including via a message sent over a computer network, such as an email, via a telephone call or fax to an administrator of the system 30, via a letter, or any other suitable means of communication. The system 30 can respond to the queries (step 480) in similarly varied ways, and need not respond to the user in the manner in which a query was received. If necessary, in at least one embodiment, although not illustrated in FIG. 6, the system 30 can query a Seller 102 for any information or responses needed to respond to the query of a user. If the system 30 has updated financial product information (step 490) to provide to a user, it can do so.

In at least one embodiment, the user can perform actions on the search results not illustrated here, such as "HIDE" and "UNHIDE". With the "HIDE" function, a user may filter the list of search results further by "hiding" any products or services that are not of interest. In this situation, if the user filters out boats over ten years old, subsequent user searches will "hide" all boats that are older than ten years. At any time, a user can "UNHIDE" search results to view all products and services that meet his search criteria.

It should be understood that, in accordance with various embodiments of the invention, steps 410 through 490 can be done in virtually any order and need not be completed in the order shown.

Figure 18:
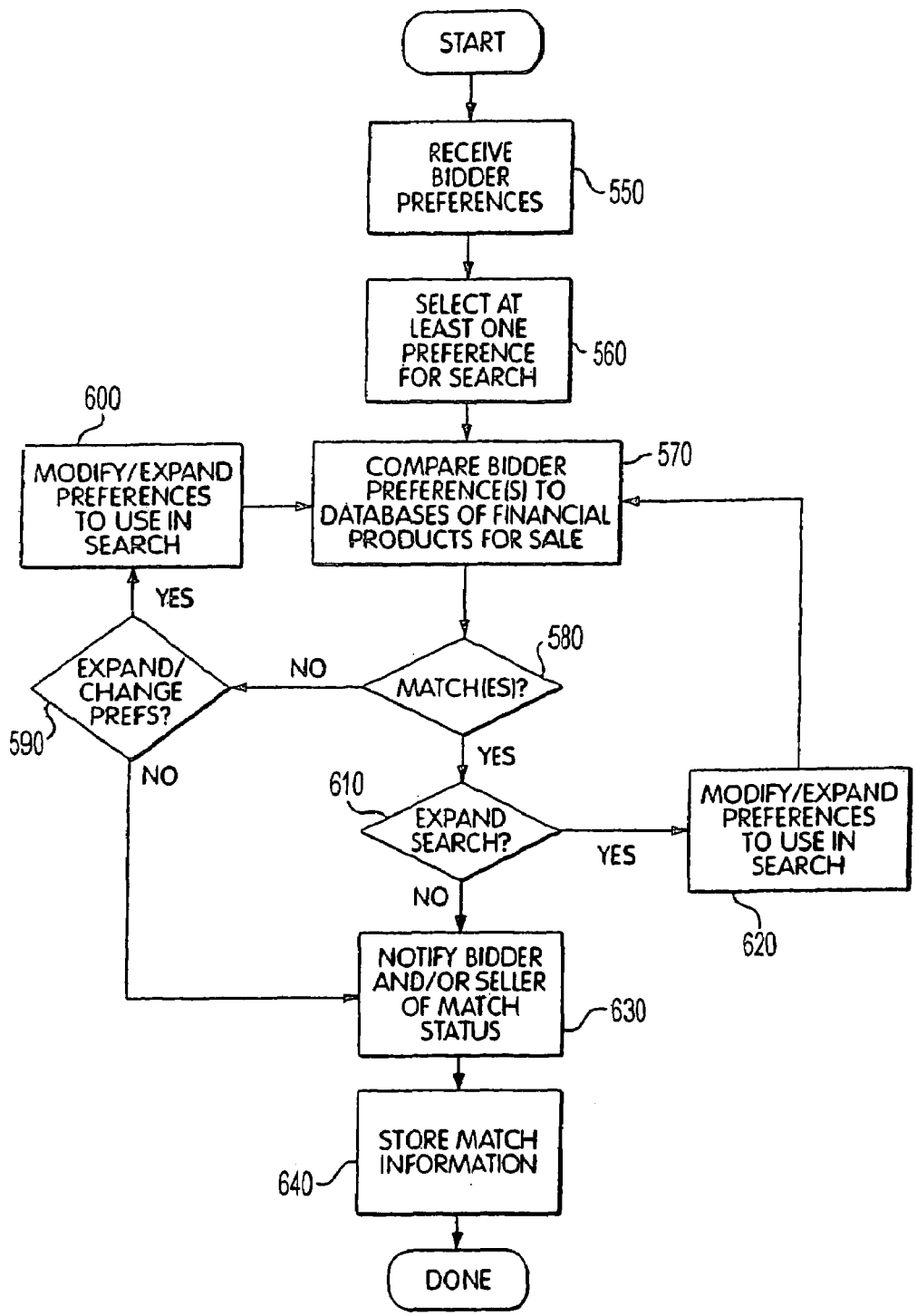
FIG. 18 is a flowchart illustrating a process for searching a database of financial products, in accordance with an embodiment of the invention.

In at least one embodiment of the invention, the system 30 can perform searches of products or services automatically on behalf of any entity for which the system 30 has stored a set of preferences or a profile. This type of search can be done on a periodic basis, or every time a new financial product for sale or information about a financial product for sale is added to the system 30, or any time any characteristic of a given product or service changes, or on a basis set by a user (e.g., weekly, daily, etc.). FIG. 18 is a flowchart illustrating a process for automatically searching a database of financial products, in accordance with an embodiment of the invention.

As illustrated in FIG. 18, the system 30 receives one or more bidder preferences (step 550), representing one or more criteria that a bidder has for the type of product or service he is looking for. In at least one embodiment, the bidder himself provides the bidder preferences. In at least one embodiment, the system 30 extrapolates at least one bidder preference based on the profile of the bidder. In at least one embodiment, the system extrapolates at least one bidder preference based on a bidder's trading history.

The system 30 selects at least one preference on which to search (step 560), and searches its databases for products or services meeting the criteria in whole or in part (step 570). If no matches are located (step 580), the system can modify the criteria on which it searches (steps 590, 600). For example, if no matches were found using five criteria specified by a bidder, the system 30 could attempt a search using just four of the five criteria. In at least one embodiment, a user can specify whether or not the system 30 can attempt such changes to the criteria.

If matches were found (step 580), the system 30 can still attempt to determine whether the search should be expanded (step 610). For example, if just one or two matches were located, the system 30 may attempt to modify the criteria to expand the results to some predetermined number of matches (step 620).

The system 30 notifies bidders of any matches (or lack thereof) (step 630), and can, if desired, store the results of its searches (step 640). The notification can be by any suitable means, including email messages, postings to a personalized web page (which the system 30 can maintain for a bidder), telephone messages, fax messages, pager messages, letters, so-called "Instant" messages sent to a mobile communications device, and the like. The stored results can be used, for example, at a later time, such as when a bidder logs on to the system 30 and seeks more information about the products or services being sold.

Figure 19:
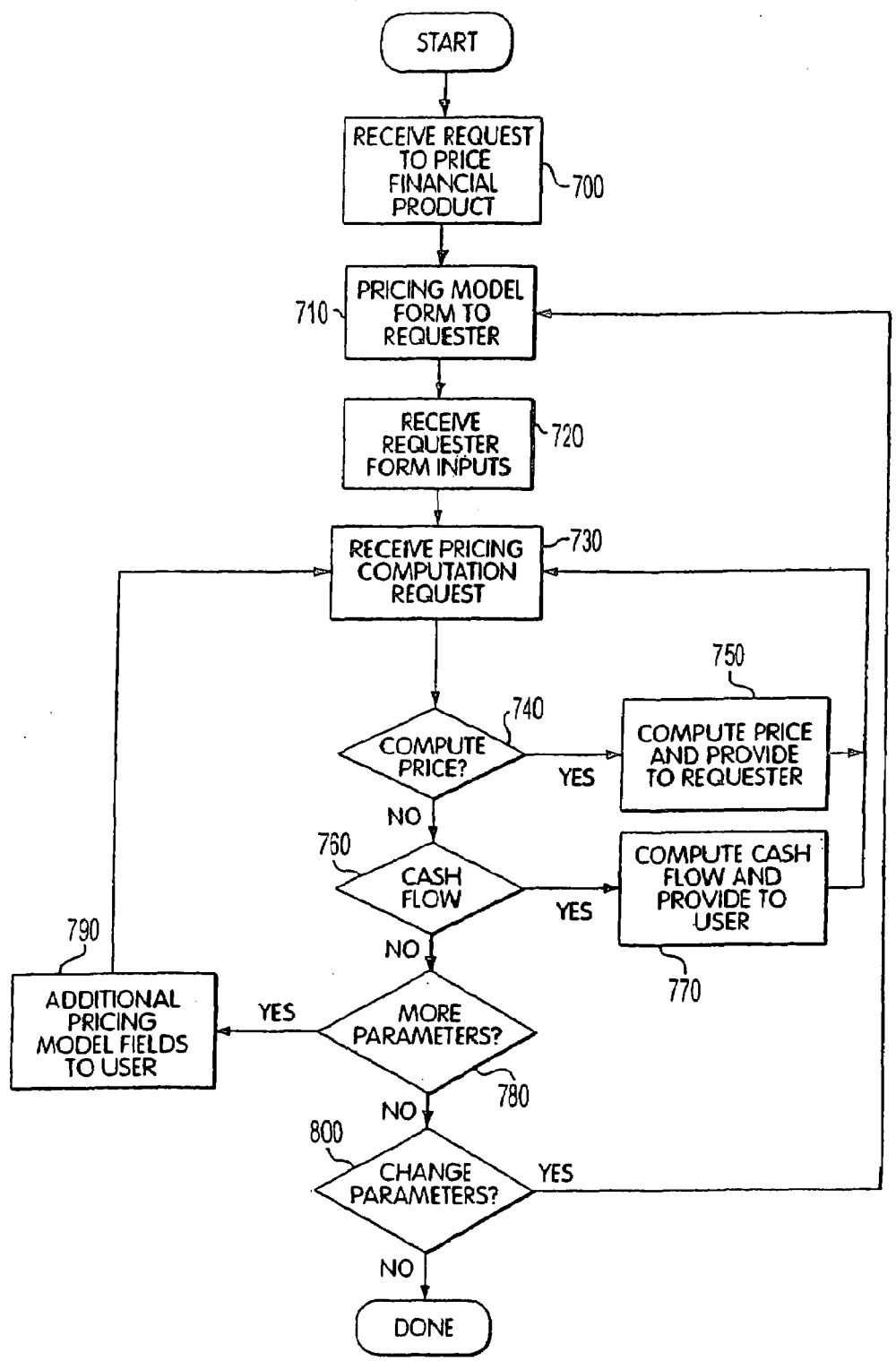
FIG. 19 is a flowchart illustrating a process for pricing a financial product, in accordance with an embodiment of the invention.

As noted previously, users of the system 30 (including at least Buyers 100, Sellers 102, and visitors/others) can price products or services offered for sale on the system 30. FIG. 19 is a flowchart illustrating a process for pricing a financial product, in accordance with an embodiment of the invention. As illustrated in FIG. 19, a user of the system can submit a request to the system 30 to price a product or service (step 700), and the system 30 provides the user with a pricing model form (step 710). FIG. 20 is a representative screen shot illustrating a pricing form 810 for pricing a product or service in accordance with an embodiment of the invention. As FIG. 20 indicates, users input the characteristics of the financial product they are interested in purchasing, such as the type of product, the principal balance, etc. Generally, the characteristics the user enters correspond to the information that the user has received about a financial product. However, in at least one embodiment, the user's entries can deviate from the listed information. For example, a user may want to calculate a cash flow for a financial product that assumes a different interest rate than currently listed for the product.

The system 30 receives the pricing computation request (step 730), and, if requested (step 740) computes a price (step 750) for the desired product or service. In at least one embodiment, the computation is done in substantially the same way as the computation done for a Seller 102 seeking a price (see FIG. 4). For example, in FIG. 20, if the user presses the "calculate" button 812, the system 30 returns a calculated price, such as in cents on the dollar, basis points, or other suitable measure, for the value of the financial product. FIG. 21 is a representative screen shot illustrating a form for performing a computation on a financial product, in accordance with an embodiment of the invention, and FIG. 22 is a representative screen shot illustrating the results of the computation requested in the screen shot of FIG. 21, in accordance with an embodiment of the invention. In FIG. 22, the computation results in a price of "99.3 cents on the dollar" for the listed financial product, which is a loan having a principal balance of five million dollars, performing as agreed.

Figure 23:
FIG. 23 is a representative screen shot illustrating a spreadsheet showing yearly cash flow, in accordance with an embodiment of the invention.

Referring to FIG. 19, if the user requests "cash flow" (step 760) the system 30 computes a cash flow, such as monthly or annually (step 770). FIG. 23 is a representative screen shot illustrating a spreadsheet showing yearly cash flow, in accordance with an embodiment of the invention.

Referring to FIG. 19, in at least one embodiment of the invention, a user can compute the price of a product or service based on addition parameters (step 780), which the user can provide or which the system 30 can provide (step 790). For example, the system 30 provides pull down menus permitting users to perform computations such as foreclosure, extension/restructure, and Direct Pay Off (DPO)/Early Payoff.

FIG. 24 is a representative screen shot illustrating a form for performing a foreclosure computation on a financial product, in accordance with an embodiment of the invention, and FIG. 25 is a representative screen shot illustrating the results of the computation requested in the screen shot of FIG. 23, in accordance with an embodiment of the invention. FIG. 26 is a representative screen shot illustrating a form for performing an extension/restructure computation on a financial product, in accordance with an embodiment of the invention, and FIG. 27 is a representative screen shot illustrating the results of the computation requested in the screen shot of FIG. 25, in accordance with an embodiment of the invention.

FIG. 28 is a representative screen shot illustrating a form for performing an DPO/Early Payoff computation on a financial product, in accordance with an embodiment of the invention, and FIG. 29 is a representative screen shot illustrating the results of the computation requested in the screen shot of FIG. 27, in accordance with an embodiment of the invention. Of course, the options provided are by way of example only and are not limiting. The additional parameters that can change the price computation can vary depending on the financial product.

In another embodiment of the present invention, users are provided with the ability to bid on products and services which have been offered for auction by a Seller 102. FIG. 30 is a flowchart particularly illustrating a process for bidding on a financial product, however, the process in FIG. 30 can also be employed to auction off any type of product or service. Moreover, the process illustrated in FIG. 30 is more extensive than might otherwise be needed to implement such an auction.

Figure 30A:
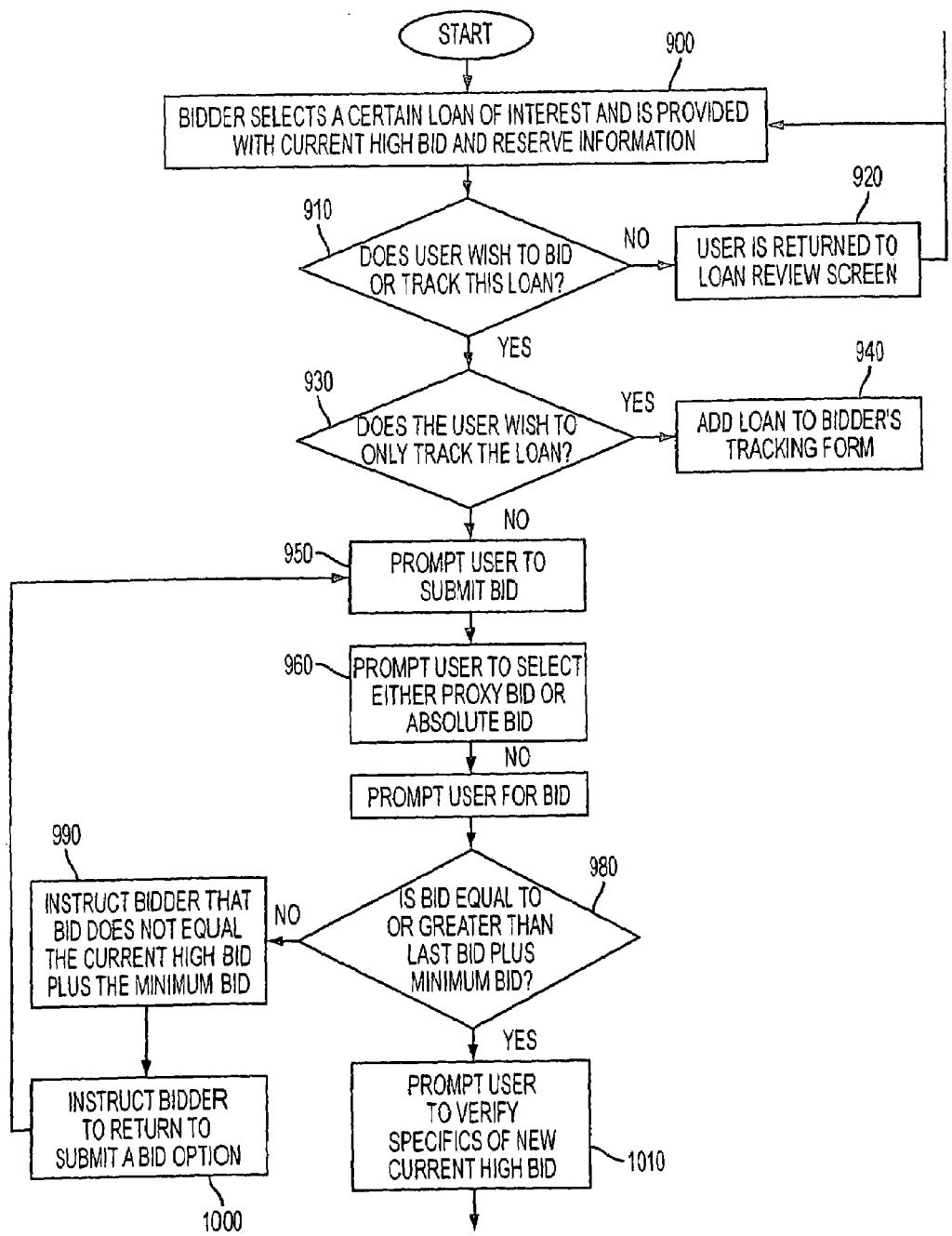
FIGS. 30A and B are a flowchart illustrating a process for bidding on a financial product, in accordance with an embodiment of the invention.
Figure 30B:
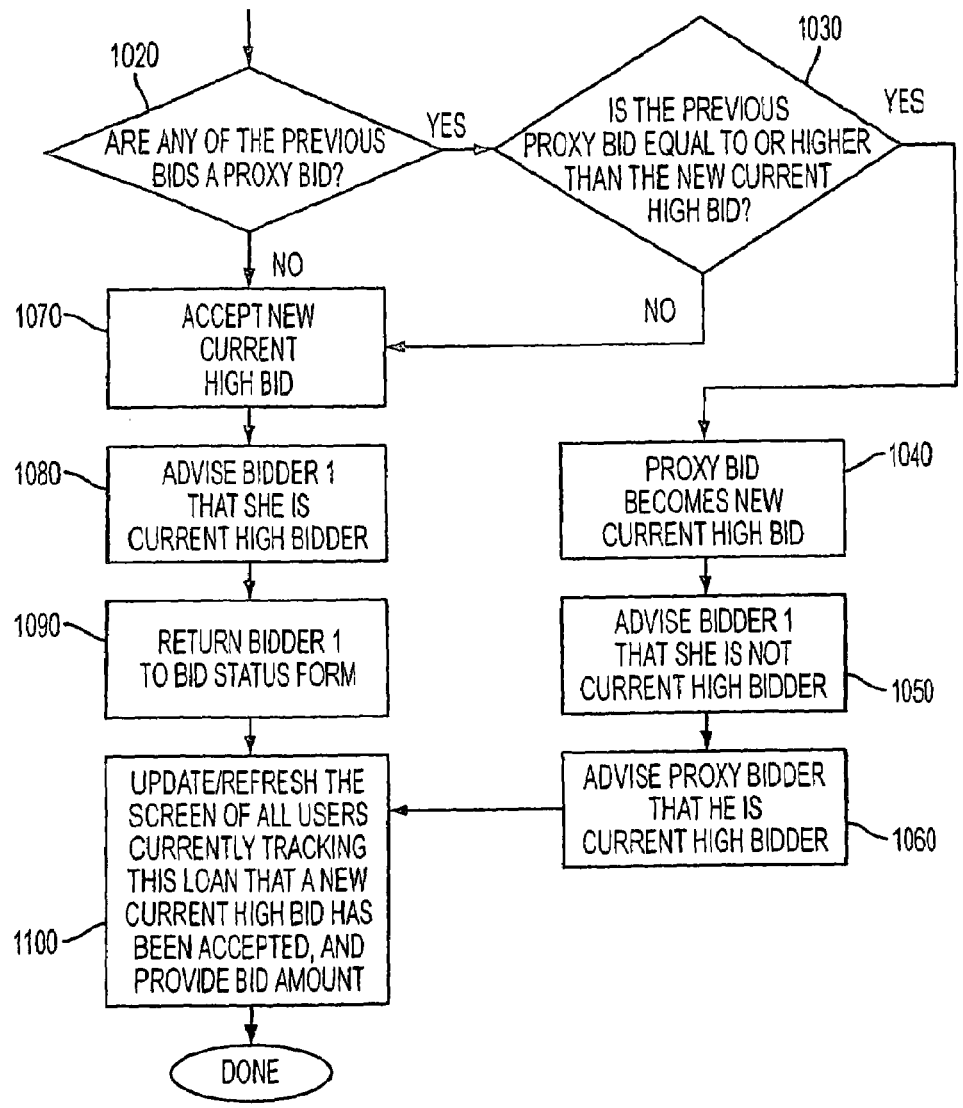

The present invention illustrated by the embodiment in FIGS. 30A and 30B is implemented in accordance with a standard bidding policy to enable users to bid on a financial product, such as a loan, using the English forward auction format. However, in at least one embodiment of the present invention the Seller 102 can specify a bidding policy or bidding format to be employed in auctioning off their product or service. Table 3 lists examples of other bidding policies or bidding formats which can be used in accordance with some embodiments of the present invention. The various bidding policies or bidding formats listed in Table 3 can be implemented using various methods, in conjunction with the present invention:

TABLE 3

Example Bidding Policies and Formats

| | |
|---|---|
| Sealed Bid | Bids must be received on or before the stated bid deadline and are not reviewed prior to the deadline. No bidder is aware of other bid amounts or conditions. A Sealed Bid forum may or may not be subject to a Reserve Price. |
| Modified Sealed Bid | Financial product is offered firm at a specified price for a specified period. Converts to Sealed Bid after firm offer period expires. |
| Open | Bids are received on an ongoing basis up to the bid deadline. |
| Auction | All bids and conditions are posted for all existing and potential bidders to review. Bidders may make multiple bids on any product or service provided that each subsequent bid is an improvement over the most recent bid submitted. An Open Auction may or may not be subject to a Reserve Price. |
| Indicative | Indicative bidding is generally a two-stage process whereby the seller/broker solicits a first round indication of what a buyer might pay for an asset. After a review of the indicative bids, the seller/broker generally chooses one or more bidders to confirm or improve their bid, usually requiring this be done within a specified period of time. The bidders chosen to participate in this second round are generally chosen based upon their bids and/or the seller/broker's opinion of their ability to close. |
| Negotiated | Buyers and Sellers negotiate the final sale price. This may be conducted before or after a request for Indicative Bids. |
| Firm Offer | A firm price is listed and the financial product will not sell until a bidder agrees to the listed price. The seller has the right to accept or reject nonconforming bids. |

It should also be understood that the present invention can be implemented to accommodate virtually any transaction format that a Seller 102, Buyer 100, or other party (e.g., broker) wishes to utilize, including the ones listed in Table 3.

Although the present invention is modeled on the English forward bidding format, it is not a true English forward format because the bidding is not open. For example, while in a typical English forward auction all the bidders always know the current high bid at any given time and are able to see how other bidders are participating, in the present embodiment of the English forward auction, the bidding is anonymous to other bidders. Therefore, although a bidder or tracker can view the current high bid, the bidder/tracker does not know the identity of the other bidders. Nor can a given bidder/tracker view any bid history except their own on a given auction. This present embodiment of the typical English forward auction format is advantageous to the Seller because the bidders that take part in a given auction will submit higher bids in that auction than they would have if the auction had been open and they were able to view the bidding history of all bidders. The bidders will also submit bids that are higher than they would have if the auction had been conducted in a closed bidding format which employed sealed bids because the bidders are not able to ensure that their bid is in conformance with the bid's submitted by the other bidders.

The present embodiment of the English forward auction is also advantageous to bidders, when compared to a closed bid format, because the format of the present embodiment allows all bidders to know when they have been outbid, and view the amount they need to bid in order to become the current high bidder. Therefore, they are able to submit increasingly higher bids as necessary prior to the close of a given auction. By comparison, in a sealed bid auction, bidders will only submit a single bid without knowledge of competing bids. Consequently, a bidder does not know whether his bid is high enough to win. Historically, bidders with a greater need to obtain assets have been empowered by the English forward auction format and consequently have driven prices for a given item higher than expected. In the following two examples, neither bidder could have been able to achieve their goal of winning the auction, had it been held in a closed format, because they could not have increased their bids appropriately.

In a first example, the present embodiment of the auction system 30 auctioned off three consecutive offerings of similar assets on the same day. Eight bidders participated on the first auction. One of those eight bidders indicated that he would only participate in the latter two auctions if he won the first auction because he needed to win all three offerings. The reason this bidder needed to win all three offerings was because he needed to achieve a critical mass of loan products in order to implement his exit strategy. Therefore, because he was able to view the current high bid, he was able to out bid all his competitors and win the first offering. And upon winning the first offering, he needed to win the next two offerings to meet his objective. This increased need to win the second two offerings on the part of that bidder, maximized the proceeds for the seller of at least the second two auctions, if not all three.

In a second example, the auction system 30 of the present invention conducted two auctions on the same day. Although the portfolios of both financial products being offered were similar, there was enough differentiation in the underlying assets that each auction appealed to bidders differently. Because of internal goals and internal budgetary constraints, one bidder needed to win one of the offerings, but did not want to win both. Therefore, when she was unsuccessful in the first of the two auctions, she became highly motivated to win the second auction. Because of her heightened motivation to win the second offering, this bidder increased the going price high enough on the second auction to ensure a win. Accordingly, the modified English format employed by the present invention not only benefited the winning bidder by allowing her to know how much she needed to bid in order to win, but it also benefited the seller because the winning bidder bid more than she would have had the auction been a closed format.

Because the present invention is offered to users via computer, via wireless and/or via the Internet, it results in increased participation in the auctions than if those same auctions were offered or conducted by telephone, email and the like. Therefore, the increased participation in each auction aids in increasing the pricing premiums for each offering. Although simply increasing the number of bidders will not necessarily lead to higher proceeds, the increased level of participation will positively impact other competitive issues, thereby driving up the pricing premium. These competitive issues include cost of capital, the ability to diversify portfolio holdings, or the ability to locate similar product.

In regard to the auctioning of financial products, the present invention is particularly well suited to offerings containing homogenous pools of performing loans. The present invention is especially well suited to auctioning financial products containing performing loans when the valuation of the underlying assets can be accurately calculated within a relatively narrow range.

Figure 31:
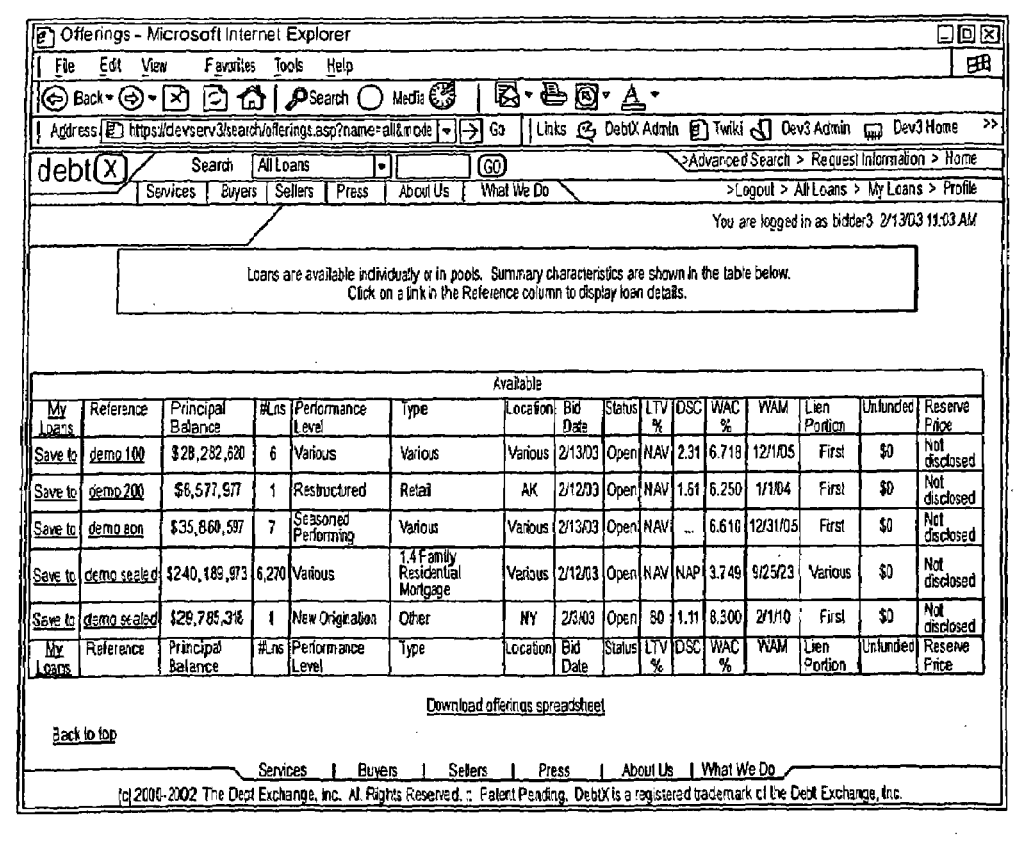

Referring again to FIGS. 30A and 30B, the auction process begins with a user selecting a certain type of loan that she is interested in from the list of available loans (step 900). FIG. 31 is a representative screen shot of the Loan Review Form illustrating a form for potential bidders to review loans that meet their selection criteria previously entered into the system 30, in accordance with an embodiment of the invention. After the user selects a loan of interest, the auction system 30 asks the user whether they wish to bid and/or track the selected loan (step 910). If the user decides to not bid and/or track the selected loan, the auction system 30 returns the user to the point where she can select a new loan to track or bid on. If the user does wish to bid and/or track the selected loan, the system 30 asks the user whether they want to only track the selected loan (step 930). If the user only wishes to track the loan, the system 30 adds the selected loan to the user's loan tracking screen (see FIG. 43) described herein (step 940).

If the user decides to not only track the loan but bid on that loan, the auction system 30 asks the user to submit a bid (step 950). Next the auction system 30 prompts the bidder to select whether their bid is an absolute bid, or proxy bid. FIG. 32 is a representative screen shot of and illustrates the Submit A Big Form as prompted to the user, and asks the user to enter their bid 1200, and indicates the bid is a proxy bid 1210. FIG. 33 is a representative screen shot of the Submit A Bid form after the user selects the absolute bidding format 1220 in accordance with an embodiment of the present invention.

Also the system 30, after receiving the user's bid in steps 950-960, checks to determine if the user's bid is equal to or greater than the sum of the last bid plus the amount of the minimum bid (step 980). If the user's bid is not greater than or equal to the sum of the current high bid plus the minimum bid, the system 30 will inform the user of that fact (step 990), and instruct the bidder to return to the point where she can submit a new bid (step 1000). If the user's bid is greater than or equal to the sum of the current high bid plus the minimum bid, the system 30 will prompt the user to verify the specifics of their bid, which is now the new current high bid (step 1010). FIG. 34 is a representative screen shot of the Bid Verification Form illustrating a form for potential bidders to verify the criteria they are submitting as their bid on a previously selected loan, in accordance with an embodiment of the present invention. FIG. 34 can also be used in conjunction with confirming the submission of a proxy bid.

The system 30 next determines whether any of the previously submitted bids are a proxy bid (step 1020). If the system 30 had previously accepted a proxy bid, the system 30 then determines whether the previous proxy bid is equal to or greater than the new current high bid (step 1030). For purposes of illustration but not limitation, it can be assumed that the current high bid is equal to $100,000, and that the maximum value of a previously submitted proxy bid value is also $100,000. Because the proxy bid was submitted to the auction system 30 prior to the user's new current high bid, and because the two bids are equal in value, the system 30 accepts the proxy bidder as the new current high bidder (step 1040). The system 30 advises the user that she is not the current high bidder (step 1050), and then advises the proxy bidder that he is the current high bidder (step 1060). FIG. 35 is a representative screen shot of a type of the Bid. Not Accepted Form illustrating a form which informs potential bidders that their bid had not been accepted by the auction system 30, and attempts to explain why. FIG. 36 is a representative screen shot of the Bid Confirmation Form illustrating a form that informs potential bidders that their bid had been accepted by the system 30. The Bid Confirmation Form will also inform the bidder whether they are the current high bidder or winning bidder on a item, and whether or not they hold the winning bid in an Aggregate Offering, if applicable.

Alternatively, a similar version of step 1060 is the situation where the proxy bidder had previously submitted a proxy bid with a maximum value of $100,001 and the user submitted a bid of $100,000. Even if the minimum bid is set at $10,000, because the proxy bid had been entered previous to the user's bid, and because the proxy bid is higher than the user's bid, the system 30 will accept the proxy bid as the new current high bid.

Figure 37:
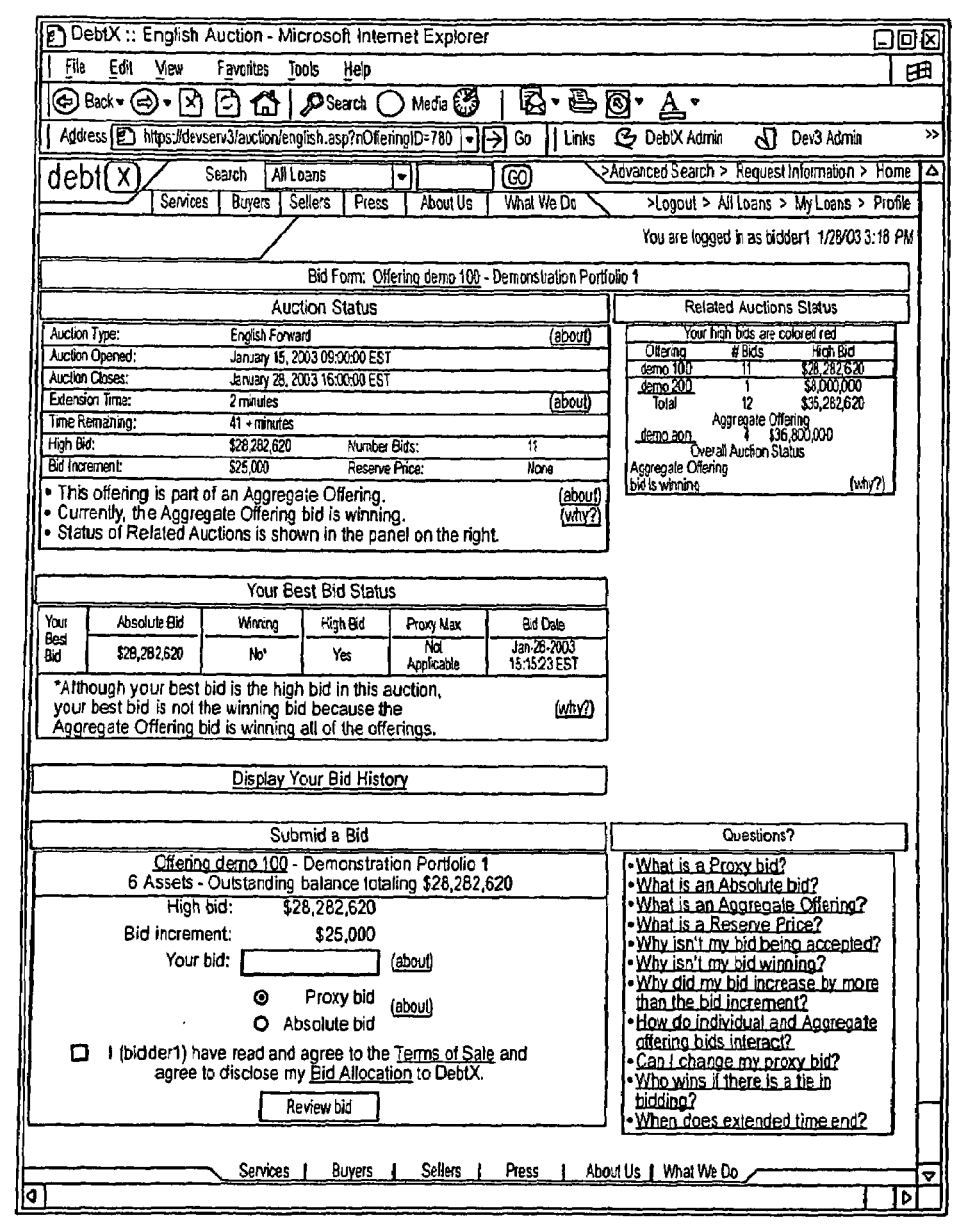

If there were no proxy bids submitted, or the previously submitted proxy bids were less than the user's bid entered in steps 950-960, the system 30 accepts the user's bid entered in steps 950-960 as the new current high bid (step 1070). Upon accepting the new current high bid, the system 30 advises the user that her bid submitted in steps 950-960 had been accepted and that she is the current high bidder (step 1080), see FIG. 36. The current high bidder can then monitor the status of her bid or bids using the form represented by FIG. 37 (step 1090). FIG. 37 is a representative screen shot of the Bid Status Form illustrating a form which informs potential bidders of the status of all items they have bid on up until that point, as well as informs them of the status of items that they are tracking. As discussed herein, the form illustrated by FIG. 37 contains detailed information on a specific loan, and provides highlight information on other loans in the "Related Auctions Status" section, that the bidder is interested in.

Figure 38:
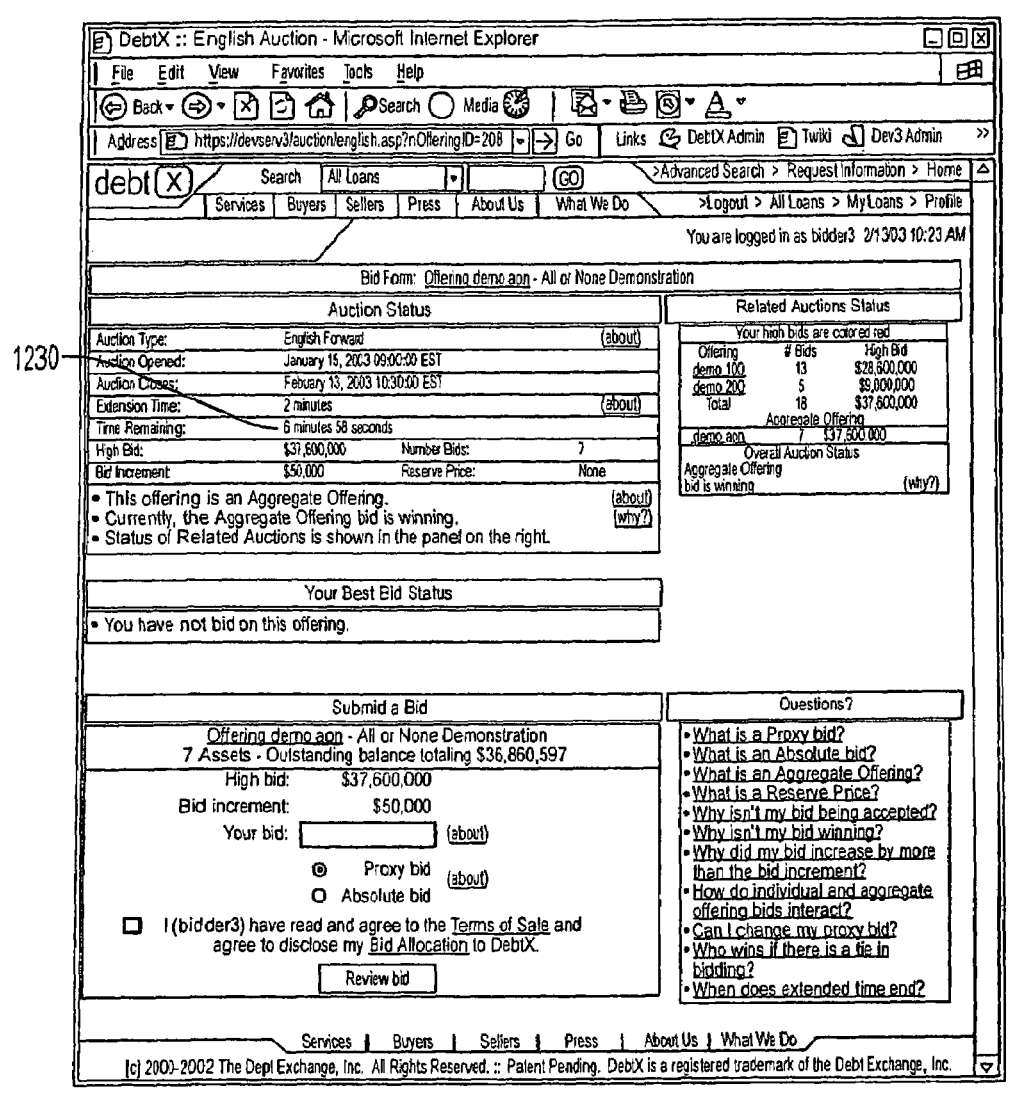
Figure 39:
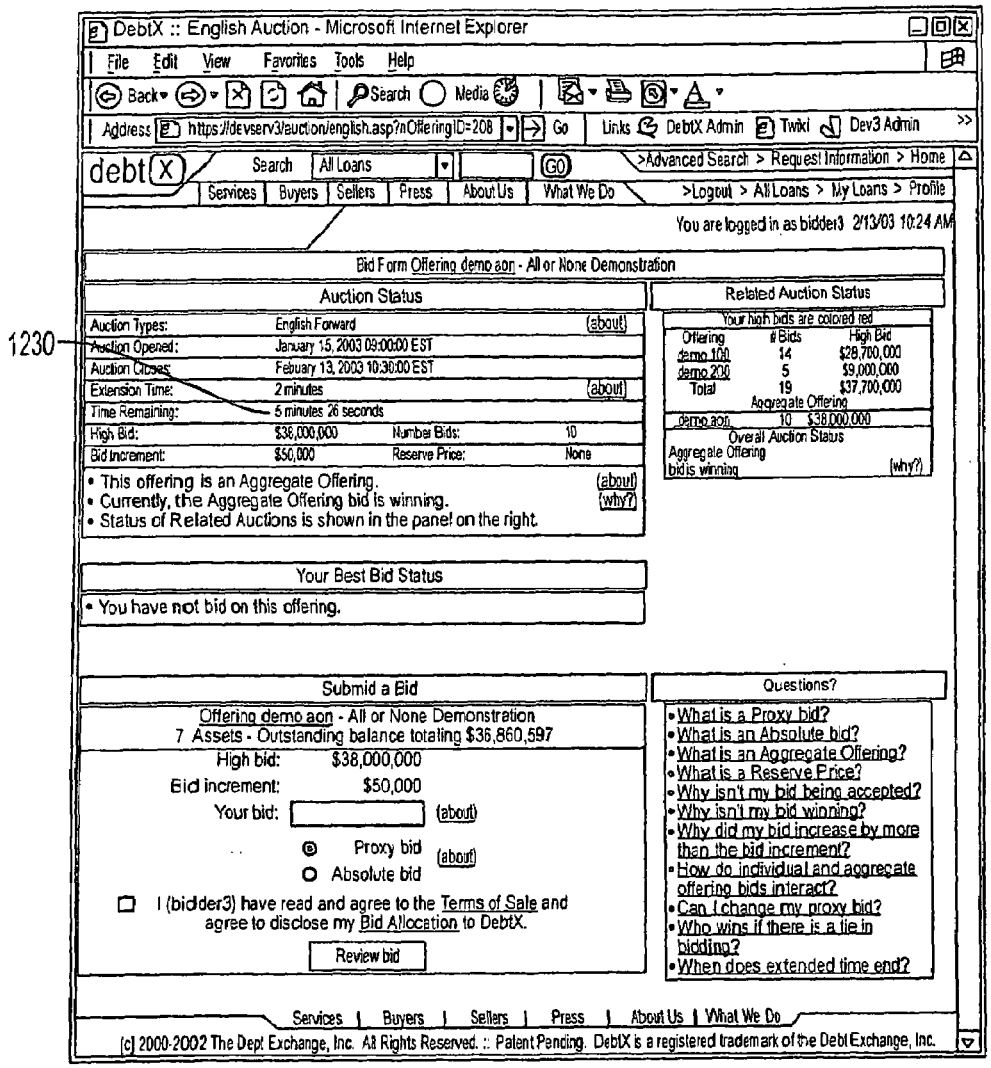
FIG. 39 is a representative screen shot illustrating the bid status form after an new bid had been accepted on an offering, in accordance with an embodiment of the invention.

Upon accepting a new bid as the new current high bid, see steps 1040 and 1070, the auction system 30 also updates or refreshes the Bid Status Form of every user or bidder that has either bid on or is tracking that item (step 1100). FIG. 38 is a representative screen shot of the user's Bid Status Form prior to a proxy bid of $38,000,000 in regard to steps 1040 through 1060 being accepted. The "Time Remaining" 1230 informs the user that six minutes and fifty-eight seconds remain in the bidding. FIG. 39 is a representative screen shot of the user's Bid Status Form after the proxy bid of $38,000,000 in regard to steps 1040 through 1060 has been accepted. The "Time Remaining" 1230 informs the user that five minutes and twenty-six seconds remain in the auction.

An alternative embodiment of the present invention could simply send a page refresh to each user on an automated basis. For example, each user tracking and/or bidding on a loan could have their Bid Status Form (see FIG. 37) refreshed by the auction system 30 on a predetermined basis, such as every fifteen seconds.

The updating of all bidders' Bid Status Form once a new current high bid has been accepted by the auction system 30 or upon the expiration of a predetermined period of time is referred to herein as auto-refresh. This auto-refresh or update feature is important because as discussed herein, without that automatic update or refresh bidders/trackers who are interested in a certain product or service would not know that they are no longer the current high bidder. Similarly, without the automatic update or refresh, the bidders/trackers who are interested in a particular product or service might be misled into a false sense of security that the they could win an auction if they simply submitted an amount equal to the current high bid displayed on their screen plus the minimum bid, when in reality the current high bid surpassed that amount several minutes earlier.

One method in which the auto-refresh feature is made possible is because the system 30 previously stored the profile information of each user that is actively bidding on an offering's status, or that specified that they were tracking a specific loan regardless of whether they were tracking it live. Via the Custom Application Components 40, the User Profile database 50 and the Administration Components 44 or comparable modules, the system 30 is able to determine which product or service each and every bidder is tracking and/or bidding on. Therefore, when the current high bid associated with that product or service being tracked is increased via a new bid, the auction system 30 can auto-refresh or update each of the Bid Status Forms or other applicable forms for each Bidder tracking a given loan. Similarly, the system 30 can send via its other components, such as the Off The Shelf Application Components 42, an email, a page or other type of means by which a registered user of the system 30 tracking a given product or service learns that there is a new current high bid on that product or service of interest to them.

In another embodiment of the present invention, the auction system 30 can allow or deny access to the system 30 when a user attempts to log onto the system by combining, for example, their login information with the IP address of the location from which they are either attempting to login from, or bid from. For example, if a user previously registered with the system 30 and instructed the system 30 to only allow access from one location with a certain IP address or range of IP addresses, the system 30 would deny a login attempt from an unacceptable IP address. The system 30 could employ the information contained in at least the User Profile database 50 to accomplish this. Additionally, the user's IP address or user name allows the auction system 30 to track users as they move across the auction web site. Such tracking provides the auction house with various advantages, such as controlling a user's access, or data-mining the user's movements so that the auction house can market new products to that user.

As discussed herein, the present invention auctions off various products and services. One of these products can be a financial product, such as a portfolio of loans. In an embodiment of the present invention, these portfolios can be auctioned off as a whole, which is referred to as an aggregate offering. Alternatively, the system 30 can auction off each loan package individually, wherein each loan package might consist of several loans.

Figure 40:
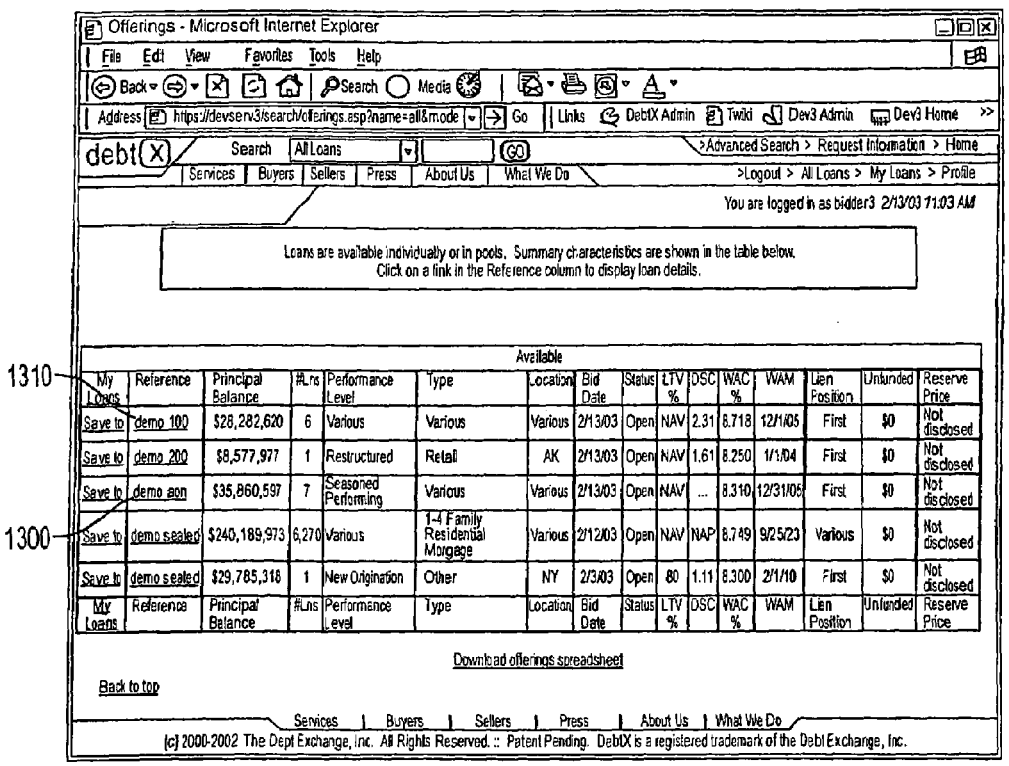
FIG. 40 is a representative screen shot illustrating the results of a search for given search criteria, in accordance with an embodiment of the invention.
Figure 41:
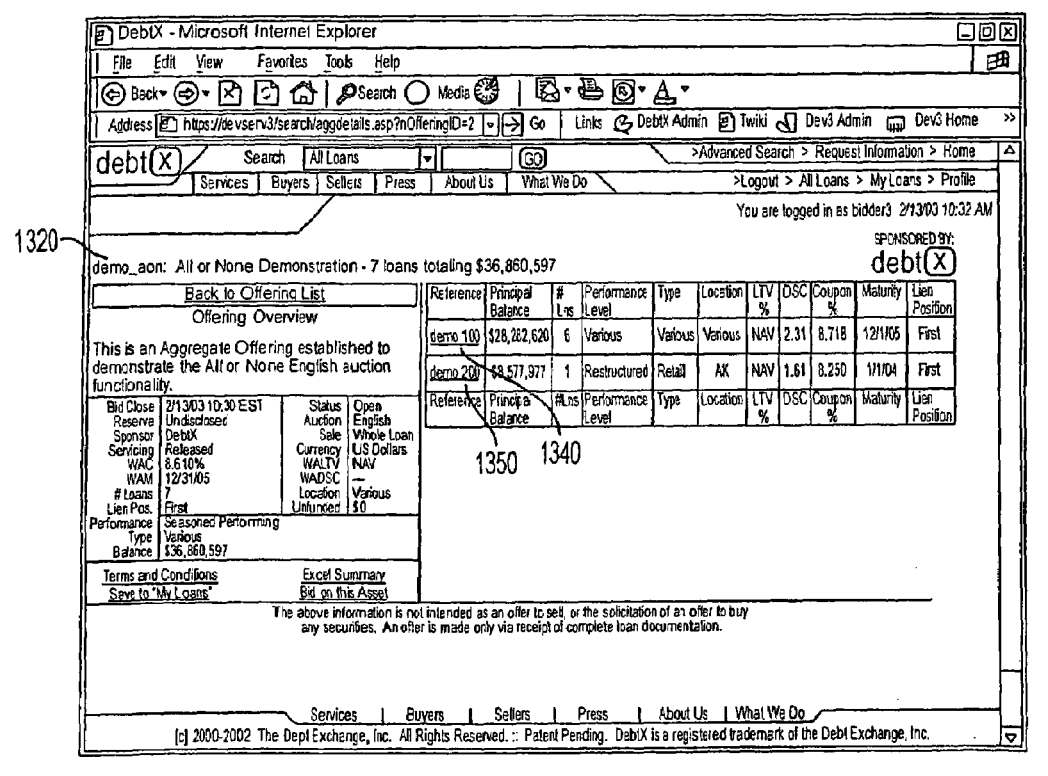
Figure 42:
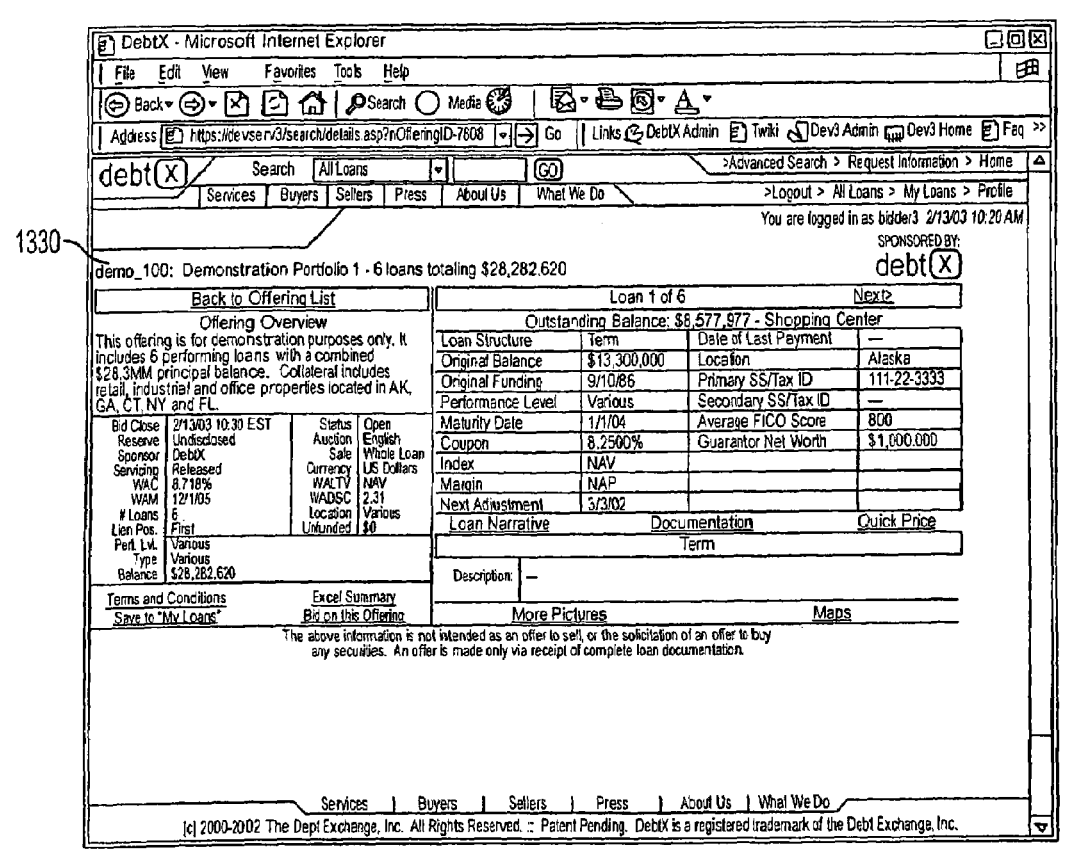

For example, FIG. 40 is a representative screen shot of the search results which match a user's criteria for a loan, which includes the loan offering "demo_aon" 1300, and demo_100" 1310, in accordance with an embodiment of the present invention. FIG. 41 is a representative screen shot of the Aggregate Offering Form illustrating a form for potential bidders to review an offering (e.g., offering entitled "demo_aon" 1320) containing several loans that can all be bid on at once, in accordance with an embodiment of the present invention. By comparison, FIG. 42 is a representative screen shot of an individual offering form, detailing a given loan pool (e.g., loan pool demo_100 1330), which is a part of the aggregated loan portfolio "demo_aon," in accordance with an embodiment of the present invention.

There are several advantages to both embodiments. For example, if a large heterogeneous portfolio of financial products can be divided into several smaller pools of homogenous loans, as shown in FIG. 42, it benefits the bidder because the smaller homogeneous offerings encourage participation by smaller bidders who would not otherwise be able to afford to bid on the desired properties because of the prohibitive size of the entire portfolio. Moreover, the smaller homogeneous pools do not prohibit the larger bidders from participating in the auction because they can instead bid on the larger grouped offering. This increased participation for the smaller homogeneous pools by both small and large bidders also provides a benefit to the seller because the total closing price of each smaller pool will typically be larger than if just the large heterogeneous pool was auctioned off. Additionally, the large heterogeneous pool of loans can also be auctioned off and bid on by larger bidders.

In one embodiment the seller could structure the auction as an aggregate bid, which is also referred to as an All-or-None auction. The terms aggregate or All-or-None mean that in order for a bidder to win the auction, he must successfully bid on the entire loan portfolio, otherwise he wins none of the loans.

One way this could occur begins with the screen shot illustrated by FIG. 40, which is a representative screen shot of the Search Results Form illustrating a form that returns the search results for criteria selected by a bidder, in accordance with an embodiment of the present invention. As shown in FIG. 40, the system 30 returns the listed loan packages as satisfying a bidder's search criteria. By clicking or selecting each individual loan package, the auction system 30 will display certain information regarding that loan package. For example, if the bidder selects demo_aon 1300 in FIG. 40, the system 30 will display FIG. 41, showing that demo_aon 1320 is an aggregated offering which is comprised of two loan packages—"demo__100" 1340 and "demo__200" 1350. The total value of the aggregated loan is $36,860,597 because the sum of the two loans packages that comprise the demo_aon portfolio 1320 are valued at $28,282,620 for demo_100 1340 and $8,577,977 for demo_200 1350.

Alternatively, the bidder could choose to review individual loan packages. FIG. 42 depicts the first of six loans in the demo_100 1330 loan package. Note that the outstanding balance of those six loans equals the value of the demo_100 1330 portfolio.

Because the auction of the loan portfolio demo_aon 1320 is an aggregate or All-or-None offering comprised of the demo_100 1340 and demo_200 1350 loan packages, in order for one bidder to take the entire demo_aon 1320 portfolio, he would have to outbid the sum of the two closing bids on the demo_100 1340 loan package and the demo_200 1350 loan package. FIG. 43, which is a representative screen shot of the Related Auctions Status portion of the Bid Status Form as shown in FIG. 37, illustrates a form used by a Bidder or other user to keep track of all items they are interested in and/or have bid on, in accordance with an embodiment of the present invention. As illustrated in FIG. 43, the Bidder can see the High Bid 1400 for all three offerings that are related to the specific bid he is tracking (e.g., demo_100 1410) using the Bid Status form in FIG. 37. For example, as illustrated in FIG. 43 the Bidder can view: the individual offerings demo_100 1410 and demo_200 1420; as well as the aggregate offering demo_aon 1420. Additionally, the auction system as illustrated in the Related Auction Status Form in FIG. 43 will inform the bidder what the sum 1440 of the high bids for the individual offerings are as compared to the highest bid 1400 for the aggregate offering. The auction system as illustrated by the Related Auction Status Form in FIG. 43 will also inform the bidder via the status portion 1450 whether or not the aggregate offering is currently the highest bid, or whether the sum of the individual loan packages making up the aggregate offering is the highest total.

Figure 51:
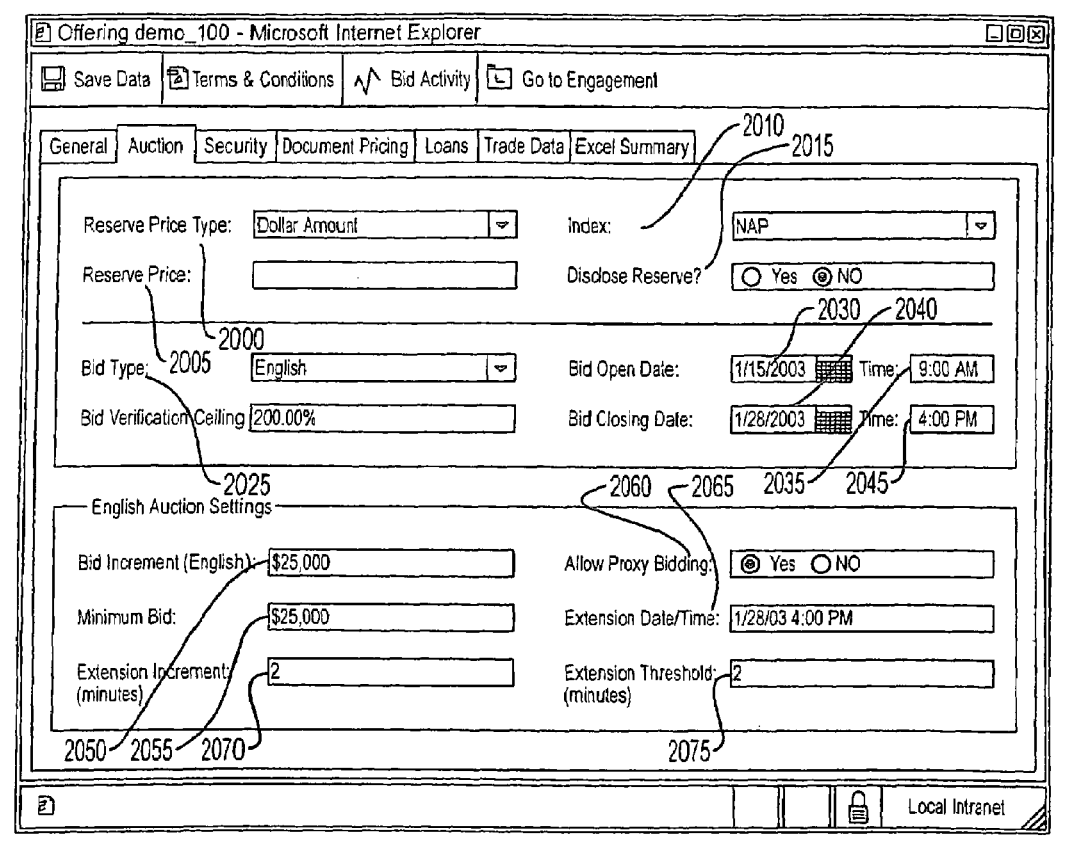

As discussed herein, the system 30 allows the Seller and/or the system administrator to select whether a given offering will be an aggregate sale or an individual sale (see FIG. 51). Once the Seller and/or system administrator sets how the item will be offered during the auction, the system 30 employs the Administration Components 44 to set the offering accordingly. The Administration Components 44 also provide other functional capabilities to the system administrator. For example, the system administrator can set how much information a Bidder or Seller gets to view about an auction. As described herein, in one embodiment, the system only allows any one bidder to view the current high bid and his own bid history, thereby preventing any bidder from seeing anyone else's bids. Operating an auction in this fashion typically results in the Seller receiving higher bids and pricing premiums than if the bidders were allowed to view each others' bids.

Figure 44:
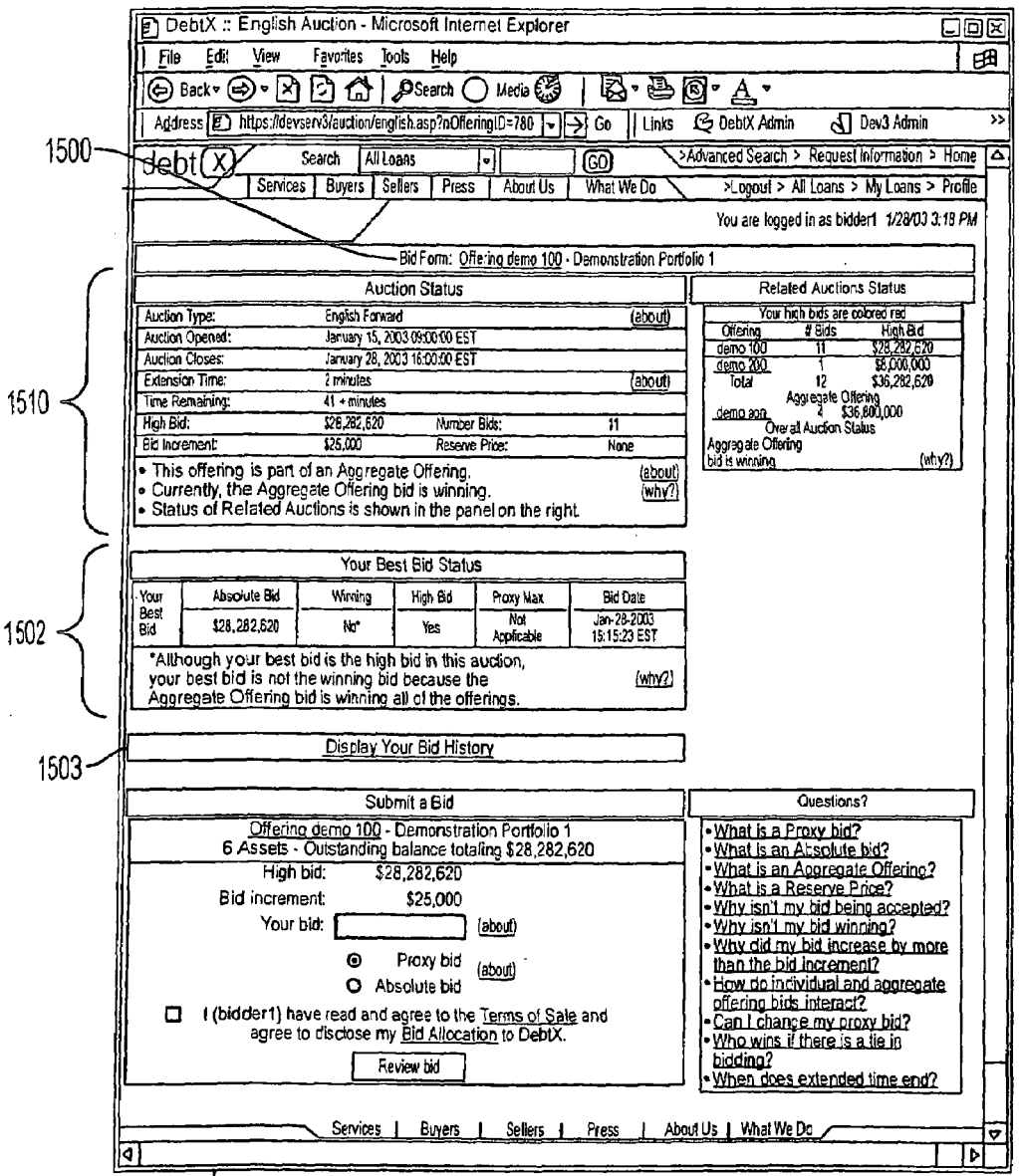
FIG. 44 is a representative screen shot illustrating a bid form, in accordance with an embodiment of the invention.

Another embodiment of the present invention involves the auction system 30 providing a bidder or a party tracking the progress of a given auction with updates on the status of that auction. For example, as illustrated generally by FIG. 44, which is a representative screen shot of the Bidder's Bid Form 1501 for a given loan which the user is tracking and/or bidding on, in accordance with an embodiment of the present invention, the product being tracked in FIG. 44 is the loan offering "demo__100" 1500. FIG. 45, which is a representative screen shot of the Auction Status portion 1510 of the Bid Form shown in FIG. 44, is one of the components of the auction system 30 as illustrated in FIG. 44. The Auction Status portion 1510 of the Bid Form, as illustrated in FIG. 45, provides an update on a selected loan (e.g., demo_100) to the user bidding and/or tracking that loan, in accordance with an embodiment of the present invention. Notably, FIG. 45 in regard to loan package demo_100, informs the user as to: what type of auction it is 1520; when it opened 1530; when it closes 1540; the amount of extension time available 1550; the time remaining 1560; the current high bid 1570; the number of bids 1580; the bid increment 1590; whether there is a reserve price 1600; whether the offering is part of an Aggregate Offering 1610; whether the amount of the Aggregate Offering bid is greater than the sum of the individual bids 1620; and informs the Bidder that the status 1630 of the Related Auctions that he is interested in can be found in another portion of the Bid Form.

Another aspect of FIG. 44 is the Your Best Bid Status portion 1502. FIG. 46 is a representative screen shot of the Your Best Bid Status portion 1502 of FIG. 44, and displays for the Bidder certain information pertaining to his best bid on loan offering demo_100. For example, it displays: the Bidder's best bid 1640 on the offering selected in FIG. 44; whether it is a currently winning bid 1650; if the bid in not the current winning bid, it provides an explanation 1660 as to why; whether it is the high bid 1670; what the Bidder's maximum proxy bid 1680 would be, if applicable; as well as the date 1690 and time 1695 of the his bid.

Another aspect of FIG. 44 is the Display Your Bid History link 1503. FIG. 46 is a representative screen shot of a portion of the Bid Status Form which provides the link 1503 to the display of the Bidder's history, in accordance with an embodiment of the present invention. For example, the auction system 30 displays, as illustrated in FIG. 46, what the relevant portion of the Bid Status screen would look like prior to the user selecting that link 1503. FIG. 47 is a representative screen shot of a portion of the Bid Status Form which provides the Your Bid History 1504 form, in accordance with an embodiment of the present invention.

For example, when the Bidder selects the Display Your Bid History link 1503 as illustrated in FIG. 46, in accordance with an embodiment of the present invention, the auction system 30 expands the Bid Status portion of the Bid Form and displays Your Bid History 1504, as shown in FIG. 47, all bids placed by the Bidder on a given loan, such as loan offering demo_100. In one embodiment of the present invention the auction system 30 will provide the Bidder, as shown in FIG. 47, information regarding whether the bid on the product or service of interest was a Proxy or Absolute bid 1700; the bid amount 1710; and the bid time 1720 and date 1730. As discussed herein, the Bidder is only able to see his or her bid history and the bid history of any other Bidder.

Figure 48:
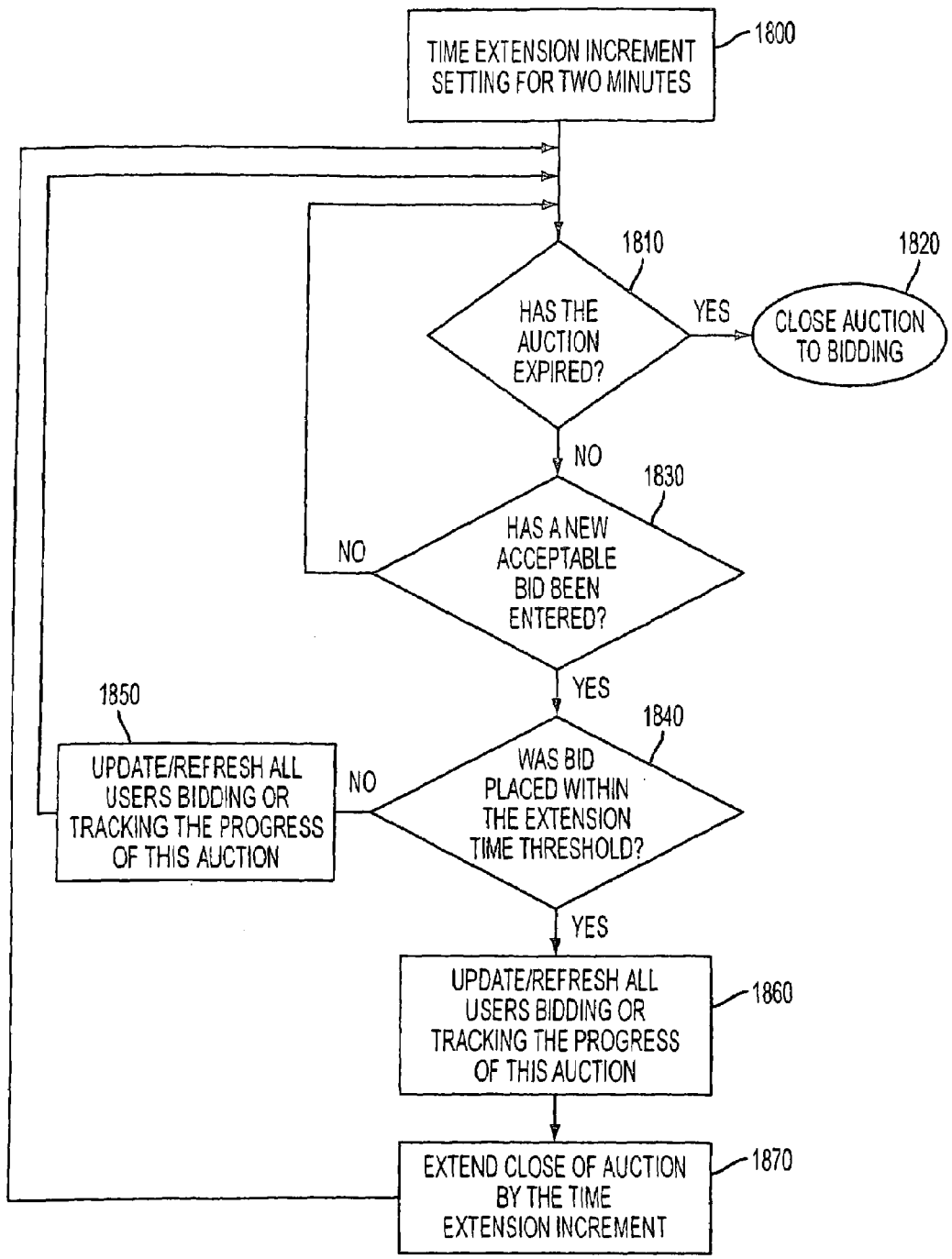
FIG. 48 is a flowchart illustrating the operation of the automatic extension of the closing of an auction, in accordance with an embodiment of the invention.

Another embodiment of the present invention concerns the ability of the system 30 to automatically extend the closing of given auction by a certain amount of time when a new bidder is either in the process of entering a bid, or has entered a bid within a predetermined period prior to the closing of the auction. For example, as illustrated in FIG. 48, which is a representative illustration of this time extension function of the auction system 30, in accordance with an embodiment of the present invention, the amount of time by which the closing of an auction of loan package demo_100 can be extended is set by either the system administrator, the system 30 or the Seller (step 1800). For purposes of illustration only, the example illustrated in FIG. 48 contains a time extension increment equaling two minutes, and an extension time threshold equaling three minutes. Throughout the conduct of that auction, the auction system 30 checks to determine whether the time to submit a bid on demo_100 has expired (step 1810). If the time in which to submit a bid has expired, the auction for loan package demo_100 is closed to further bidding (step 1820).

If the auction for the loan package demo_100 had not yet expired, the auction system 30 checks whether a new acceptable bid (i.e., exceeds the current high bid by at least the minimum bid) has been entered by any user bidding or tracking the progress of the auction of demo_100 (step 1830). There are several embodiments in which this step can be accomplished. For example, for purposes of illustration only, the auction system 30 would only register that a new bid had been submitted if the Bidder actually typed in a bid in the "Your Bid" portion of the Submit A Bid Form (see FIG. 33) and clicked on the "Review Bid" link contained in the Submit A Bid Form. One skilled in the art would recognize that other embodiments are also possible.

If the auction system 30 determined that no bid had been entered, it would return to step 1810 and again determine whether the auction had expired. However, if the auction system 30 did determine that a new bid had been entered, the auction system 30 would then determine whether the Bidder placed that bid within the amount of time equal to or less than the time extension threshold value (step 1840). For example, if the time extension threshold was set to three minutes, and the time remaining before the auction closed equaled four minutes, then the bid had not been placed within the time extension threshold and the auction system 30 would return to step 1810 after updating and/or refreshing the status screens of all users tracking the progress of that auction (step 1850). Conversely, if the auction system 30 determined that a bid had been placed within thirty seconds of the auction closing, and was therefore within the three-minute time extension threshold, the auction system 30 would automatically update and/or refresh the status screens of all users tracking the progress of that auction (step 1860), and then the auction system would extend the closing of the auction by the time extension increment of two minutes (step 1870). Similarly, if the Bidder was attempting to place a bid thirty seconds before the close of the auction and was therefore within the time extension period, the auction system 30 would automatically extend the closing of the auction by the time extension increment of two minutes (step 1870). After extending the close of the auction by at least the time extension increment, if not by the sum of the time extension increment plus the time remaining prior to the close of the auction, the system 30 returns to step 1810. An alternative to steps 1850 and 1860 would be for the auction system 30 to update and/or refresh the screens of interested users after a predetermined time interval.

A further embodiment of the present invention includes the automatic extension feature to ensure that all bidders are able to continue submitting bids until they no longer want to participate. The automatic extension of the bidding feature benefits all the Bidders because they are not required to simply beat the other parties bidding in the same auction and see who could get their bid in closest to the closing of the auction. Instead, each Bidder can ensure their bid is accepted so long as it is entered prior to the close of the auction. A further embodiment of the present invention which includes the automatic extension feature also benefits Sellers because by not closing the bidding at an arbitrary time, at which point some bidders might be locked out, all bidders can continue to bid until the highest possible price is achieved for the product or service being offered. Because in this embodiment auctions only close when no bids have been submitted within a certain number of minutes of the auction closing, the auction will remain open until the bidding is done.

In one example of the system 30 employing the time extension embodiment, several auctions were held in which the time extension increment was set to five minutes. In one such auction the auction system 30 extended the closing of the auction three times for a total of fifteen extra minutes. These three extensions resulted in a two percent increase in proceeds to the Seller, and a sixteen percent increase in the total number of bids. In another such auction employing the time extension embodiment, the auction system 30 extended the closing of the auction twenty-four times for a total extension duration of one hundred and twenty minutes. These twenty-four extensions resulted in a thirteen percent increase in proceeds to the Seller, and a thirty-eight percent increase in the total number of bids.

As discussed herein, the auction system 30 allows the system administrator to monitor the activity of all users. These users can be tracked by the user's information stored in and handled by, for example, the available databases 46-50, the Content Management System 38, the Custom Application Components 40 and the Administration Components 44. Similarly, the Sellers can use these modules and databases to track the progress of any selected auction it chooses. Moreover, the auction system 30 provides the ability for sellers and administrators to watch auction activity for all bidders on a live basis as the auction transpires.

FIG. 49 is a representative screen shot of the summary view of the Auction Monitor Form, in accordance with an embodiment of the present invention. Similarly, FIG. 50 is a representative screen shot of the Offering Bid History which provides a detailed view of the bidding history of a specific product or service being auctioned, in accordance with an embodiment of the present invention. In an embodiment of present invention, the auction system 30 includes reporting capabilities in the form of EXCEL data export functions which can be communicated to the modules described herein. The Auction Monitor Form (see FIG. 49) and the Offering Bid History form (see FIG. 50) include the update and/or auto-refresh function described herein, in that these forms are automatically refreshed and updated either periodically or each time a new bid is accepted by the auction system 30. Refreshing the Auction Monitor Form and the Offering Bid History form ensures that not only the Bidders possess the most up to date information, but the Sellers and the system administrators possess that updated information as well.

As illustrated by FIG. 49 and FIG. 50, the auction system can display to the Sellers and the system administrators information which includes: title information; login status (e.g., login name, date, time); logout button; navigation to one or multiple offerings; navigation to offering list; and an auction clock (countdown time remaining). The summary information that could be displayed to the Seller and system administrator regarding the loans currently being auctioned (see FIG. 49) could include: the reference name for each loan 1900; the high bidder on that loan 1910; the type of auction it is 1920; the current high bid for that auction 1930; the date and time the high bidder placed its bid 1940; the number of bids placed 1950; and the reserve price associated with the item 1960 (if applicable). Similarly, the auction system 30 could provide detailed information for each summarized product or service. As illustrated in FIG. 50 for the financial product "demo_100," this detailed information could include: the loan identifier 1965; the identifier assigned to each bid on that offering 1970; the user placing that bid 1975;

the login name associated with that user 1980; the type of bid placed 1985; the amount bid 1990; and the time and date 1995 each bid was placed.

The auction system 30 also allows the system administrator and/or seller with the proper privileges to configure the necessary settings for an auction of products and services. For example, FIG. 51 is a representative screen shot of the Setup Form for the loan package "demo_100," in accordance with an embodiment of the present invention. One embodiment of the present invention illustrates that the system administrator and/or seller can access and set at least the following attributes of a product or service being auctioned: reserve price type 2000; reserve price 2005; index 2010; whether the reserve should be disclosed 2015; bid type 2020; bid verification ceiling 2025; bid open date 2030 and time 2035; bid closing date 2040 and time 2045; bid increment 2050; minimum bid 2055; whether proxy bidding is allowed 2060; the time extension increment 2065; at what point the extension time threshold should begin 2070; and the amount of time the extension time threshold should be set at 2075.

In the computerized trading system of the present invention, the system includes a number of buyers who are registered in the system and able to bid on products offered for sale by the sellers. For products where the number of buyers is small, it is understood that a broker, agent, trader or other intermediary may be needed to develop the interest of buyers in products and in general to facilitate the function of the market. These intermediaries (referred to broadly herein as "traders") may require access to information about the buyers and the products in order to perform their function of facilitating the market.

The buyers make decisions regarding which products to bid on and how much to bid based on detailed product information that is available to them in the system. For example, in one embodiment, the products offered for sale are financial products, such as loans or mortgages. In this embodiment, the detailed product information may include the interest rate or yield on the note, the principal balance, the term, and other information that is understood to be associated with loans.

In addition to this detailed information about the product that is available to any of the buyers registered with the system, each product may also have "due diligence" information associated with it. In the embodiment discussed above relating to financial products, these due diligence documents may include the original promissory note, any contracts relating to collateral, the title or deed, etc. It is understood non-financial products may have due diligence documents associated with them. For example, in the case where the product offered for sale is a car, the due diligence documents may be vehicle registration, repair history, or insurance information. In the case of rare or highly valuable goods such as artwork or jewelry, the due diligence documents may include a certificate of authenticity or the like.

In one embodiment of the computerized system, the due diligence documents are listed with the product, but must be purchased in order for the buyer to view them. This reduces the system overhead involved in scanning and storing these documents in the system.

As the buyers browse the various products offered for sale on the system, their browsing activity is stored. Specifically, the system stores whether a buyer has viewed the detailed product information and whether they have purchased the due diligence documents. In one embodiment, the system may also store the amount of time the buyer spends viewing the detailed information about a product.

Furthermore, over time, as the buyer bids on a number of products, the system stores the buyer's bidding history. For example, the system may store the number of winning bids for the buyer, or it may store the number of winning bids as a percentage of overall bids. In a further embodiment, the system may also store the proximity of the buyer's bid to the winning bid in those transactions where the buyer's bid was not successful. In yet another embodiment, the system may store the characteristics of the products that were bid on in the past, and may compare those characteristics with the characteristics of the current product.

In a further embodiment, the system may allow buyers to set a product acquisition preference, in which buyers indicate what product criteria are of interest to them. The system then matches the products that are currently offered for sale against those criteria.

Based on the buyer's activity in the system relating to the current product and the buyer's bidding history overall (as well as the buyer's acquisition preferences), the system determines the likelihood that the buyer will enter a bid for the current product. In one embodiment, this determination is made for every buyer on the system in relation to every product. In another embodiment, the determination is made only for those products and for those buyers for which the buyer has either viewed the detailed product information or has purchased the due diligence documents. It is understood that this likelihood may be recalculated in real-time as buyers browse through the system, so that the likelihood determination is always based on the latest available data.

In one embodiment, the system provides the traders with a listing of all of the buyers for a given product who have some likelihood of entering a bid on the given product. In an embodiment of the invention, the system ranks the buyers by their likelihood. In another embodiment, the system also categorizes the buyers into a small number of tiers based on their likelihood of bidding, in order to facilitate viewing by the traders.

By providing the ranking of buyers in this fashion, the traders are able to identify buyers who are very likely to enter a bid, and contact them directly. While this direct contact by the trader may motivate likely bidders to enter a bid, it also server to gather additional information. For example, a bidder may reveal to the trader a price range in which they are willing to bid. In a further embodiment, the system is able to store this price range information with the buyers other information relating to the product, and may be used to further calculate the likelihood of entering a bid. In still a further embodiment, in speaking with the buyer the trader may determine a qualitative likelihood that the buyer will enter a bid. While this qualitative likelihood is based on the trader's subjective perception, the system may nonetheless provide the trader with a range of subjective likelihoods that can be stored with the buyer's information. In this manner the subjective likelihood becomes part of the system' purely quantitative determination of bidding likelihood.

Figure 52:
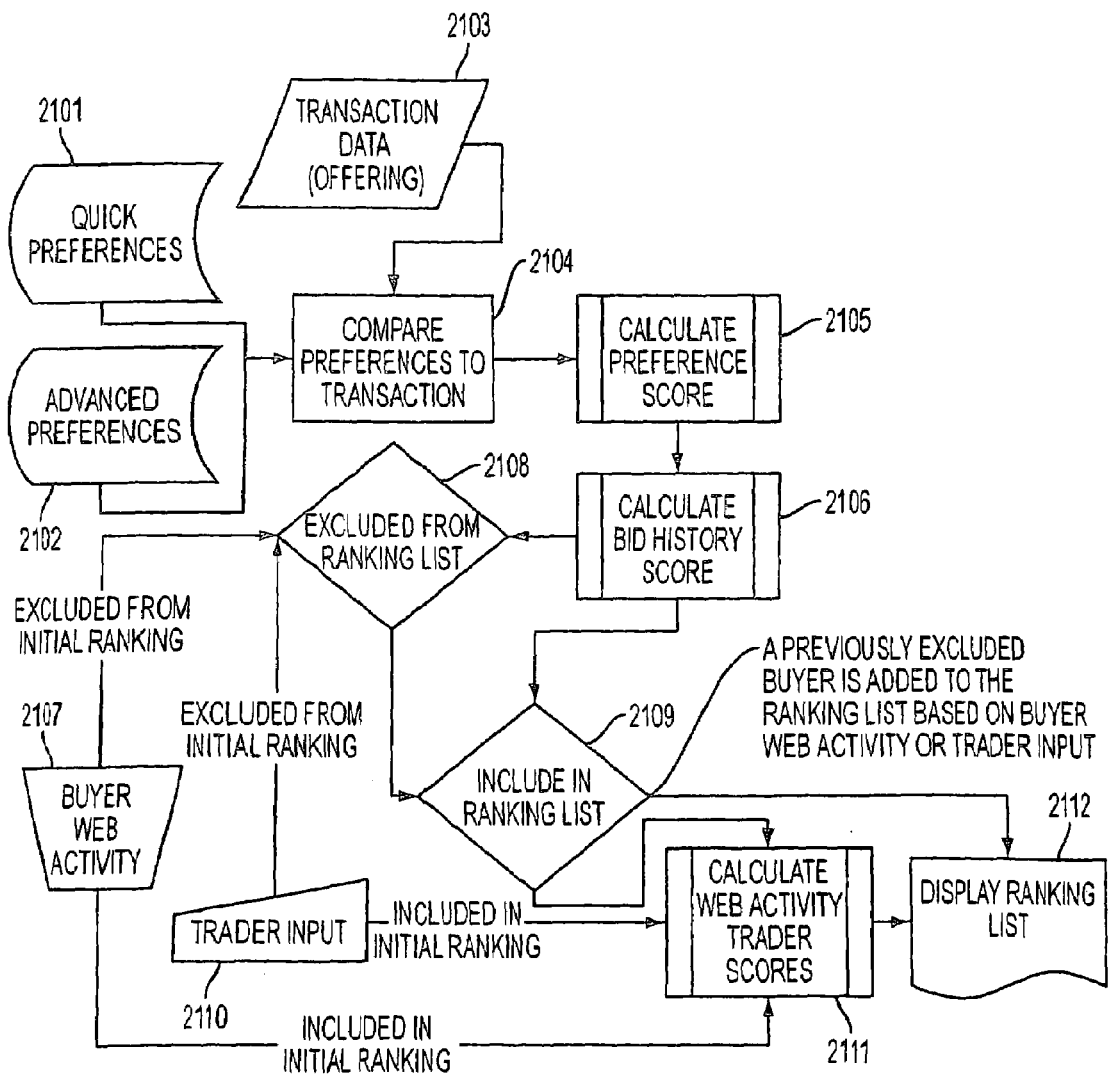
FIG. 52 is a flowchart illustrating the ranking of buyers according to an embodiment of the present invention.

The method for determining the buyer's likelihood of entering a bid in one embodiment is illustrated in detail in FIG. 52. Preferences 2101 and 2102 relate to the acquisition preferences that are selected by the buyer. Information of the current product 2103 is compared at 2104 to preferences 2101 and 2102 to produce a preference score 2105. The buyer's bid history 2106 and activity information 2107 are used to determine whether the buyer should be excluded at 2108 or included at 2109 from a ranking for this product. In a further embodiment, a trader's subjective input of likelihood 2110 may also be used as a basis for excluding the buyer from the ranking for this product. If the buyer is included, the buyer's activity in the system 2107, bid history 2106 and trader's subjective input 2110 are used to determine the trader score, 2111 which is used in the ranking of buyers for the product 2112.

In a further embodiment, the system may determine a market rating for each product based on all of the likelihoods of all of the buyers interested in that product. In this manner, the traders are able to see at a glance which products have enough potential bidders to ensure that the product is sold, and which products may require a reduction in asking price, or in the case of an auction a reduction in reserve price, in order to make the product more attractive.

Figure 53:
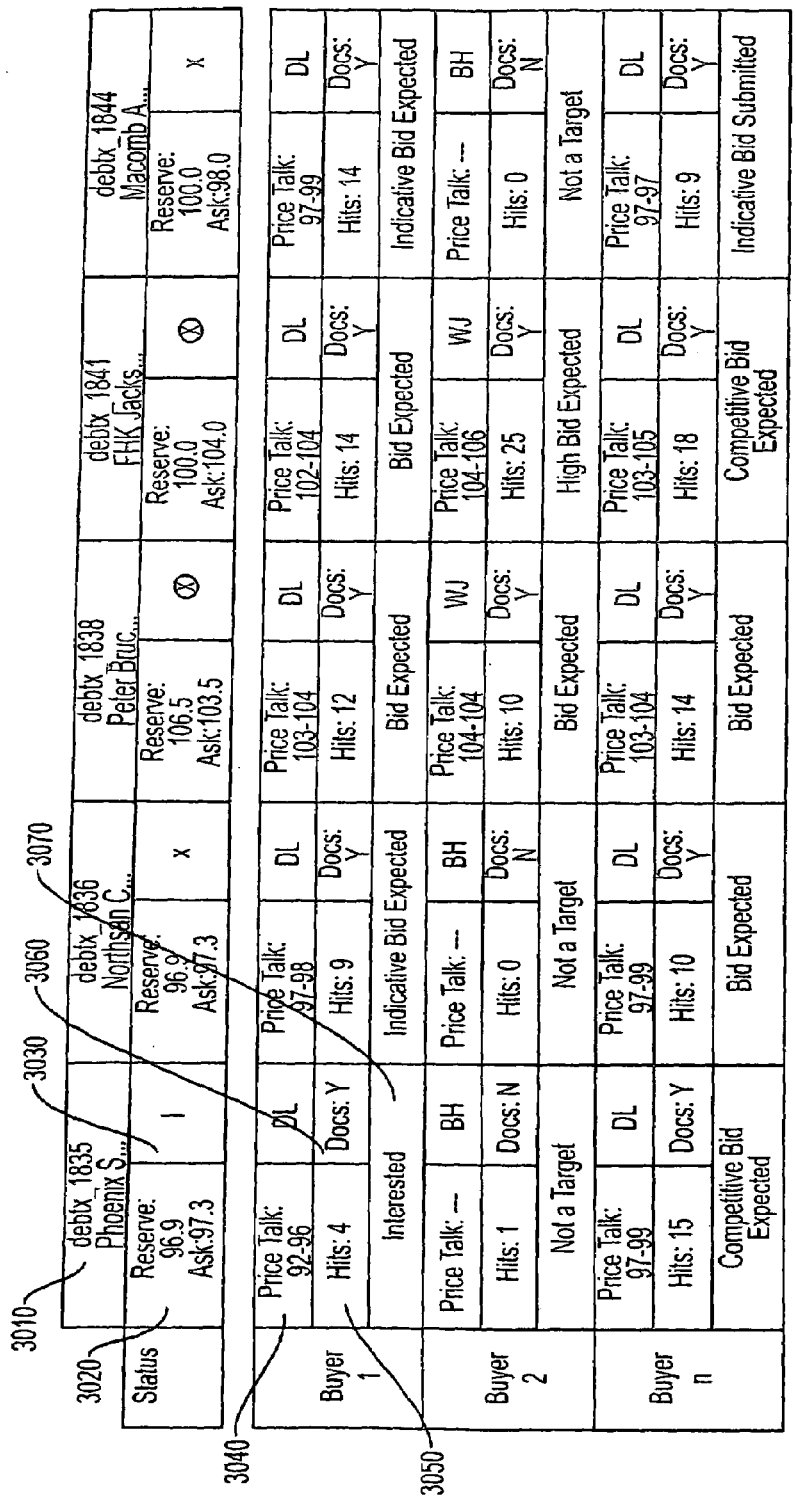
FIG. 53 is a table illustrating the buyer and product data as displayed according to an embodiment of the present invention.

All of the information is provided by the system in an organized format, such as a that illustrated in FIG. 53. The products offered for sale 3010 are listed along with the seller's reserve and asking price 3020. The buyers 1 through n are listed vertically beneath the products. For each buyer and product, the range of likely bids is provided as "Price Talk" field 3040. In the embodiment illustrated in FIG. 53, the range is displayed in terms of the percentage of the asking price. However, it is understood that this could be displayed as a percentage of the reserve or in absolute dollar terms as well.

The buyer's activity history 3050 is provided in the embodiment illustrated in FIG. 53 in terms of "Hits", i.e. the number of times the buyer has accessed the page displaying the information about the product. In another embodiment, this could be displayed by some other metric, such as the total time spent viewing the product information. In addition, the system also displays in field 3060 whether the due diligence documents for the product have been purchased or downloaded by the buyer. Finally, the trader's subjective input of the likelihood of the buyer purchasing the particular product is provided in field 3070.

The subjective inputs 3070 for all buyers 1 through n for a given product are combined to determine the strength of the market for the product. This market assessment 3030 may be based on the number of buyers whose likelihood of bidding on said product exceeds a predetermined threshold. In the embodiment illustrated in FIG. 53, the market assessment is displayed as a readily identifiable symbol. However, it is understood that other embodiments are contemplated by the present invention in which the market assessment is displayed in another manner.

Figure 54:
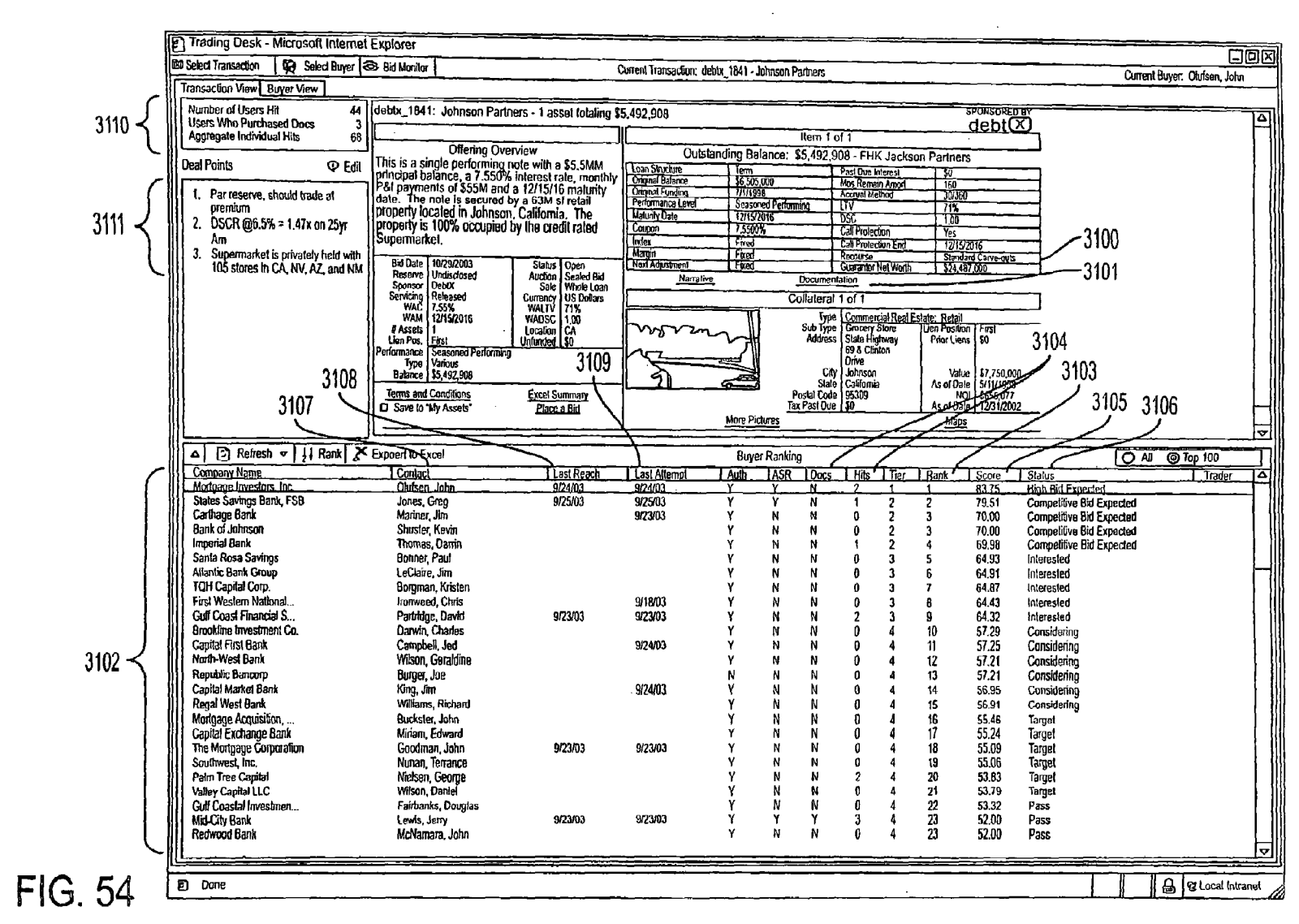

FIG. 54 illustrates an embodiment of the present invention ranking bidders interested in bidding on a particular product. In the embodiment illustrated in FIG. 54, the product 3100 is a loan for real-estate. All of the detailed product information for this loan is provided, along with a link 3101 to the due diligence documents. The bidders 3102 are listed in order of their ranking 3103. In addition to the bidder's name, the listing includes buyer activity information 3104 in the form of "hits" and "Docs" (indicating whether the due diligence documents have been purchased). The buyer's likelihood of bidding raw score 3105 computed by the system and the trader's subjective indicator of the buyer's likelihood of bidding 3106 are also provided.

In this embodiment, the trading system includes contact management features as well, to facilitate contact between the trader and the bidders. These contact management features include the contact person at the buyer 3107 as well as the last time 3108 a trader contacted the buyer, and the last time 3109 an attempt to contact the buyer was made.

Furthermore, in the embodiment illustrated in FIG. 54, the system also provides information relating to aggregate buyer activity 3110 for this product. This aggregate activity information includes the total number of bidders who have viewed this product, the total number of users who have downloaded the documents, and the total number of hits. The system also provides information highlights 3111 about the deal to assist traders in quickly identifying any unique positive or negative aspects about the product.

Figure 55:
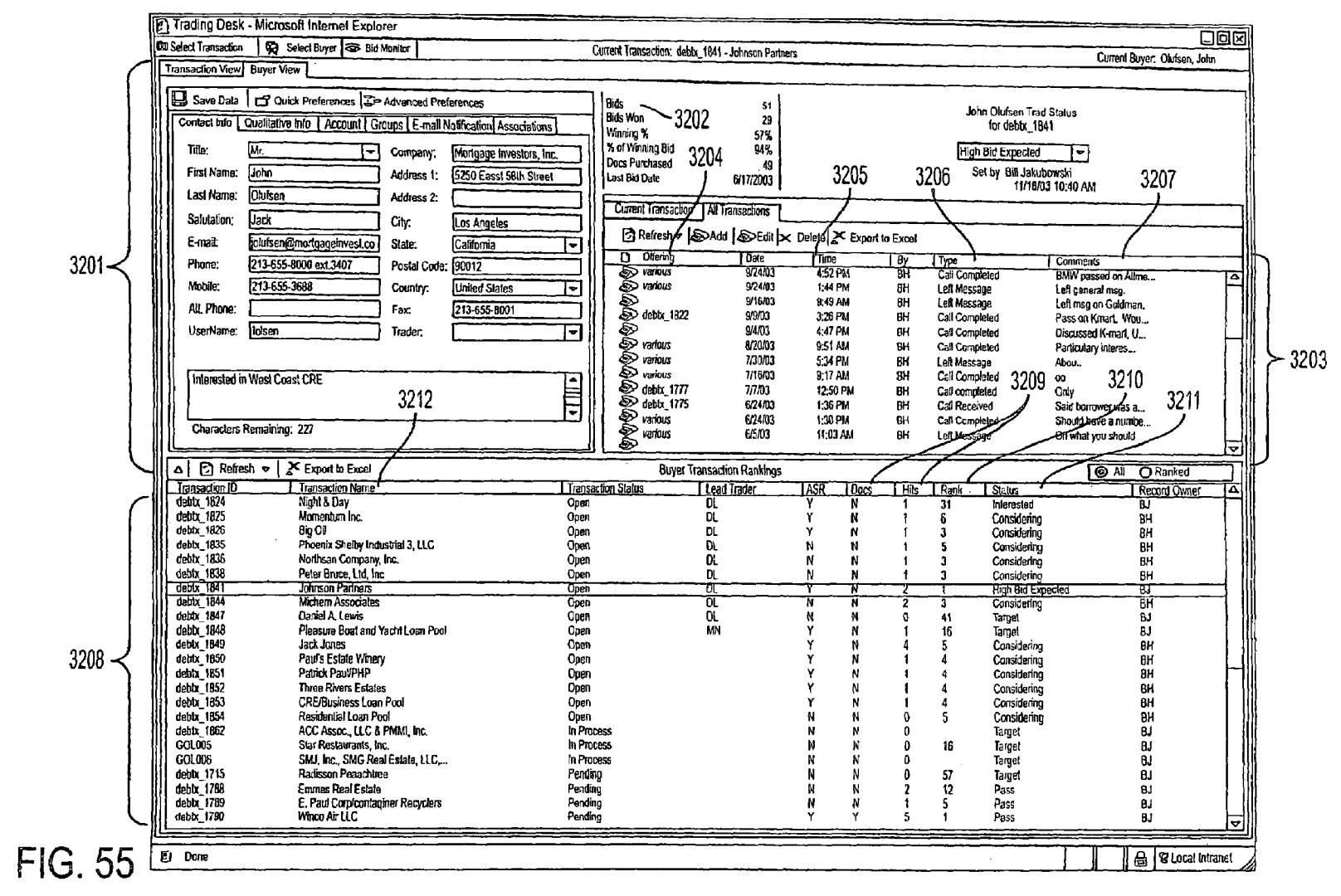

FIG. 55 illustrates the presentation of buyer information 3200 according to a further embodiment of the present invention. In this embodiment, the system provides detailed contact information for the buyers 3201, along with bid history for the buyer 3202. A call log 3203 lists calls made to the buyer, and includes information such as the product discussed 3204, the date and time of the call 3205, the type of contact made 3206, and general comments 3207 about what transpired. In addition, the system lists 3208 all of the past and present transactions 3212 that the buyer participated it, or is currently interested it, along with their activity information 3209, rank 3210 and likelihood status 3211 for that transaction.

It is understood that a system according to the present invention may present information and data is any variety and combination of layouts and interfaces. It is understood that the present invention is not limited to the interfaces illustrated herein.

By posting products and services to websites and portals associated with some embodiments of the invention, sellers of various products and services, and in particular financial products, are able to reach the broadest qualified investor audience in the most efficient manner. In addition, buyers of products and services, in particular buyers and investors in financial products, benefit from the ability to access and evaluate investment opportunities, from a central location.

Variations, modifications, and other implementations of what is described herein will occur to those of ordinary skill in the art without departing from the spirit and the scope of the invention as claimed.

It should be understood that virtually any aspect of the embodiments of the invention described herein can be implemented using software, hardware, or in a combination of hardware and software. For example, at least the listed descriptions of "logic," referenced herein can be implemented in hardware, software or a combination.

As those skilled in the art will recognize, the invention described herein can be modified to accommodate and/or comply with any one or more of the above-described technologies and standards. In addition, variations, modifications, and other implementations of what is described herein can occur to those of ordinary skill in the art without departing from the spirit and the scope of the invention as claimed.

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

It also should be noted that the previous illustrations of screen shots, together with the accompanying descriptions, are provided by way of example only and are not limiting.

Those skilled in the art will recognize that many different designs of interfaces, screen shots, navigation patterns, and the like, are within the spirit and scope of the invention.

It will be apparent to those skilled in the art that various modifications and variation can be made in the present invention without departing from the spirit or scope of the invention. Thus, it is intended that the present invention cover the modifications and variations of the this invention cover the modifications and variations of this invention provided they come within the scope of the appended claims and their equivalents.

The invention claimed is:

1. A computerized system for trading financial products between at least one buyer and at least one seller, comprising:
   detailed financial product information;
   buyer activity information for each buyer, comprising:
   information of a frequency with which said buyer has accessed said computerized system, information of a frequency with which buyer has viewed said financial product, and information of whether said buyer has viewed detailed information about said financial product; and
   historical information for each of said buyers, comprising:
   the number of other financial products that said buyer has bid on previously, the number of winning bids from said buyer for other financial products; and
   a ranking determined for each buyer relating to the likelihood that said buyer will bid on said financial product, said ranking determined based on said buyer activity information and said buyer historical information.

2. The computerized system for trading financial products according to claim 1, further comprising at least one document relating to said financial product, said document being different from said detailed financial product information.

3. The computerized system for trading financial products according to claim 2, wherein said buyer activity information for each of said buyers further comprises whether said buyer has accessed said document.

4. The computerized system for trading financial products according to claim 2, wherein said buyer activity information for each of said buyers further comprises whether said buyer has downloaded said document.

5. The computerized system for trading financial products according to claim 2, wherein said buyer activity information for each of said buyers further comprises whether said buyer has purchased said document.

6. The computerized system for trading financial products according to claim 1, wherein said historical information further comprises the buyer's bid for every financial product that the buyer has bid on, the winning bid for each of the financial products that the buyer has bid on, and the proximity between the buyer's bid and the winning bid for each financial product in which the buyer's bid was a losing bid.

7. The computerized system for trading financial products according to claim 1, wherein said historical information for each of said buyers further comprises the rank of said buyer's losing bid in relation to the winning bid and all other losing bids from other buyers for each financial product offering in which the buyer's bid was not the winning bid.

8. The computerized system for trading financial products according to claim 1, wherein said buyer activity information for each of said buyers further comprises the amount of time each of said buyers spent viewing said financial product on said computerized system.

9. The computerized system for trading financial products according to claim 1, wherein said ranking comprises placing each of said buyers into a predetermined category based on their likelihood of bidding.

10. The computerized system for trading financial products according to claim 1, wherein said ranking comprises a unique ranking of the likelihood of each of said buyers entering a bid for said financial product.

11. The computerized system for trading financial products according to claim 1, wherein said ranking comprises a score calculated based on buyer activity information and buyer historical information for each of said buyers.

12. The computerized system for trading financial products according to claim 1, further comprising: qualitative information about the likelihood of a buyer bidding on said financial product.

13. The computerized system for trading financial products according to claim 1, further comprising acquisition preference information for each buyer, wherein said ranking is determined based on said buyer activity information, said buyer historical information, and said buyer acquisition preferences.

14. The computerized system for trading financial products according to claim 1, wherein ranking is recalculated whenever the buyer activity information is updated based on additional buyer activity.

15. A computerized system for trading financial products between at least one buyer and at least one seller, comprising:
    user information for at least one buyer;
    a bid likelihood indicator for the buyer based on the buyer's likelihood of entering a bid on a financial product;
    a range of prices that said buyer would be willing to bid for said financial product; and
    a market assessment for each of said financial products determined based on the number of buyers whose likelihood of bidding on said financial product exceeds a predetermined threshold.

16. The computerized system for trading financial products according to claim 15, wherein said bid likelihood indicator is determined based on the buyer's activity in the system relating to said financial product.

17. The computerized system for trading financial products according to claim 15, wherein said bid likelihood indicator is determined based on the buyer's bidding history relating to other financial products offered on the system.

18. The computerized system for trading financial products according to claim 15, wherein said bid likelihood indicator is determined based on the buyer's activity in the system relating to said financial product and buyer's bidding history relating to other financial products.

* * * * *